United States Patent
Van Baelen et al.

(10) Patent No.: US 10,754,115 B2
(45) Date of Patent: Aug. 25, 2020

(54) DEPLOYING OPTICAL FIBERS WITHIN A MULTI-DWELLING UNIT

(71) Applicants: CommScope Connectivity Belgium BVBA, Kessel-Lo (BE); ADC Czech Republic, S.R.O., Brno (CZ)

(72) Inventors: David Jan Irma Van Baelen, Winksele (BE); Jiri Pasek, Brno (CZ); Roger Alaerts, Aarschot (BE)

(73) Assignees: COMMSCOPE CONNECTIVITY BELGIUM BVBA (BE); ADC CZECH REPUBLIC, S.R.O. (CZ)

( * ) Notice: Subject to any disclaimer, the term of this patent is extended or adjusted under 35 U.S.C. 154(b) by 0 days.

(21) Appl. No.: 15/567,913

(22) PCT Filed: Apr. 22, 2016

(86) PCT No.: PCT/EP2016/059104
§ 371 (c)(1),
(2) Date: Oct. 19, 2017

(87) PCT Pub. No.: WO2016/170172
PCT Pub. Date: Oct. 27, 2016

(65) Prior Publication Data
US 2018/0113268 A1    Apr. 26, 2018

Related U.S. Application Data

(60) Provisional application No. 62/186,697, filed on Jun. 30, 2015, provisional application No. 62/151,226, filed on Apr. 22, 2015.

(51) Int. Cl.
| G02B 6/38 | (2006.01) |
| G02B 6/44 | (2006.01) |
| G02B 6/46 | (2006.01) |

(52) U.S. Cl.
CPC ......... *G02B 6/4457* (2013.01); *G02B 6/3825* (2013.01); *G02B 6/3897* (2013.01);
(Continued)

(58) Field of Classification Search
CPC .... G02B 6/3825; G02B 6/3897; G02B 6/444; G02B 6/4452; G02B 6/4454; G02B 6/4457; G02B 6/4466; G02B 6/46; B65H 75/14
(Continued)

(56) References Cited

U.S. PATENT DOCUMENTS

| 7,715,679 B2 | 5/2010 | Kowalczyk et al. |
| 7,756,379 B2 | 7/2010 | Kowalczyk et al. |
(Continued)

FOREIGN PATENT DOCUMENTS

| WO | 2007/019511 A2 | 2/2007 |
| WO | 2014/024105 A1 | 2/2014 |
(Continued)

OTHER PUBLICATIONS

International Search Report and Written Opinion of the International Searching Authority for corresponding International Patent Application No. PCT/EP2016/059104 dated Jul. 19, 2016, 12 pages.

*Primary Examiner* — Michael P Mooney
(74) *Attorney, Agent, or Firm* — Merchant & Gould P.C.

(57) ABSTRACT

Example wall outlets include a base; a spool arrangement that mounts to the base; and a cable wound around the spool arrangement at the drum region. The base includes a mounting wall and a sidewall. The base defines a port and defines a first annular perimeter. The spool arrangement is rotatable relative to the base. The spool arrangement includes a drum region, a management region, and an aperture extending between the drum region and the management region. The drum region is enclosed by the sidewall of the base and the (Continued)

management region extends outwardly beyond the base. The cable has a first end extending through the aperture and terminated at a first fiber optic ferrule held at the management region. The cable also has a second end that extends through the port defined in the base and is terminated at a second fiber optic ferrule disposed external of the base.

20 Claims, 40 Drawing Sheets

(52) U.S. Cl.
CPC ........... *G02B 6/444* (2013.01); *G02B 6/4466* (2013.01); *G02B 6/46* (2013.01)

(58) Field of Classification Search
USPC ............................................ 385/56, 134–135
See application file for complete search history.

(56) References Cited

U.S. PATENT DOCUMENTS

| | | | |
|---|---|---|---|
| 7,869,682 B2 | 1/2011 | Kowalczyk et al. | |
| 8,074,916 B2 | 12/2011 | Penumatcha et al. | |
| 8,408,811 B2 | 4/2013 | De Jong et al. | |
| 8,565,572 B2 | 10/2013 | Krampotich et al. | |
| 9,261,663 B2 | 2/2016 | Loeffelholz et al. | |
| 2007/0031101 A1* | 2/2007 | Kline | B65H 75/44 |
| | | | 385/135 |
| 2009/0294016 A1 | 12/2009 | Sayres et al. | |
| 2015/0355428 A1* | 12/2015 | Leeman | G02B 6/4454 |
| | | | 385/135 |

FOREIGN PATENT DOCUMENTS

| | | |
|---|---|---|
| WO | 2014/049469 A1 | 4/2014 |
| WO | 2014/096134 A1 | 6/2014 |
| WO | 2016/170171 A2 | 10/2016 |

* cited by examiner

DEPLOYING OPTICAL FIBERS WITHIN A MULTI-DWELLING UNIT

CROSS-REFERENCE TO RELATED APPLICATIONS

This application is a National Stage Application of PCT/EP2016/059104, filed on Apr. 22, 2016, which claims the benefit of U.S. Patent Application Ser. No. 62/186,697, filed on Jun. 30, 2015, and claims the benefit of U.S. Patent Application Ser. No. 62/151,226, filed on Apr. 22, 2015, the disclosures of which are incorporated herein by reference in their entireties. To the extent appropriate, a claim of priority is made to each of the above disclosed applications.

BACKGROUND

Demand for fiber optic services is continuously increasing. In accommodating the need of current and future customers, fiber optic distribution cables are routed from a central office to extended areas. Providing fiber optic services to customers in some applications, such as to customers in a multiple dwelling unit, for example, involves splitting a fiber optic distribution cable into individual cables that are associated with a particular dwelling of the multiple dwelling unit.

In conventional arrangements, the distribution cable is routed from the central office to a large fiber distribution hub. The distribution cable is split out into a number of individual fiber optic cables at the fiber distribution hub. The individual fiber optic cables are then each routed to a wall-mount box (e.g., a floor box) located at the multiple dwelling unit. Subscriber cables are routed from the wall-mount box to one or more residences. The large fiber distribution hub is located remote from the wall-mount box. Typically, the fiber distribution hub splits out a number of multi-fiber distribution cables and feeds a number of wall-mount boxes.

In general, improvements are needed.

SUMMARY

Some aspects of the disclosure are directed to a storage device including a base; a spool arrangement configured to mount to the base; and a cable wound around the spool arrangement. The base includes a mounting wall and a sidewall extending outwardly from the mounting wall. The base defines a port providing access between an interior of the base and an exterior of the base. The base also defines a first annular perimeter. The spool arrangement is rotatable relative to the base. The spool arrangement includes a drum region, a management region, and an aperture extending between the drum region and the management region. The drum region is enclosed by the sidewall of the base when the spool arrangement is mounted to the base. The management region extends outwardly beyond the base when the spool arrangement is mounted to the base. The drum region defines a second annular perimeter. The cable is wound around the spool arrangement at the drum region. The cable has a first end extending through the aperture and terminated at a first fiber optic ferrule held at the management region. The cable also has a second end that extends through the port defined in the base and is terminated at a second fiber optic ferrule disposed external of the base.

In some implementations, the second fiber optic ferrule is held by a connector body to form a second fiber optic connector.

In other implementations, the second fiber optic ferrule is not surrounded by a connector body until connection to a port is being effected.

In certain implementations, the spool arrangement is rotatably lockable to the base. In examples, the base includes a slider member that is configured to slide relative to the base, the slider member including a lock member that selectively engages stop members defined by the spool arrangement.

In certain implementations, a cover mounts over the management region of the spool arrangement. In examples, the cover defines a port through which an external port of an optical adapter is accessible. The optical adapter is mounted to the management region of the spool arrangement.

In certain implementations, the management region of the spool arrangement is sufficiently large to overlap the first annular perimeter of the base. In an example, the management region of the spool arrangement extends beyond the first annular perimeter of the base.

In certain implementations, the first fiber optic ferrule is held by a connector body to form a first fiber optic connector. In certain examples, an optical adapter disposed on the spool arrangement at the management region. The optical adapter is configured to rotate unitarily with the spool. The optical adapter defines an internal port and an external port. The internal port holds the first fiber optic connector. The external port is accessible when the spool arrangement is mounted to the base.

In an example, the external port is disposed within an area defined by the first annular perimeter. In another example, the external port is disposed outside of the first annular perimeter.

In some examples, the first fiber optic connector does not have a strain relief boot. In other examples, the first fiber optic connector has a strain relief boot that curves 180° between first and second ends.

In certain implementations, the management region includes a cable routing arrangement that provide bend radius protection for a stub length of the first end of the cable to wrap around the management region, thereby allowing the first fiber optic connector and the stub length to be accessed without paying out the cable from the drum region of the spool arrangement.

In some implementations, the base is configured to mount to an exterior side of a surface.

In other implementations, the base is configured to within a wall so that at least the base is disposed behind an exterior surface of the wall.

In certain implementations, an routing member includes a body having a first side and a second side. The first side defines a routing channel leading to a through-passage. The first side of the body is configured to receive the mounting wall of the base. In certain examples, the body of the routing member includes a passage wall defining the through-passage. The passage wall tapers radially outwardly at a distal end of the passage wall.

Other aspects of the disclosure are directed to a storage device including an annular base; a spool arrangement configured to mount to the base; and a cable wound around the spool. The annular base includes a mounting surface and a sidewall extending outwardly from the mounting surface. The base defines a port providing access between an interior of the base and an exterior of the base. The spool arrangement is rotatable relative to the base. The spool arrangement includes a drum region, a management region, and an aperture extending between the drum region and the management region. The drum region is enclosed by the sidewall of the base when the spool arrangement is mounted to the base. The management region extends outwardly beyond the base when the spool arrangement is mounted to the base. The cable has a first end extending through the aperture and terminated at a first fiber optic connector held at the management region. The cable also has a second end that extends through the port defined in the base and is terminated at a fiber optic ferrule disposed external of the base.

In certain implementations, an optical adapter is disposed at the management region of the spool arrangement. The optical adapter defines a first port and a second port. The first port holds the first optical connector. The second port is disposed within a perimeter of the spool arrangement. In examples, the second port is centrally located on the management region. In certain examples, the first optical connector is retained at the management region without an optical adapter.

In certain implementations, a patchcord storage arrangement is configured to mount to the spool arrangement. The patchcord storage arrangement includes a second optical connector that is configured to align with the first optical connector when the patchcord storage arrangement is mounted to the spool arrangement. In certain examples, the second optical connector of the patchcord storage arrangement is held by an optical adapter retained at the patchcord storage arrangement.

In certain examples, the spool arrangement is a first spool arrangement and the patchcord storage arrangement includes a second spool arrangement holding a patchcord. The second spool arrangement is configured to selectively mount to the first spool arrangement at a fixed rotational position. The patchcord storage arrangement also includes a cover that is rotatably mounted to the second spool arrangement to enable a patchcord to be dispensed from the second spool arrangement. In examples, the patchcord can be dispensed from the second spool arrangement after the patchcord storage arrangement is mounted to the first spool arrangement even if the first spool arrangement is locked relative to the annular base.

In certain implementations, the patchcord storage arrangement has an annular perimeter. In examples, the annular perimeter of the patchcord storage arrangement is sized to overlap a footprint of the annular base.

Other aspects of the disclosure are directed to a cable storage unit including a coil of cable; a wall outlet holding the coil; a patchcord; and a patchcord storage arrangement holding the patchcord and configured to mount to the wall outlet. The coil of cable extends between a first end and a second end. The second end is connectorized at a fiber optic connector. The wall outlet defines a port through which the first end of the cable can be dispensed. The wall outlet also includes a first interface part holding the fiber optic connector at the second end of the cable. The patchcord extends between a first end and a second end. Each of the first and second ends is connectorized at fiber optic connectors. The patchcord storage arrangement includes a second interface part holding the fiber optic connector at the first end of the patchcord. The second interface part is aligned with the first interface part when the patchcord storage arrangement is mounted to the wall outlet. The second end of the patchcord is accessible from an exterior of the patchcord storage arrangement.

In certain implementations, the first interface part includes an optical adapter that holds the fiber optic connector at the second end of the cable. The optical adapter defines a port configured to receive the fiber optic connector at the first end of the patchcord when the patchcord storage arrangement mounts to the wall outlet.

In certain implementations, the second interface part includes an optical adapter that holds the fiber optic connector at the first end of the patchcord. The optical adapter defines a port configured to receive the fiber optic connector at the second end of the cable when the patchcord storage arrangement mounts to the wall outlet.

In certain implementations, the wall outlet includes a first spool arrangement disposed within a base. The first spool arrangement is rotatable relative to the base to dispense the cable. The base defines the port. The first spool arrangement defines the first interface part.

In certain examples, the patchcord storage arrangement includes a cover mounted over a second spool arrangement. The cover is rotatable relative to the second spool arrangement to dispense the patchcord. In examples, the second spool arrangement is rotationally stationary relative to the first spool arrangement.

In certain implementations, the port defined by the wall outlet is lined with a gasket to generate friction as the cable is dispensed.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the embodiments disclosed herein are based.

BRIEF DESCRIPTION OF THE DRAWINGS

The accompanying drawings, which are incorporated in and constitute a part of the description, illustrate several aspects of the present disclosure. A brief description of the drawings is as follows.

DETAILED DESCRIPTION

Reference will now be made in detail to exemplary aspects of the present disclosure that are illustrated in the accompanying drawings. Wherever possible, the same reference numbers will be used throughout the drawings to refer to the same or like parts.

Figure 1:
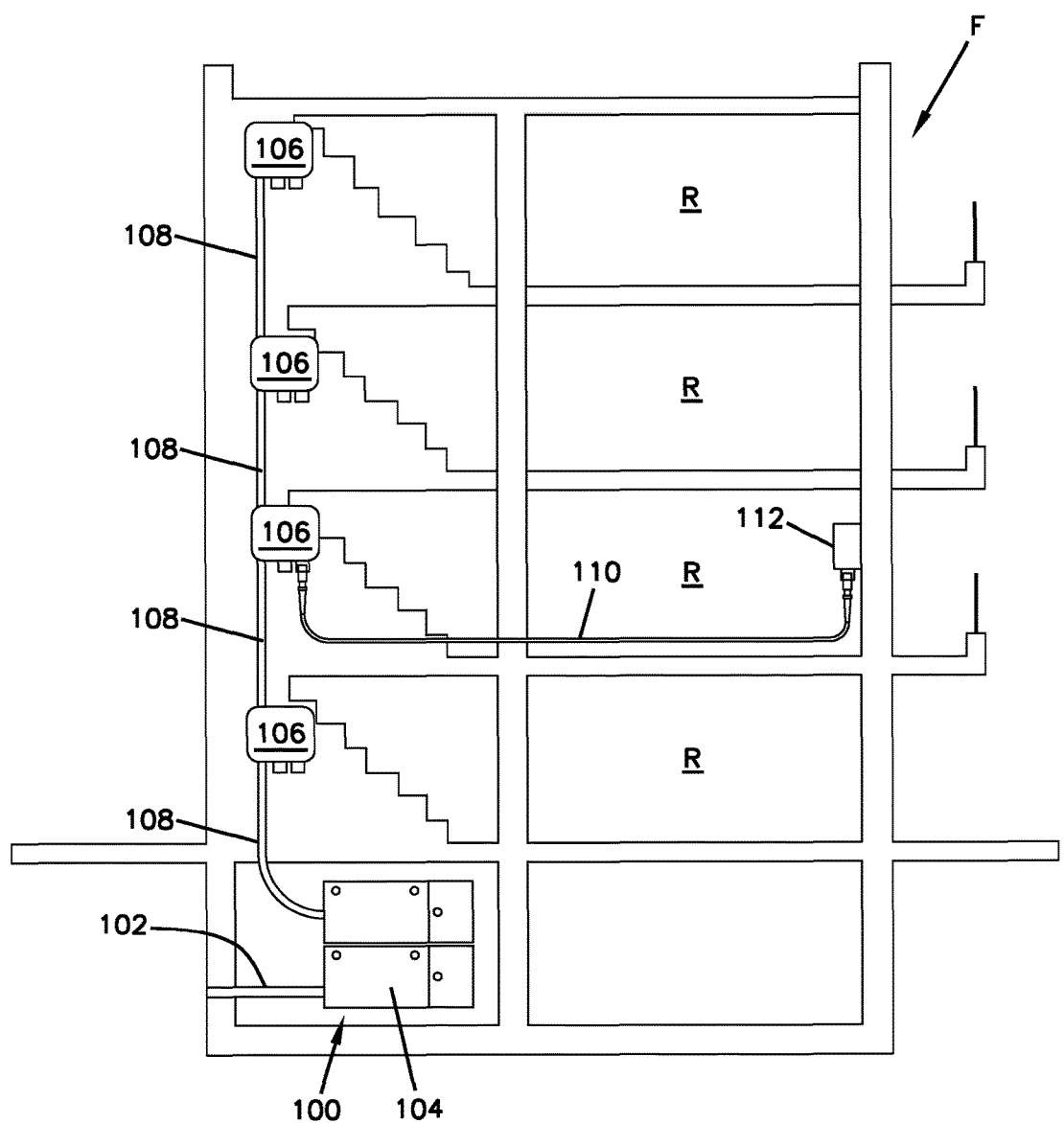
FIG. 1 is a schematic representation of a fiber optic network disposed in a facility.

FIG. 1 is a schematic representation of a fiber optic network 100 disposed in a facility F. In examples, the facility F includes multiple individual residences R (e.g., apartments, condominiums, businesses, etc.). In the example shown, the facility F includes five floors, including a basement, that each have one or more residences R located thereat. In other examples, the facility F can have a greater or lesser number of floors.

The fiber optic network 100 includes a feeder cable 102 from a central office (not shown). The feeder cable 102 enters a feeder cable input location 104 (e.g., a fiber distribution hub, a network interface device, etc.) disposed at the facility F (e.g., in the basement of the facility). The fiber distribution hub 104 has one or more optical splitters (e.g., 1-to-8 splitters, 1-to-16 splitters, or 1-to-32 splitters) that generate a number of individual fibers.

At least one fiber optic enclosure 106 is mounted at each floor of the facility F. In the example shown, a fiber optic enclosure 106 is mounted at each floor above the basement. The individual fibers generated by the optical splitters are routed to the fiber optic enclosures 106 via one or more riser cables 108. Examples of fiber optic enclosures 106 suitable for use in the fiber optic network 100 can be found in U.S. Publication No. 2013/0094828, the disclosure of which is hereby incorporated herein by reference.

Subscriber cables 110 are routed from the fiber optic enclosures 106 to respective residences R. The subscriber cable 110 includes an optical fiber disposed in a jacket or protective tubing. In some implementations, a subscriber cable 110 is routed to a transition box at the respective residence R. In other examples, a subscriber cable 110 is routed through the walls of the residence R (e.g., within ducts) towards a wall outlet 112.

Figure 2:
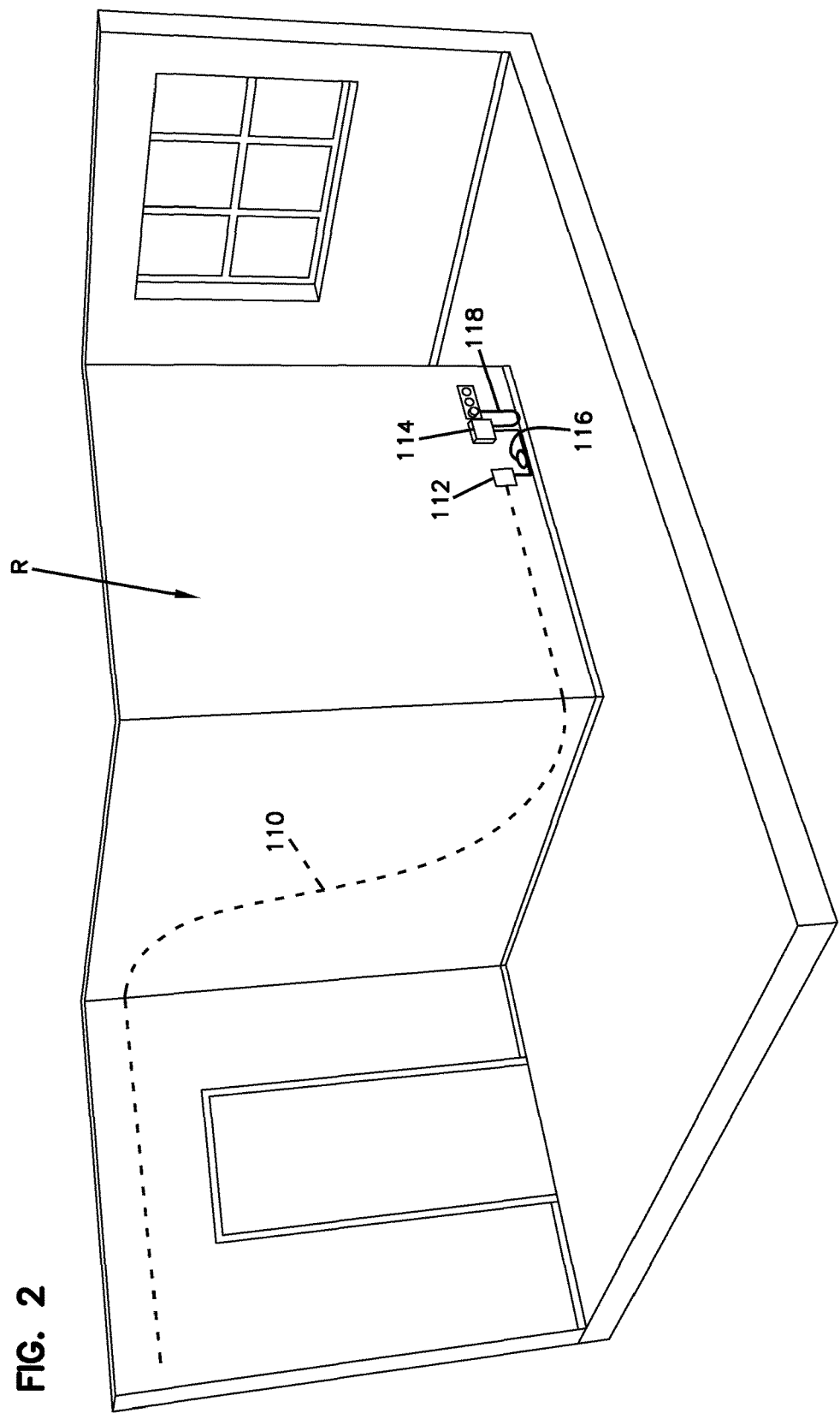
FIG. 2 is a schematic representation of an example residence in which a subscriber cable is deployed to a wall outlet box.

FIG. 2 is a schematic representation of an example residence R including walls and a floor defining a room. A wall box 112 is disposed at a desirable location within the residence R for optical and/or optoelectronic equipment. In some implementations, the subscriber cable 110 extends through ducts in the wall and enters the residence R behind the wall outlet 112. In other implementations, the subscriber cable 110 enters the residence and extends over the wall to the wall outlet 112. In certain implementations, the subscriber cable 110 can be routed through the room by adhesively affixing the subscriber cable 110 to the walls, floor, ceiling, and/or moldings within the room.

The wall box 112 serves as a demarcation point within the residence R for the optical service provider. The subscriber cable 110 is optically coupled to an optical connector at the wall outlet 112. Accordingly, optical signals carried by the subscriber cable 110 are available at the optical connector.

In some implementations, the optical connector terminates the subscriber cable 110. In some examples, the end of the subscriber cable 110 can be fully connectorized with optical connector so that the end can be plugged into a corresponding port at the wall outlet 112. The terminated end can be factory installed and factory inspected prior to installation in the field. In other examples, the subscriber cable 110 can have a partially terminated end that is fully connectorized as optical connector in the field and plugged into a port at the wall outlet 112. Partially terminated ends can be advantageously routed through small ducts to facilitate passage through walls of the residence R. The partially terminated end can be quickly installed in the field without tools, such as an optical fusion splicer.

In other implementations, the optical connector terminates a pigtail that is optically coupled to the subscriber cable 110. In an example, the pigtail is spliced (e.g., fusion spliced or mechanically spliced) to an unterminated end of the subscriber cable 110. Unterminated ends can be advantageously routed through small ducts to facilitate passage through walls of the residence R. In another example, another connectorized end of the pigtail is connected to a connectorized end of the subscriber cable 110 at an adapter disposed at the wall outlet 112.

A user can choose to connect an optical network terminal (ONT) 114 or other equipment to the connector of the wall outlet 112 to connect the ONT 114 or other equipment to the fiber optic network 100. For example, a jumper cable 116 can extend between the ONT 114 and the wall outlet 112. The ONT 114 also can have a power cord 118 that plugs into an electrical outlet to provide power to the ONT 114.

In accordance with some aspects of the disclosure, a storage device is configured to hold a coil of cable. A first end of the cable can be selectively dispensed from the storage device. The storage device provides access to the second end of the cable (directly or via a port). In some example implementations, the storage device can be disposed at the cable input location 104. The first end of the cable can be dispensed from the storage device, routed through the facility F (e.g., via a pulling wire), and be plugged into the fiber optic enclosure 106. In such examples, the cable functions as the riser cable 108.

In other implementations, the storage device can be disposed within the residence R and used as a wall outlet. In some such implementations, the first end of the cable can be routed from the wall outlet, through the residence R (e.g., through the walls, over the walls, etc.), and plugged into the fiber optic enclosure 106 to connect the wall outlet to the fiber optic network 100. In other such implementations, the first end of the cable can be plugged into the fiber optic enclosure 106, routed into the residence R, and mounted as a wall outlet. A jumper cable 116 can be optically coupled to the second end of the cable at the wall outlet.

In still other example implementations, the storage device can be disposed at the fiber optic enclosure 106. In such implementations, the first end of the cable can be routed into the residence R and plugged into a port of a wall outlet disposed within the residence. In certain examples, the second end of the cable defines a stub length capable of extending a short distance from the storage device to plug into the fiber optic enclosure 106.

In some implementations, the first end of the cable is partially connectorized by terminating the first end at an optical ferrule that does not have a surrounding connector body. The partially connectorized end can be pushed or pulled through ducting in the wall to route the cable between the fiber optic enclosure 106 and either the residence R or the cable input location 104. Upon reaching its destination, the partially connectorized end can be fully connectorized by adding a connector body around the optical ferrule. In other implementations, the first end of the cable can be fully connectorized in the factory prior to deployment.

Figure 3:
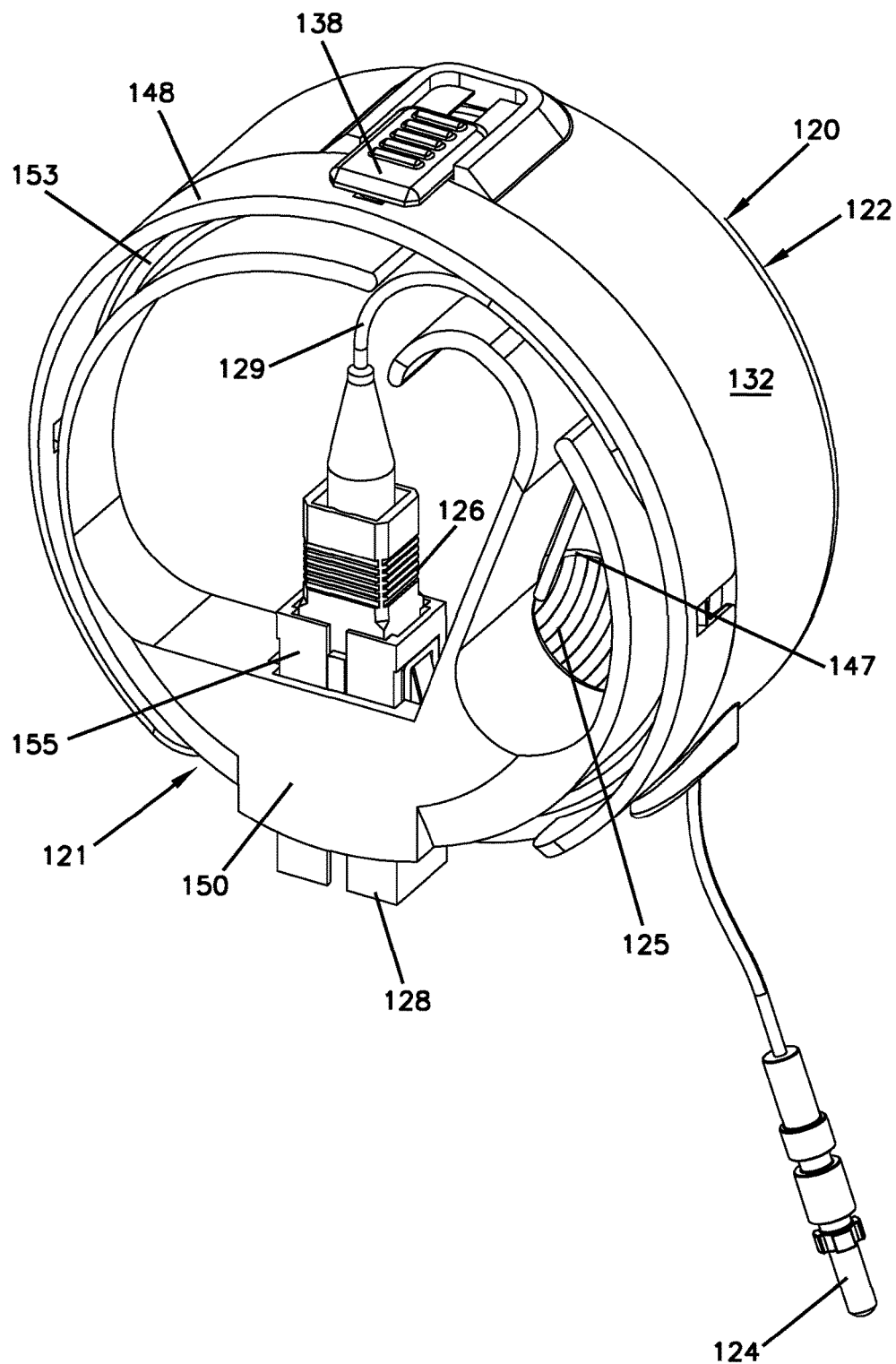
FIG. 3 is a perspective view of an example storage device including a spool arrangement and a base in accordance with the principles of the present disclosure.
Figure 4:
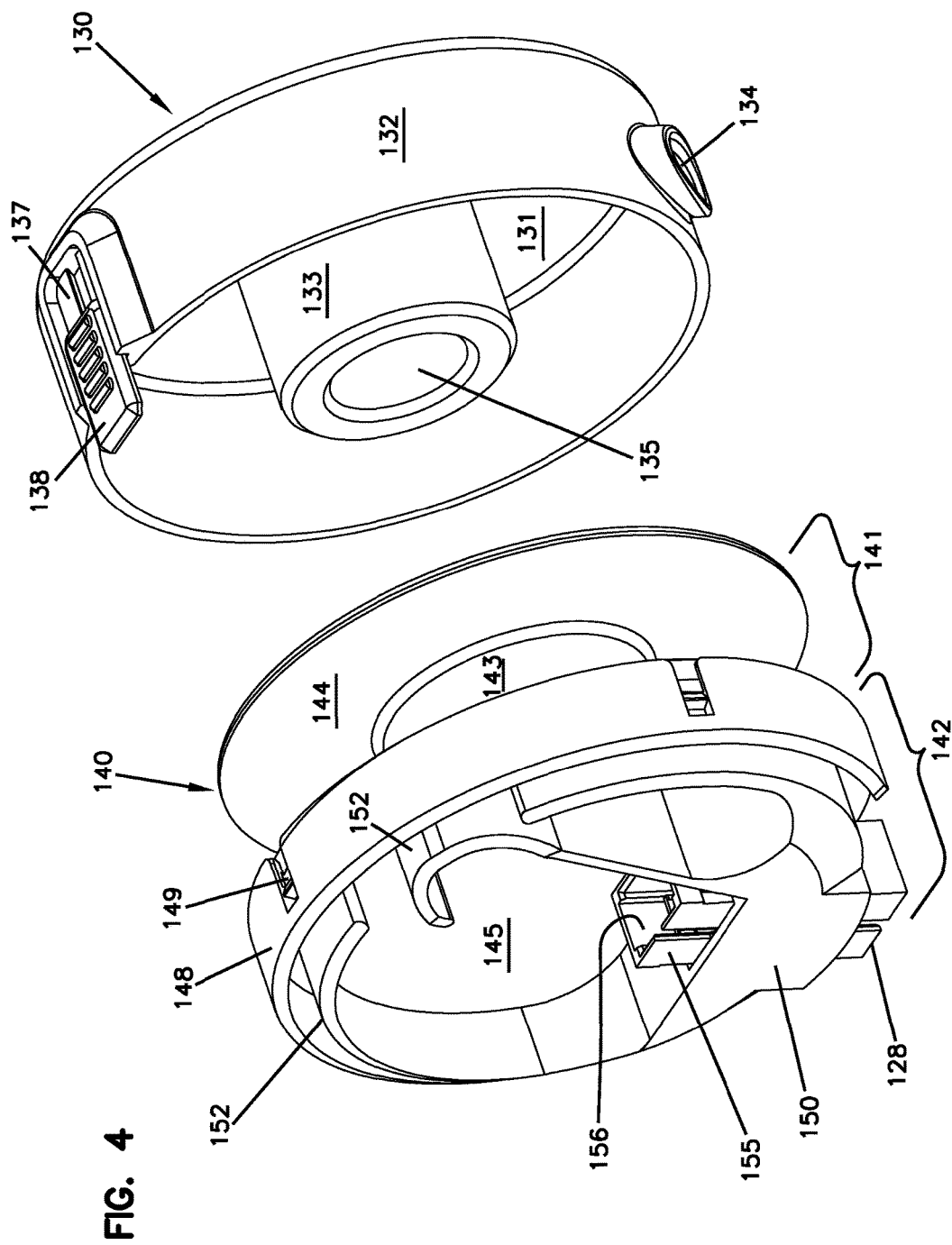
FIG. 4 shows the storage device of FIG. 3 with the spool arrangement exploded from the base.
Figure 5:
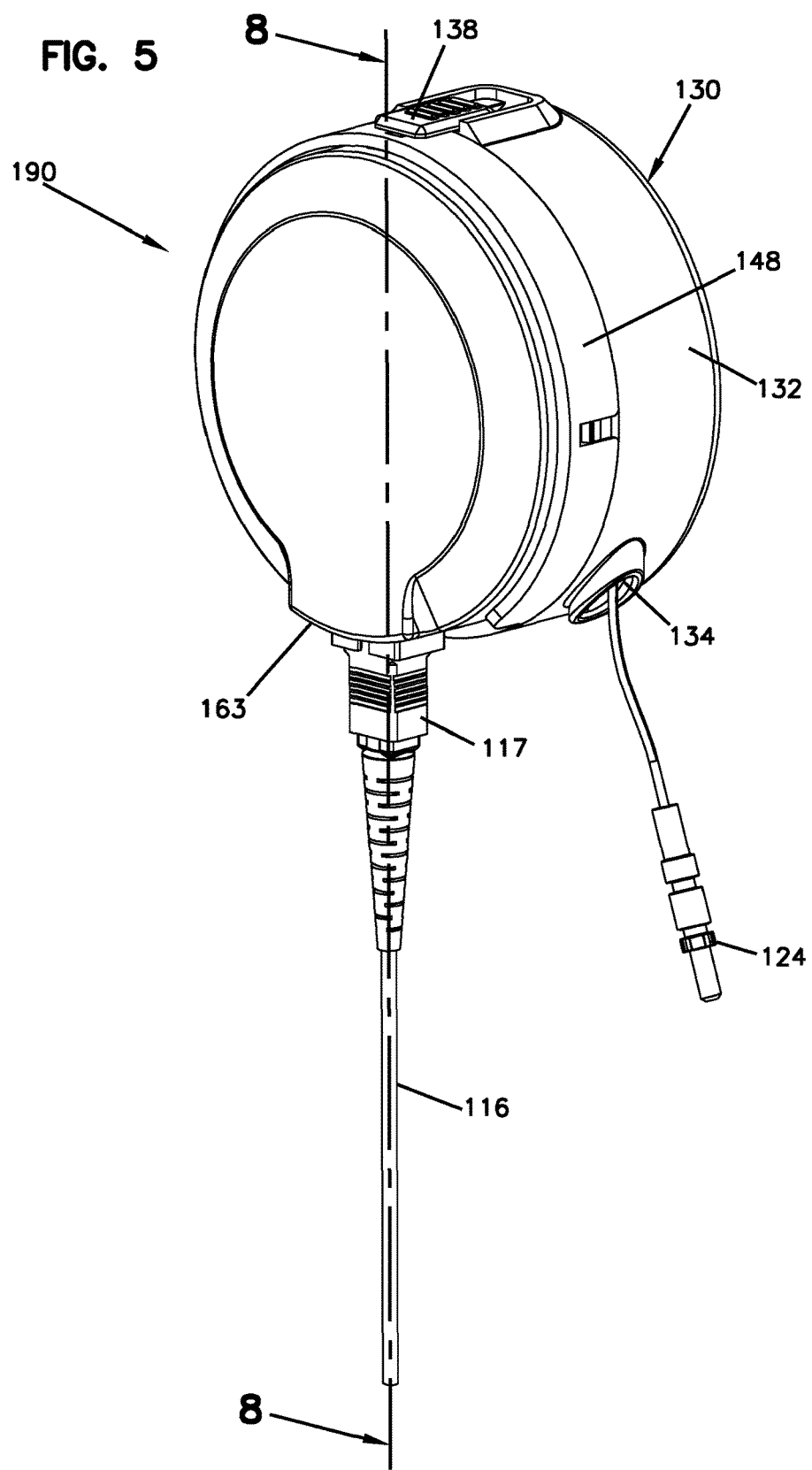
FIG. 5 is a perspective view of a first example storage arrangement including the storage device of FIG. 3.
Figure 6:
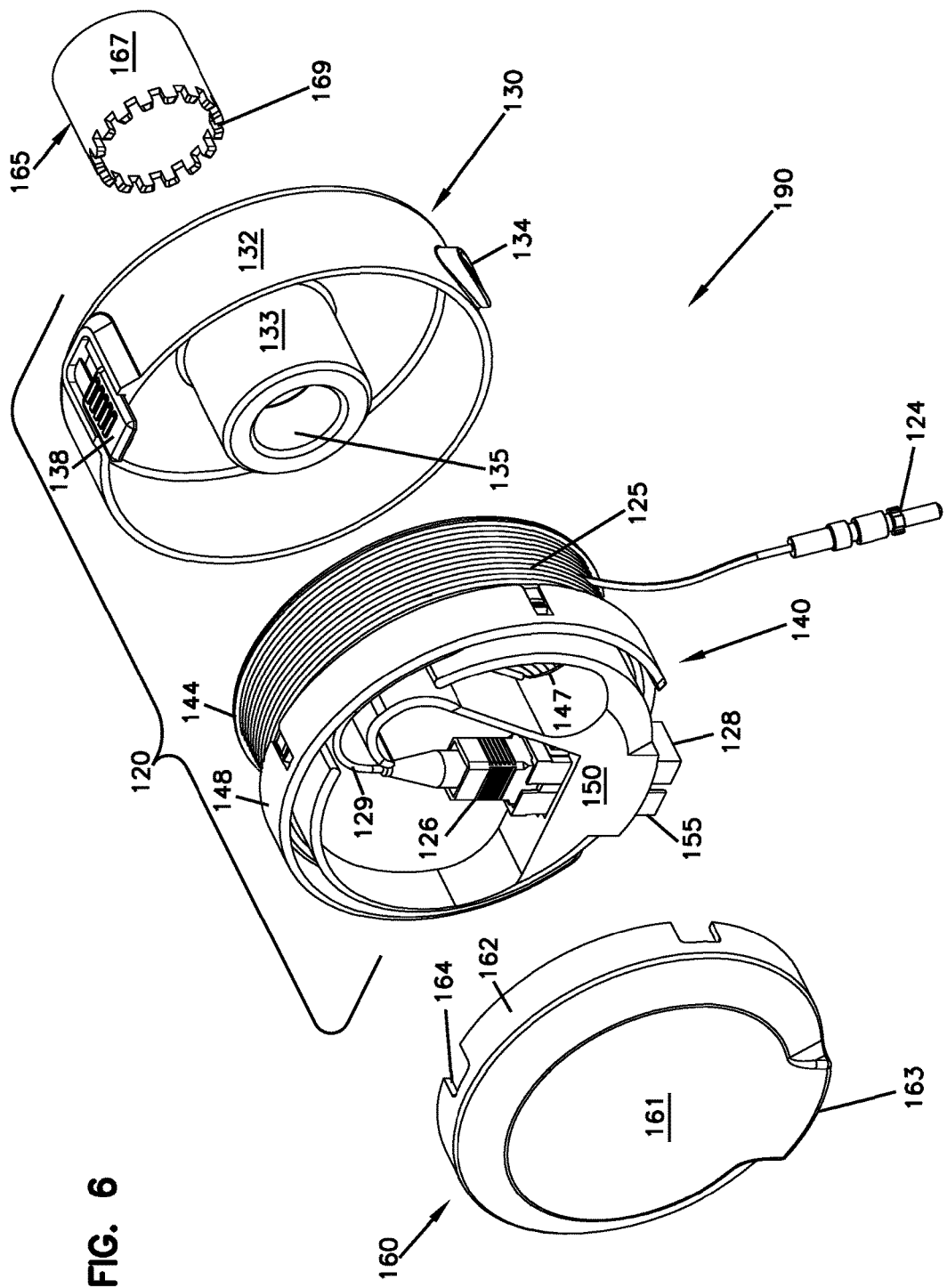
FIG. 6 is an exploded view of the storage arrangement of FIG. 5.

Referring to FIGS. 3-4, a first example storage device 120 configured in accordance with the principles of the present disclosure is shown. The storage device 120 has a front 121 and a rear 122. The rear 122 of the storage device 120 faces a mounting surface (e.g., a wall within the residence, an outlet within a wall of the residence, etc.). The storage device 120 is configured to hold cable (e.g., a fiber optic cable) 125. In examples, the fiber optic cable includes an optical fiber surrounded by a protective jacket or coating. The cable 125 extends between a first end 124 and a second end 126. The first end 124 of the cable 125 can be paid out from the storage device 120 by pulling on the first end 124. In the example shown, the first end 124 is partially connectorized.

As shown in FIG. 4, the storage device 120 includes a base 130 and a spool arrangement 140. The base 130 defines the rear 122 of the storage device 120 and the spool arrangement 140 defines the front 121 of the storage device 120. The spool arrangement 140 is configured to rotate relative to the base 130. The spool arrangement 140 has a drum region 141 and a management region 142 that rotate unitarily relative to the base 130. The drum region 141 is configured to hold a majority of the cable 125. The base 130 defines a port 134 through which the first end 124 of the cable 125 extends when the spool arrangement 140 is mounted to the base 130.

The management region 142 of the spool arrangement 140 includes a mounting structure 150 configured to hold the second end 126 of the cable 125. In some implementations, the mounting structure 150 is configured to provide access to the second end 126 of the cable 125 from an exterior of the storage device 120. In other implementations, the mounting structure 150 holds an optical adapter 155 having a first port 156 and a second port 128. The first port 156 receives the second end 126 of the cable 125. The second port 128 is accessible from an exterior of the storage device 120 (i.e., a connectorized end 117 of a jumper cable 116 can be plugged into the second port 128).

Still referring to FIGS. 3 and 4, the base 130 includes a sidewall 132 extending outwardly from a perimeter of a mounting wall 131. The sidewall 132 defines the port 134. A spool mounting structure 133 (e.g., a spindle) extends outwardly from a central portion of the mounting wall 131. In certain examples, the spool mounting structure 133 defines a cavity 135 that leads to ledge 136 facing towards the mounting wall 131.

The spool arrangement 140 includes a drum 143 defining a bend radius limiter. A flange 144 extends radially outwardly from a first axial end of the drum 143. In certain examples, one or more ridges 144a or other protrusion are disposed on the flange 144 and seats on the mounting wall 131 of the base 130 when the spool arrangement 140 is mounted to the base 130. The ridge 144a facilitates rotating the spool arrangement 140 relative to the base 130.

The management region 142 is disposed at the second axial end of the drum 143. The management region 142 includes a routing surface 145 that defines an aperture 147 extending between the drum region 141 and the management region 142. The second end 126 of the cable 125 extends from the drum region 141, through the aperture 147, to the management region 142.

Figure 8:
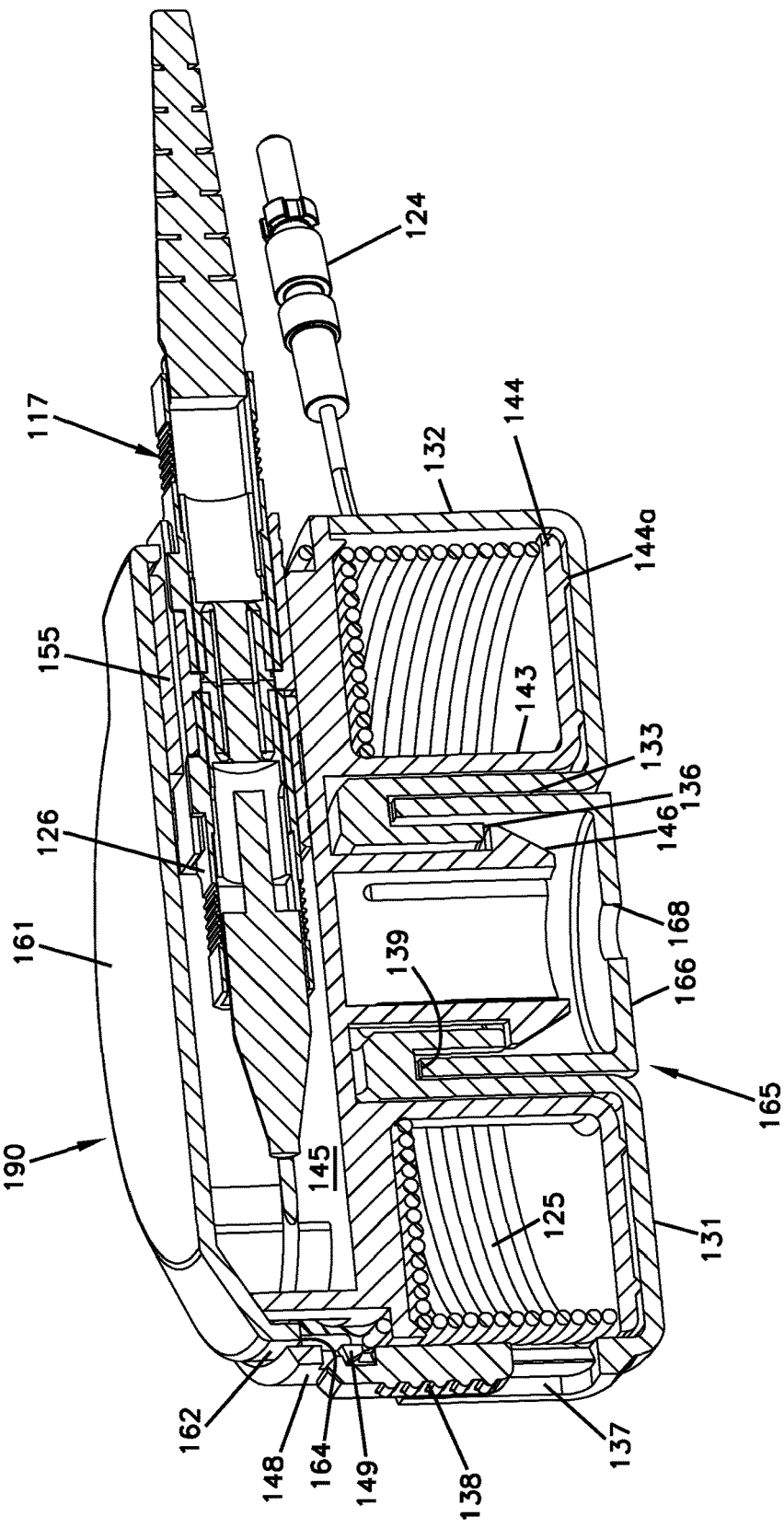
FIG. 8 is a cross-sectional view of the storage arrangement of FIG. 5 taken along the 8-8 line of FIG. 5 with some of the cable removed for clarity.

Latching hooks 146 extend within the drum 143 away from the management region 142 and towards the flange 144. The latching hooks 146 can be inserted into the cavity 135 of the spool mounting structure 133 until the latching hooks 146 engage the ledge 136 (see FIG. 8). The latching hooks 146 hold the spool arrangement 140 to the base 130 while allowing rotation of the spool arrangement 140 relative to the base 130.

Guides 152 at the management region 142 define a routing pathway 153 along which the second end 126 of the cable 125 is routed from the aperture 147 to the mounting structure 150. In certain examples, a sidewall 148 extends outwardly from the routing surface 145. The sidewall 148 cooperates with the guides 152 to define the routing pathway 153.

In certain implementations, the guides 152 route the second end 126 of the cable 125 in one or more loops around the management region 142 to provide a stub length 129 of cable 125. If desired, the second end 126 of the cable 125 can be freed from the mounting structure 150 and unwound from the routing pathway. Accordingly, the stub length 129 can be routed off the routing surface 145 so that the second end 126 of the cable 125 is disposed external of the storage device 120. In certain examples, the second end 126 can be plugged into an optical adapter external of the storage device 120.

In some implementations, the spool arrangement 140 is configured to rotationally lock in a fixed position relative to the base 130. For example, when the first end 124 of the cable 125 has been sufficiently paid out from the storage device 120, the spool arrangement 140 can be locked to the base 130 to inhibit further dispensing of the cable 125. In certain implementations, the spool arrangement 140 can be locked into one of a plurality of predetermined positions.

In the example shown, the base 130 includes a slider member 138 that is configured to slide along a channel 137 defined by the sidewall 132 of the base 130. The sidewall 148 of the spool arrangement 140 defines a plurality of stop members 149 around a circumference of the sidewall 148. The slider 138 can be slide towards the spool arrangement 140 until a portion of the slider 138 engages one of the stop members 149 to inhibit relative rotation between the spool arrangement 140 and the base 130 (e.g., see FIG. 8).

FIGS. 5-8 illustrate one example storage arrangement 120A utilizing the storage device 120 of FIGS. 3 and 4. The storage arrangement 120A includes a mounting member 165 that facilitates mounting the storage device 120 to a surface (e.g., a wall). In certain implementations, the mounting member 165 allows the storage device 120 to be mounted to the surface in one of a plurality of predetermined rotational positions. In certain examples, the mounting member 165 is utilized when the sidewall 132 of the base 130 defines the port 134.

The mounting member 165 includes a mounting surface 166 and a sidewall 167 extending upwardly from the mounting surface 166. The mounting surface 166 defines a fastener hole 168 through which a screw, bolt, or other fastener can be inserted to hold the mounting member 165 to the surface. The base 130 can be mounted over the mounting member 165 so that the mounting member 165 extends into the cavity 135 defined by the spool mounting structure 133. For example, the spool mounting structure 133 may define an internal recess 139 into which the sidewall 167 of the mounting member 165 can extend (e.g., see FIG. 8).

Figure 7:
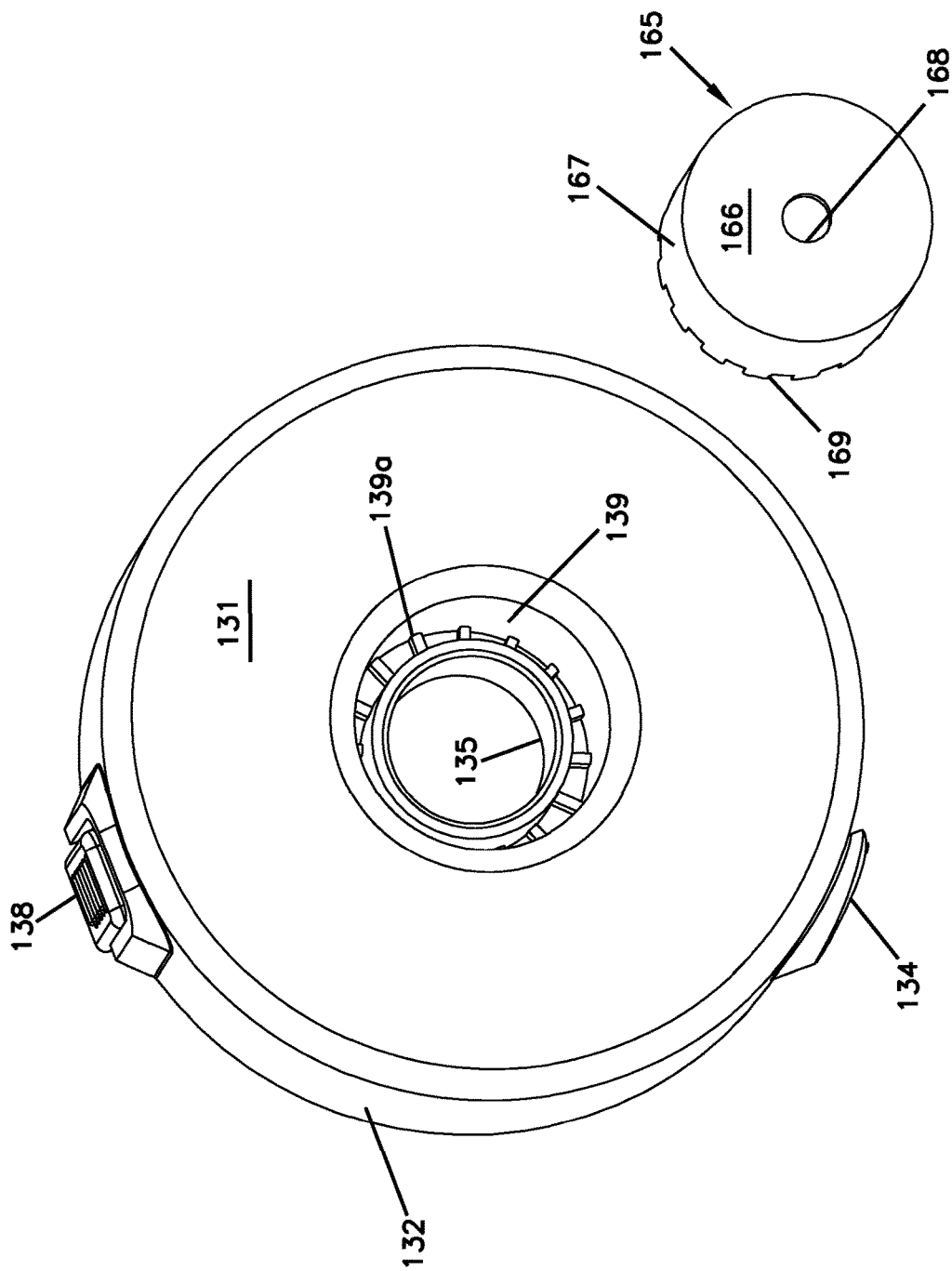
FIG. 7 is a rear perspective view of the storage arrangement of FIG. 5 with a mounting member exploded outwardly from the storage device.

In certain implementations, the sidewall 167 of the mounting member 165 defines crenellations opposite the mounting surface 166. As shown in FIG. 7, the base 130 defines an annular recess 139 surrounding the cavity 135 in the spool mounting structure 133. The annular recess 139 is accessible from the rear of the base 130. A series of stop members 139a are disposed within the annular recess 139. When the base 130 is mounted over the mounting member 165, the stop members 139a engage the crenellations 169 to rotationally lock the base 130 relative to the mounting member 165. To rotate the base 130 relative to the wall, the base 130 is partially withdrawn from the mounting member 165, rotated as desired, and replaced on the mounting member 165.

In certain implementations, the storage arrangement 120A also includes a cover 160 configured to be disposed over the management region 142 of the storage device 120. The cover 160 provides protection to the second end 126 of the cable 125. In some implementations, the cover 160 is disposed fully within an outer perimeter of the storage device 120. In certain implementations, the cover 160 is disposed fully within an outer perimeter of the spool arrangement 140.

The cover 160 includes a covering surface 161 from which an annular sidewall 162 extends. The sidewall 162 defines a port 163 that aligns with the port 128 of the storage device 120 when the cover 160 is mounted to the storage device 120. Accordingly, a connectorized end 117 of a jumper cable 116 can be inserted into the port 128 through the port 163. The sidewall 162 of the cover 160 also defines notches 164 that align with the stop members 149 of the spool arrangement 140 when the cover 160 is mounted to the storage device 120. In certain examples, the sidewall 162 of the cover 160 is disposed between the sidewall 148 of the spool arrangement 140 and the guides 152.

Figure 9:
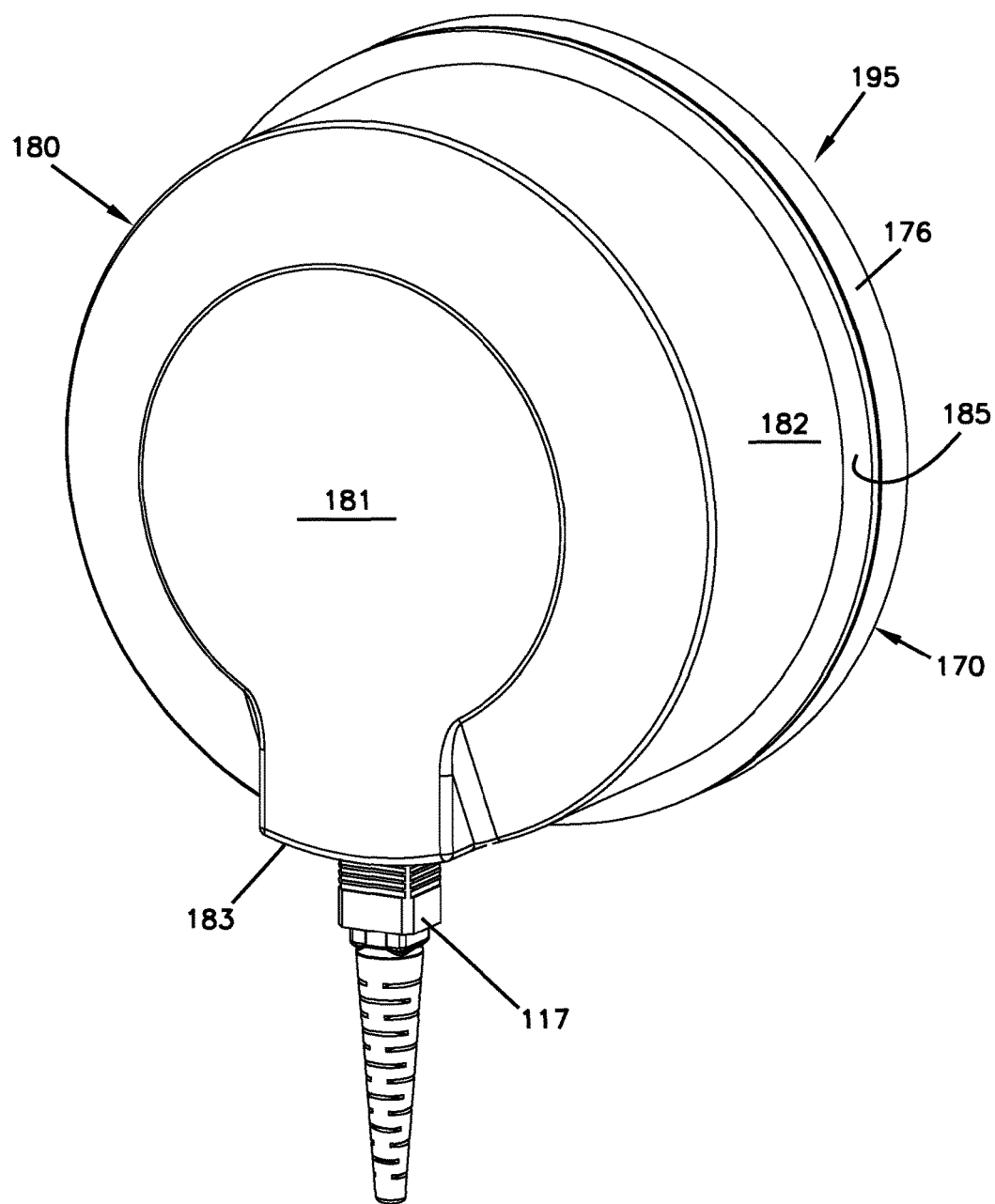
FIG. 9 is a perspective view of a second example storage arrangement including the storage device of FIG. 3.
Figure 10:
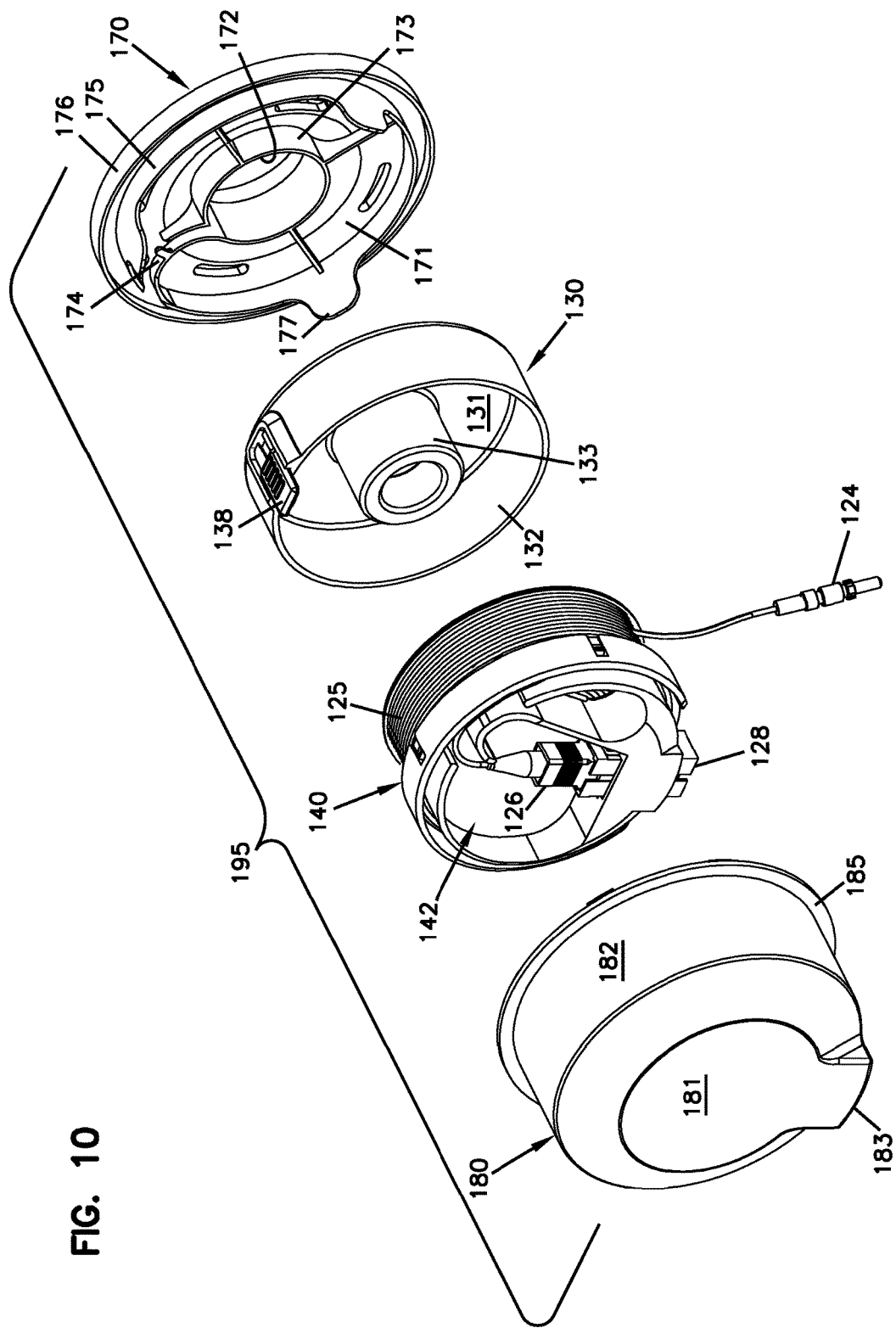
FIG. 10 is a front perspective view of the storage arrangement of FIG. 9 with the components exploded from each other.
Figure 11:
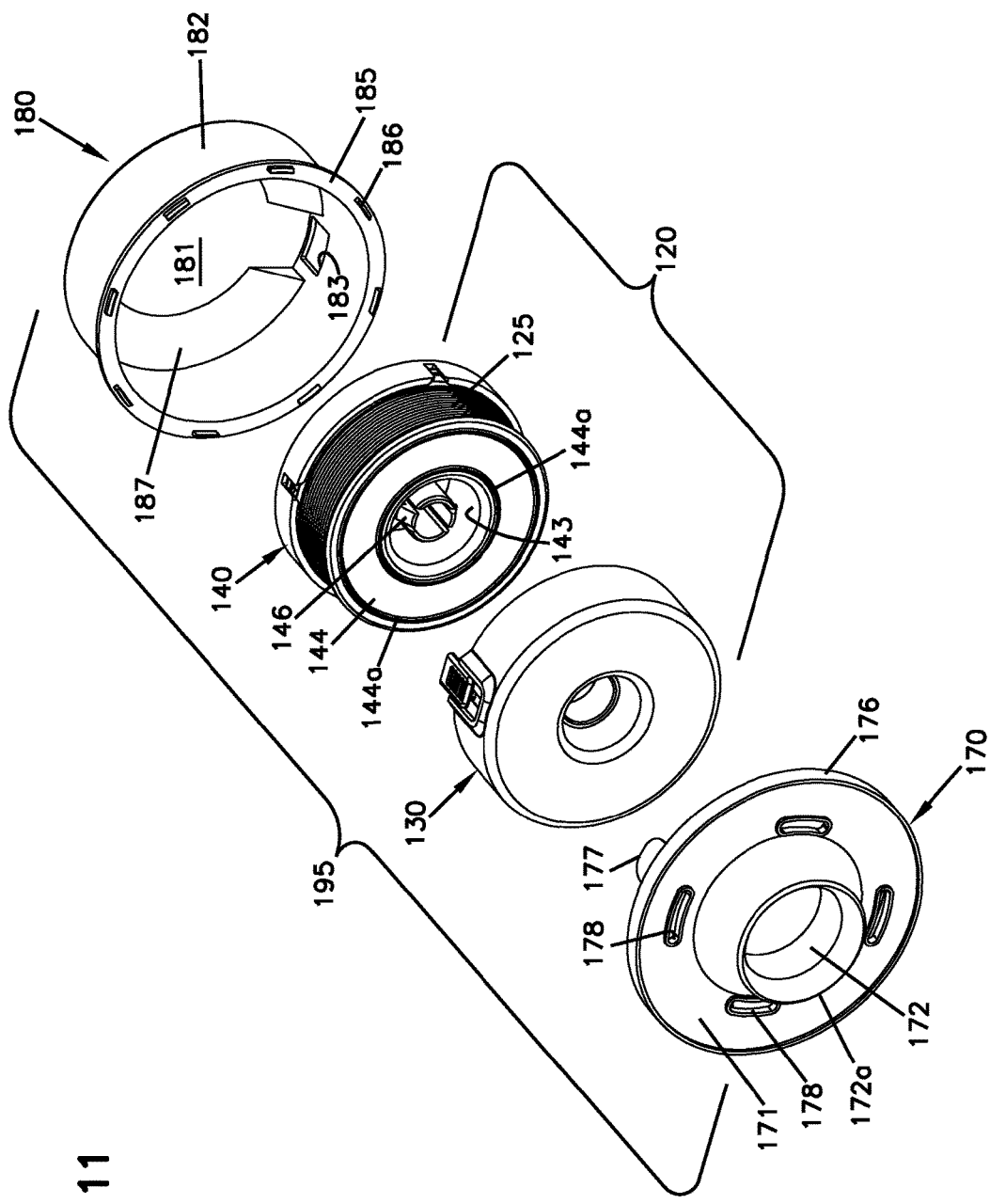
FIG. 11 is a rear perspective view of the storage arrangement of FIG. 10.

FIGS. 9-11 illustrate another example storage arrangement 120B utilizing the storage device 120 of FIGS. 3 and 4. The storage arrangement 120B includes a mounting member 170 that facilitates mounting the storage device 120 to a surface (e.g., within a wall). In certain implementations, the mounting member 170 facilitates mounting the storage device 120 in one of a plurality of predetermined rotational positions. In certain implementations, the mounting member 170 allows the first end 124 of the cable 125 to be paid out through the rear of the storage device 120.

The mounting member 170 includes a mounting surface 171 defining a plurality of apertures 178 through which fasteners may be inserted to secure the mounting member 170 to a surface. In the example shown, the apertures 178 are elongated to enable the mounting member 170 to interface with various outlet designs (see FIG. 11). Retention members 177 extend outwardly from the mounting surface 171 to hold the base 130 at the mounting member 170. A sidewall 176 also extends outwardly from a perimeter of the mounting surface 171.

A through-passage 172 extends through the mounting surface 171. The through-passage 172 is sized to enable the first end 124 of the cable 125 to pass therethrough. Guides 175 extend outwardly from the mounting surface 171 to define a routing path along a first side of the mounting member 170. The guides 175 include a bend radius limiter 174 leading from an outer routing path to the through-passage 172 (see FIG. 10). In such implementations, the base 130 is configured to enable the first end 124 of the cable 125 to reach the routing path of the mounting member 170. For example, the mounting wall 131 or sidewall 132 of the base 130 may define an aperture through which the first end 124 may pass. In certain examples, a distal end of the through-passage 172 tapers radially outwardly to define a radiused exit from the mounting member 170 (see FIG. 11).

In certain implementations, the storage arrangement 120B also includes a cover 180 configured to be disposed over the management region 142 of the storage device 120. The cover 180 provides protection to the second end 126 of the cable 125. In some implementations, the cover 180 encloses an outer perimeter of the storage device 120. In certain implementations, the cover 160 is mounted to the mounting member 170. In certain examples, a perimeter of the cover 160 is disposed within the sidewall 176 of the mounting member 170.

The cover 180 includes a covering surface 181 from which an annular sidewall 182 extends. The sidewall 182 defines a port 183 (FIG. 11) that aligns with the port 128 of the storage device 120 when the cover 180 is mounted to the storage device 120. Accordingly, a connectorized end 117 of a jumper cable 116 can be inserted into the port 128 through the port 183. The cover 180 also includes a brim 185 that extends radially outwardly from the sidewall 182. In certain examples, locking and/or alignment members 186 are disposed on the brim 185. In certain examples, an interior of the cover 180 defines a ramped transition surface between the covering surface 181 and the sidewall 182.

Figure 12:
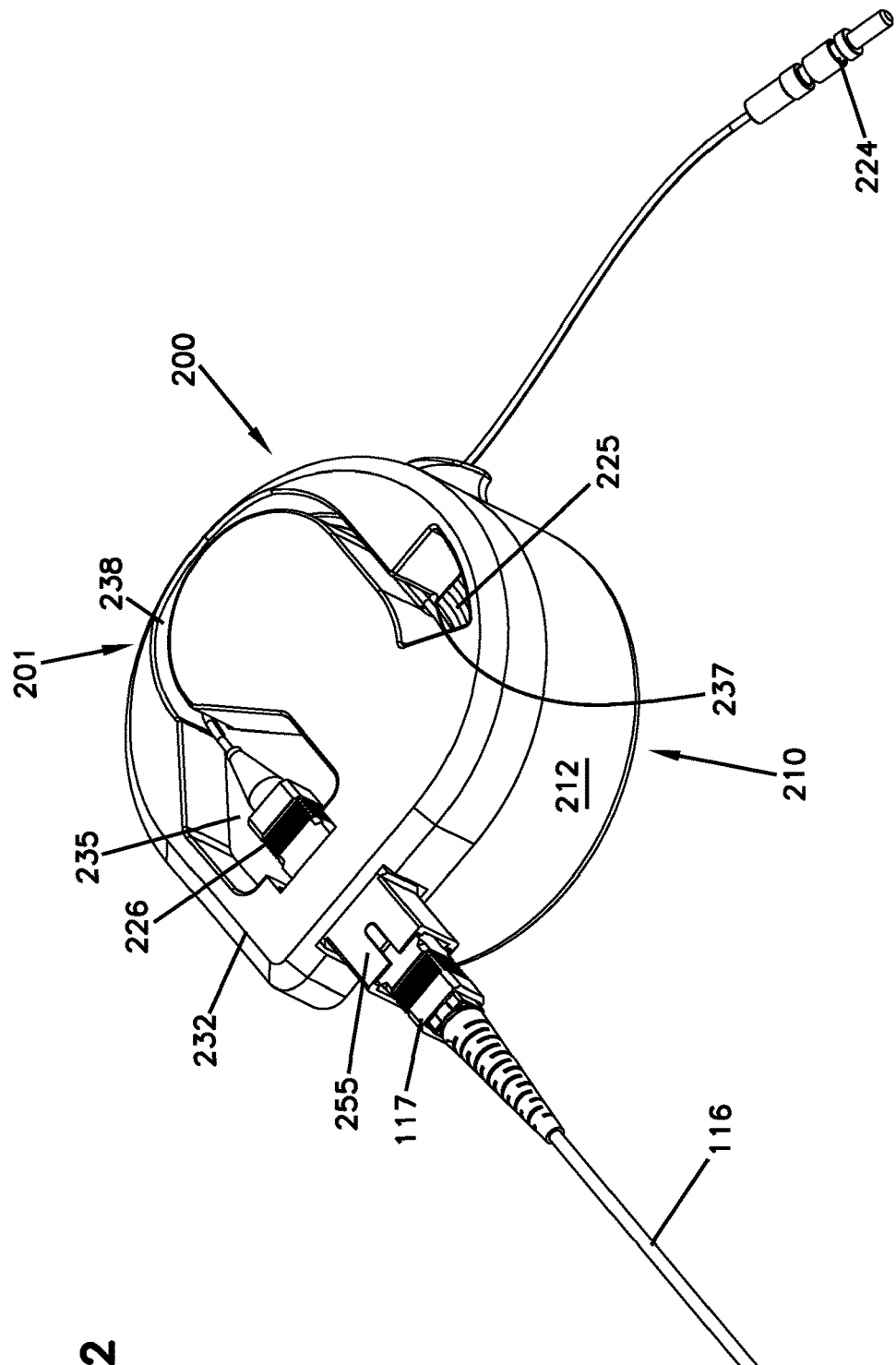
FIG. 12 is a front perspective view of a second example storage device including a spool arrangement and a base in accordance with the principles of the present disclosure.
Figure 13:
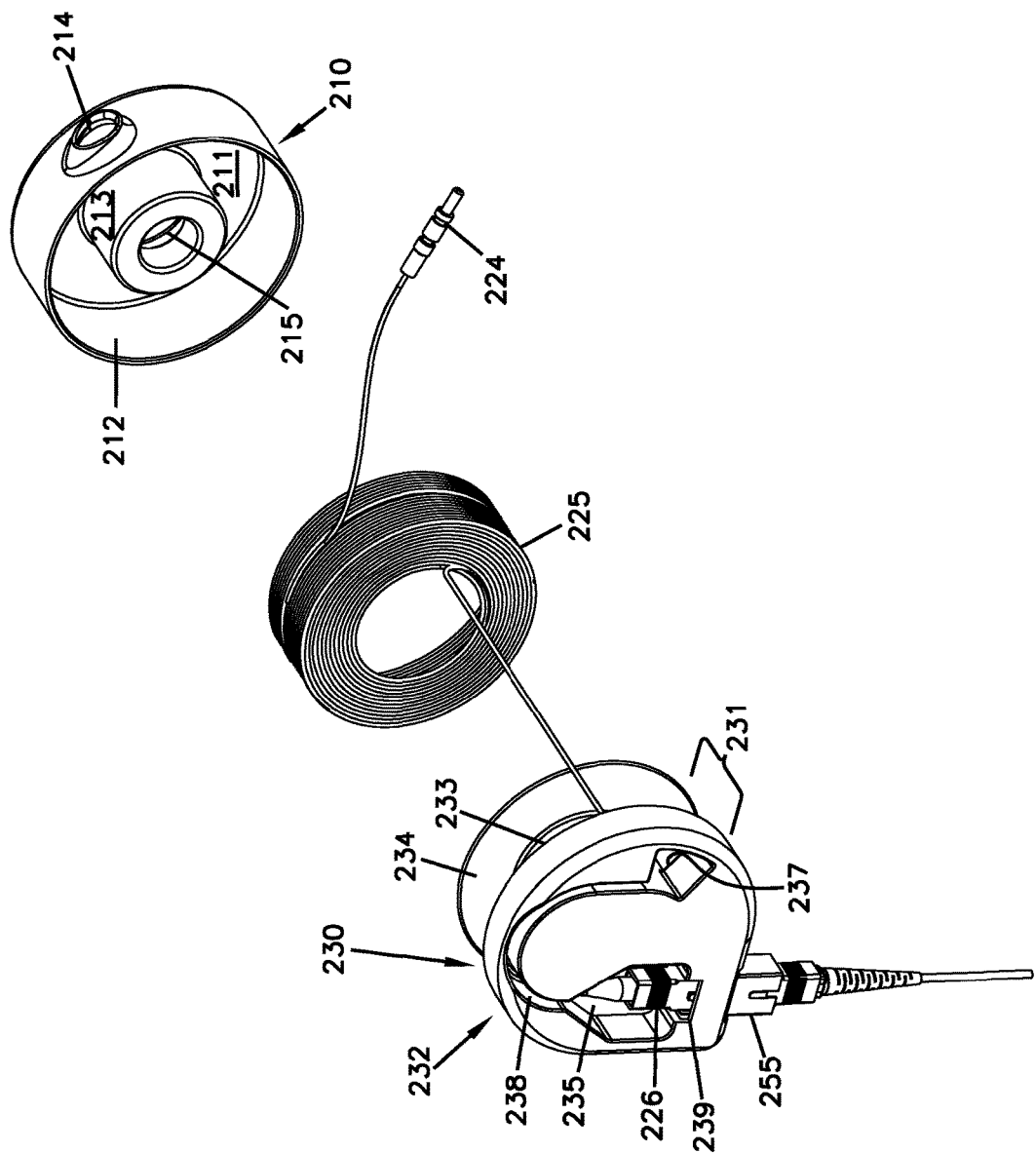
FIG. 13 shows the storage device of FIG. 12 with the spool arrangement, cable, and base exploded from each other.
Figure 14:
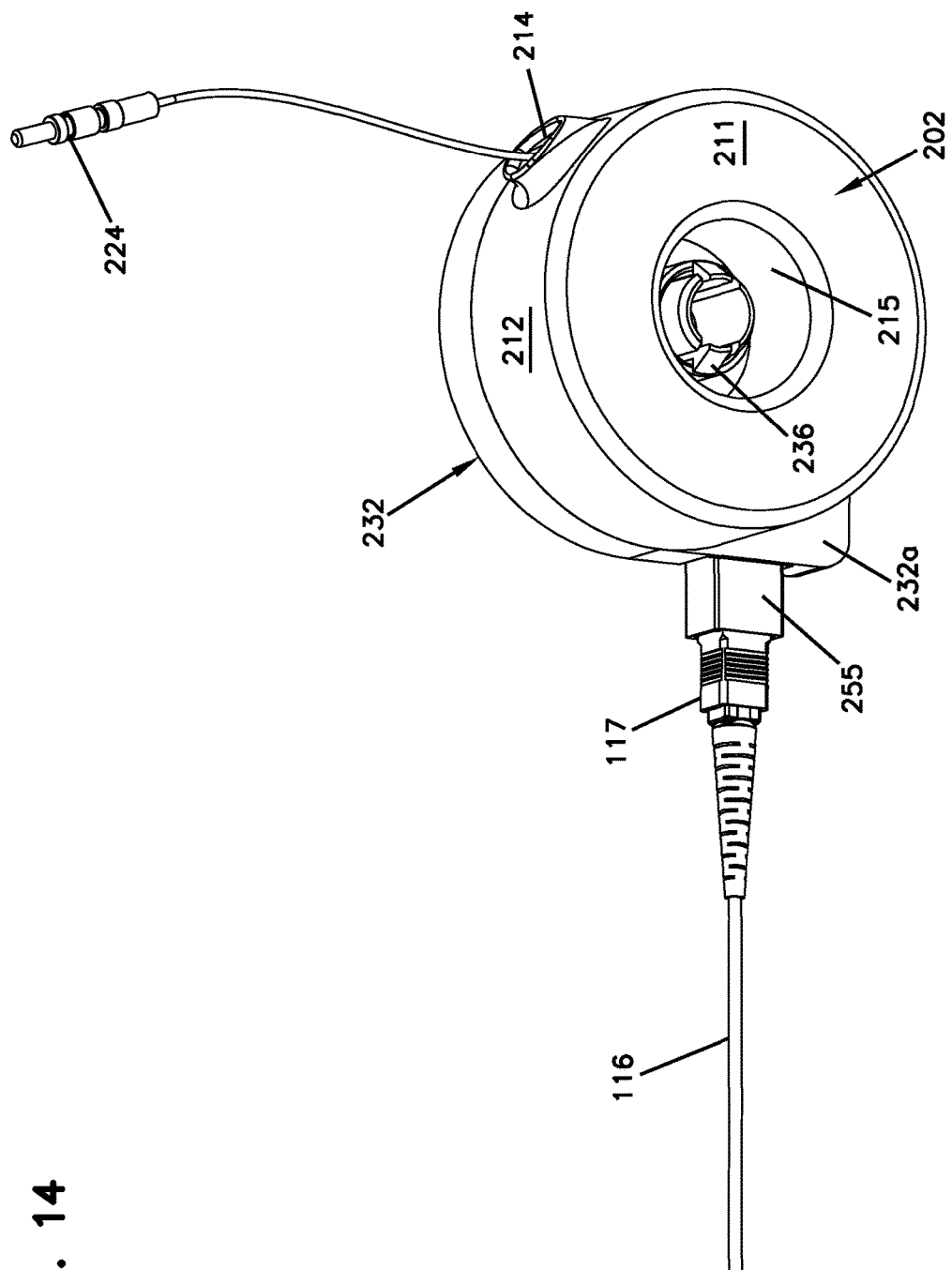
FIG. 14 is a rear perspective view of the storage device of FIG. 12.

Referring to FIGS. 12-14, a second example storage device 200 configured in accordance with the principles of the present disclosure is shown. The storage device 200 has a front 201 (FIG. 12) and a rear 202 (FIG. 14). The rear 202 of the storage device 200 faces a mounting surface (e.g., a wall within the residence, an outlet within a wall of the residence, etc.). The storage device 200 is configured to hold cable (e.g., a fiber optic cable) 225. In examples, the fiber optic cable includes an optical fiber surrounded by a protective jacket or coating. The cable 225 extends between a first end 224 and a second end 226. The first end 224 of the cable 225 can be paid out from the storage device 200 by pulling on the first end 224. In the example shown, the first end 224 is partially connectorized.

As shown in FIG. 13, the storage device 200 includes a base 210 and a spool arrangement 230. The base 210 defines the rear 202 of the storage device 200 and the spool arrangement 230 defines the front 201 of the storage device 200. The spool arrangement 230 is configured to rotate relative to the base 210. The spool arrangement 230 has a drum region 231 and a management region 232 that rotate unitarily relative to the base 210. The drum region 231 is configured to hold a majority of the cable 225. The base 210 defines a port 214 through which the first end 224 of the cable 225 extends when the spool arrangement 230 is mounted to the base 210.

The base 210 includes a sidewall 212 extending outwardly from a perimeter of a mounting wall 211. The sidewall 212 defines the port 214. A spool mounting structure 213 (e.g., a spindle) extends outwardly from a central portion of the mounting wall 211. In certain examples, the spool mounting structure 213 defines a cavity 215. The spool arrangement 230 includes a drum 233 defining a bend radius limiter. A flange 234 extends radially outwardly from a first axial end of the drum 233. Latching hooks 236 (e.g., FIG. 14) also extend within the drum 233.

The management region 232 is disposed at the second axial end of the drum 233. The management region 232 of the spool arrangement 230 defines a channel 238 extending between an aperture 237 and a mounting structure 239. The aperture 237 connects the channel 238 with the drum region 231. The channel 238 inhibits bending of the second end 226 of the cable 225 beyond a maximum bend radius. In some implementations, the mounting structure 239 is configured to hold the second end 226 of the cable 225. In other implementations, the mounting structure 239 is configured to hold an optical adapter 255 having a first port that receives the second end 226 of the cable 225. The optical adapter 255 also defines an externally accessible second port at which a connectorized end of an optical fiber (e.g., connectorized end 117 of the jumper cable 116) can be received. In certain examples, the management region 232 includes a portion 232a that extends outwardly beyond a perimeter of the base 210 to accommodate the optical adapter 255 (e.g., see FIG. 14).

In some implementations, the spool arrangement 230 is configured to rotationally lock in a fixed position relative to the base 210. For example, when the first end 224 of the cable 225 has been sufficiently paid out from the storage device 200, the spool arrangement 230 can be locked to the base 210 to inhibit further dispensing of the cable 225. In certain implementations, the spool arrangement 230 can be locked into one of a plurality of predetermined positions. In an example, the slider 138 of the storage device 120 can be used with the base 210 and spool arrangement 230 of the storage device 200.

Figure 15:
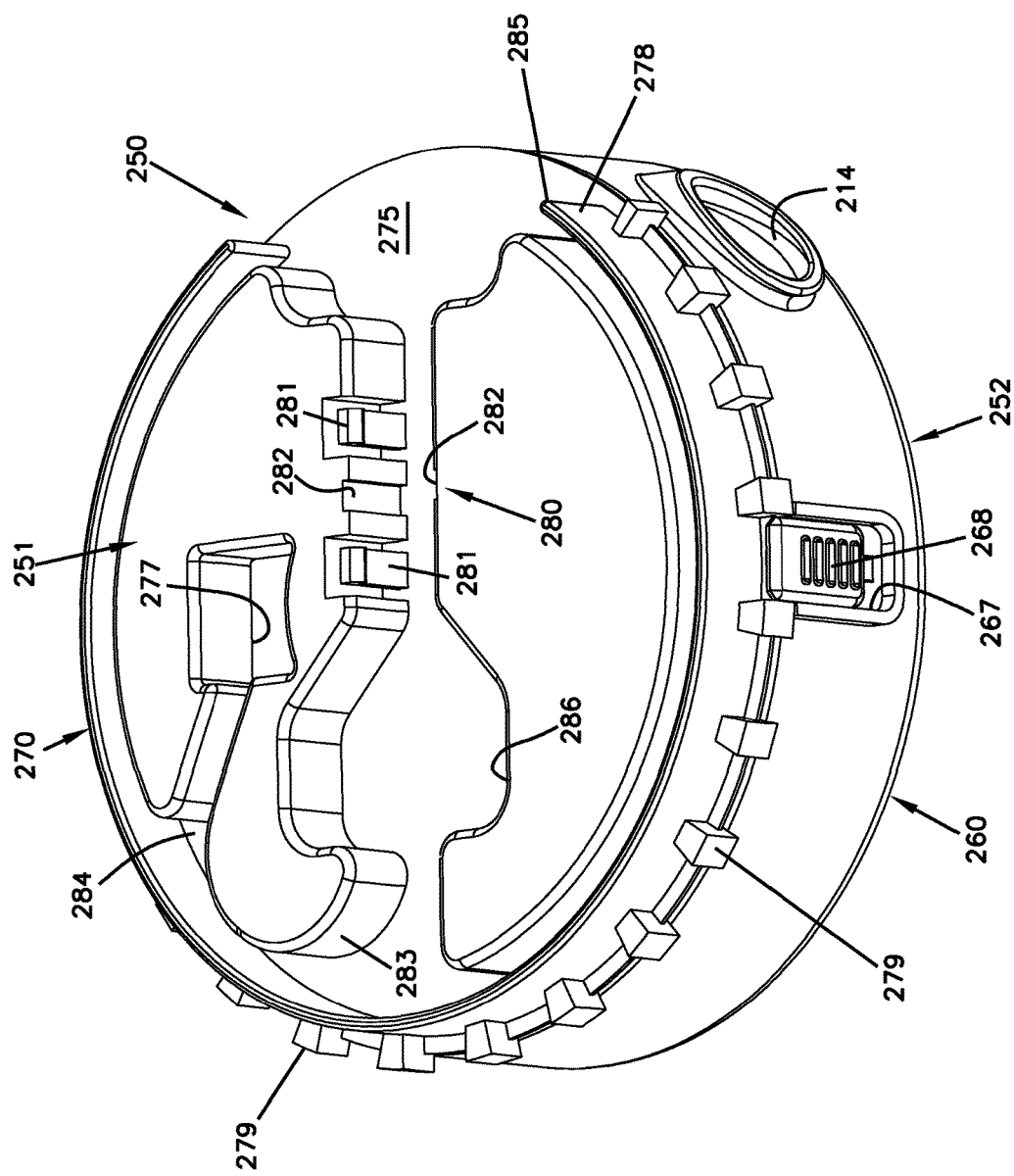
FIG. 15 is a front perspective view of a third example storage device including a spool arrangement and a base in accordance with the principles of the present disclosure.
Figure 16:
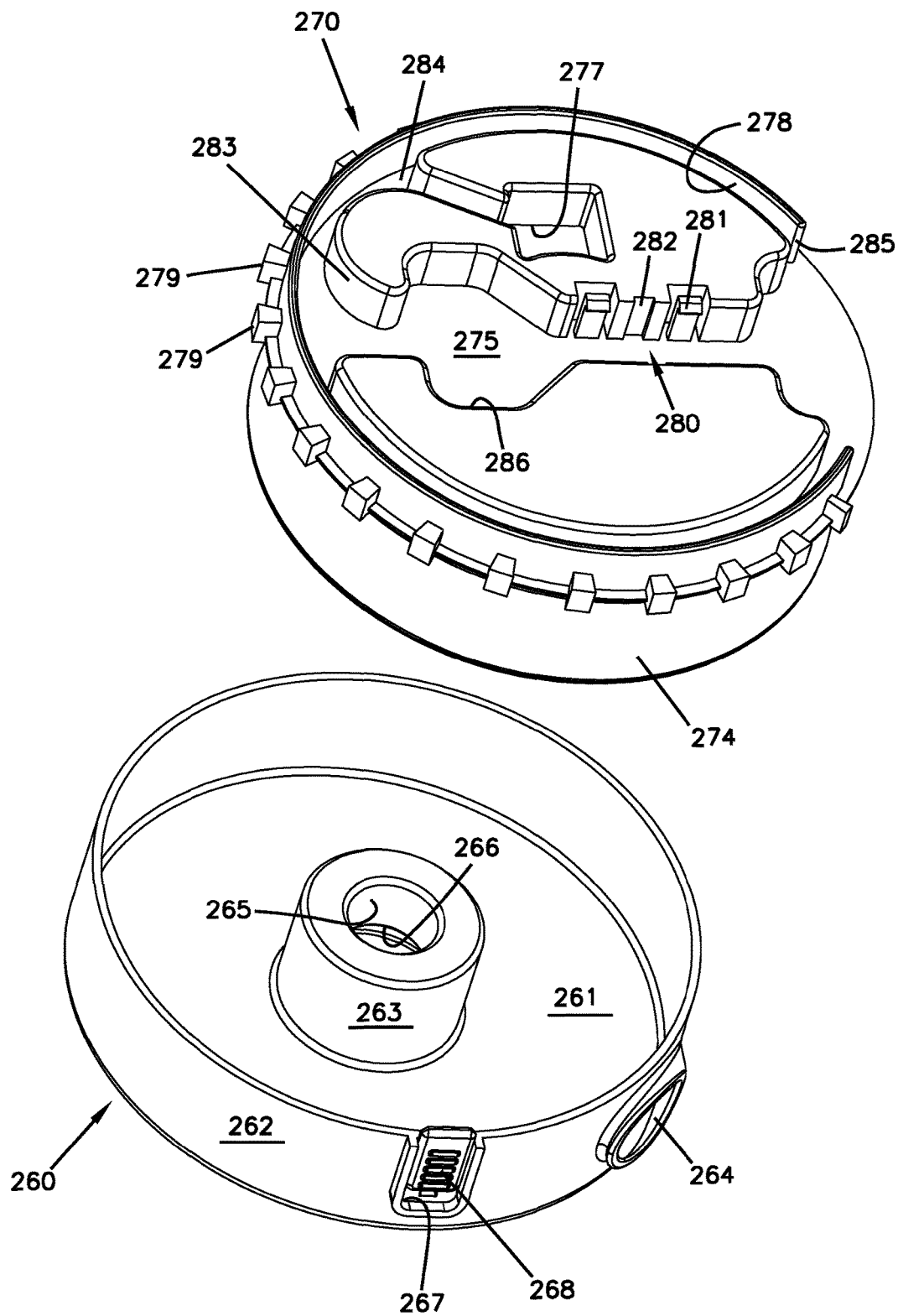
FIG. 16 shows the storage device of FIG. 15 with the spool arrangement exploded from the base.
Figure 17:
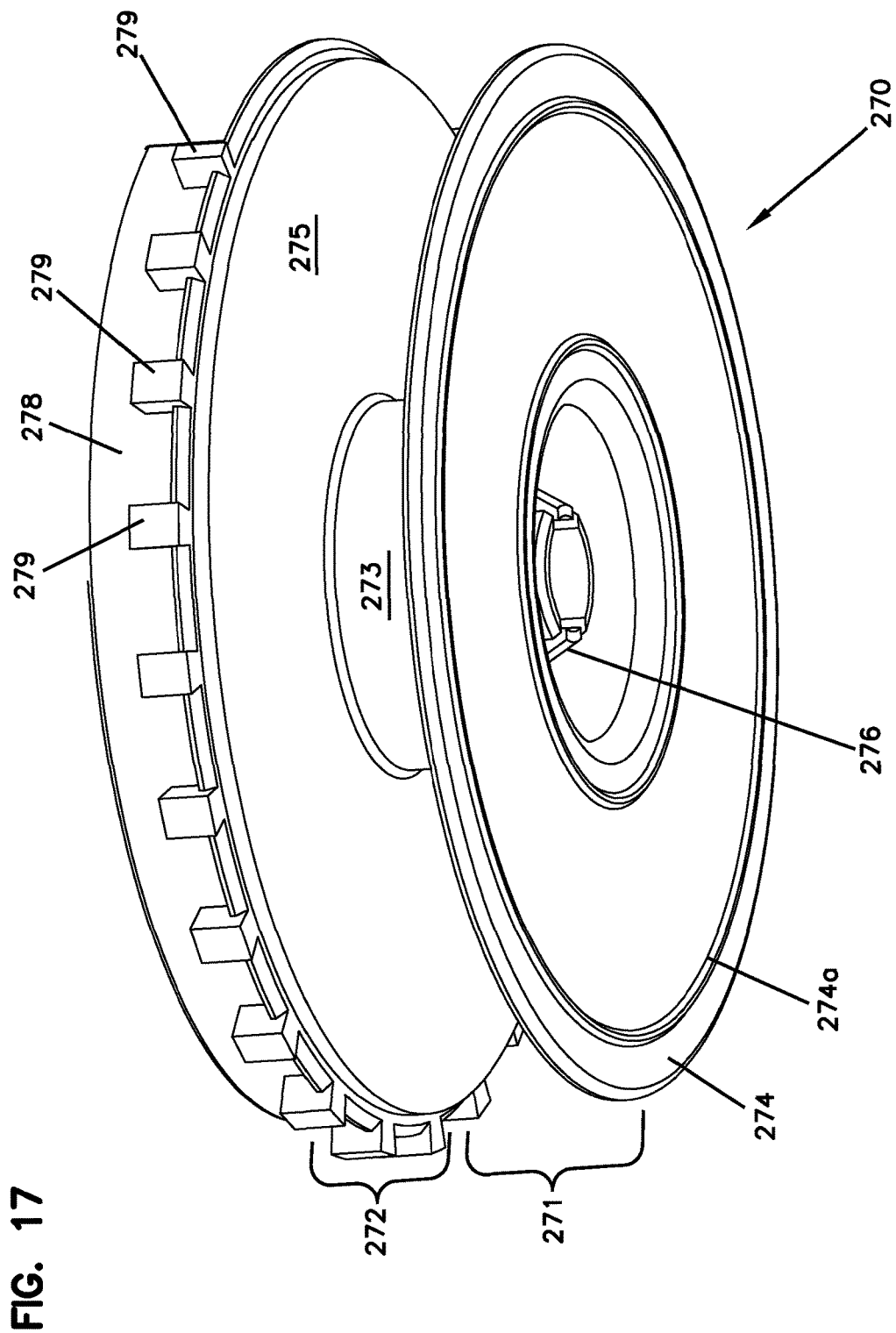
FIG. 17 is a rear perspective view of the spool arrangement of FIG. 16.

Referring to FIGS. 15-17, a third example storage device 250 configured in accordance with the principles of the present disclosure is shown. The storage device 250 has a front 251 (FIG. 15) and a rear 252. The rear 252 of the storage device 250 faces a mounting surface (e.g., a wall within the residence, an outlet within a wall of the residence, etc.). The storage device 250 is configured to hold cable (e.g., a fiber optic cable 125, 225). In examples, the fiber optic cable includes an optical fiber surrounded by a protective jacket or coating. The cable extends between a first end and a second end. The first end of the cable can be paid out from the storage device 250 by pulling on the first end.

As shown in FIG. 16, the storage device 250 includes a base 260 and a spool arrangement 270. The base 260 defines the rear 252 of the storage device 250 and the spool arrangement 270 defines the front 251 of the storage device 250. The spool arrangement 270 is configured to rotate relative to the base 260. The spool arrangement 270 has a drum region 271 and a management region 272 that rotate unitarily relative to the base 260. The drum region 271 is configured to hold a majority of the cable. The base 260 defines a port 264 through which the first end of the cable extends when the spool arrangement 270 is mounted to the base 260.

The management region 272 of the spool arrangement 270 includes a mounting structure 280 configured to hold the second end of the cable. In some implementations, the mounting structure 280 is configured to provide access to the second end of the cable from an exterior of the storage device 250. In other implementations, the mounting structure 280 holds an optical adapter having a first port and a second port. The first port receives the second end of the cable. The second port is accessible from an exterior of the storage device 250 (i.e., a connectorized end 117 of a jumper cable 116 can be plugged into the second port).

The base 260 includes a sidewall 262 extending outwardly from a perimeter of a mounting wall 261. The sidewall 262 defines the port 264. A spool mounting structure 263 (e.g., a spindle) extends outwardly from a central portion of the mounting wall 261. In certain examples, the spool mounting structure 263 defines a cavity 265.

The spool arrangement 270 includes a drum 273 defining a bend radius limiter. A flange 274 extends radially outwardly from a first axial end of the drum 273. In certain examples, a ridge 274a or other protrusion is disposed on the flange 274 and seats on the mounting wall 261 of the base 260 when the spool arrangement 270 is mounted to the base 260. The ridge 274a facilitates rotating the spool arrangement 270 relative to the base 260.

Latching hooks 276 extend within the drum 273 away from the management region 272 and towards the flange 274 (e.g., see FIG. 17). The latching hooks 276 can be inserted into the cavity 265 of the spool mounting structure 263 until the latching hooks 276 engage a ledge 266. The latching hooks 276 hold the spool arrangement 270 to the base 260 while allowing rotation of the spool arrangement 270 relative to the base 260.

The management region 272 is disposed at the second axial end of the drum 273. The management region 272 includes a routing surface 275 that defines an aperture 277 extending between the drum region 271 and the management region 272. The second end of the cable extends from the drum region 271, through the aperture 277, to the management region 272. The management region 272 also defines the mounting structure 280.

In certain implementations, the mounting structure 280 is positioned and configured to hold the optical adapter fully within a peripheral boundary of the storage device 200. For example, the mounting structure 280 can be positioned and configured to hold the optical adapter fully within a peripheral boundary of the spool arrangement 270. In certain examples, the mounting structure 280 includes one or more latching hooks 281 extending upwardly from the routing surface 275. In examples, the mounting structure 280 defines notches 282 sized to accommodate mounting flanges of an optical adapter.

Guide structure 283 at the management region 272 define a routing pathway 284 along which the second end of the cable is routed from the aperture 277 to the mounting structure 280. In certain examples, a sidewall 278 extends outwardly from the routing surface 275. The sidewall 278 cooperates with the guides 283 to define the routing pathway 284. In some implementations, the sidewall 278 extends from a peripheral edge of the routing surface 275. In other implementations, the sidewall 278 is recessed radially inwardly from the peripheral edge.

The routing pathway 284 inhibits bending of the second end of the cable beyond a maximum bend radius. The sidewall 278 defines an interruption 285 that aligns with the second port of the optical adapter to enable an optical connector to be plugged into the second port. In certain implementations, the guide structure 283 defines a finger access recess 286 that facilitates plugging the second end of the cable into the first port of the optical adapter.

In some implementations, the spool arrangement 270 is configured to rotationally lock in a fixed position relative to the base 260. For example, when the first end of the cable has been sufficiently paid out from the storage device 250, the spool arrangement 270 can be locked to the base 260 to inhibit further dispensing of the cable. In certain implementations, the spool arrangement 270 can be locked into one of a plurality of predetermined positions.

In the example shown, the base 260 includes a slider member 268 that is configured to slide along a channel 267 defined by the sidewall 262 of the base 260. The sidewall 278 of the spool arrangement 270 defines a plurality of stop members 279 around a circumference of the sidewall 278. The slider 268 can be slide towards the spool arrangement 270 until a portion of the slider 268 is disposed between two adjacent ones of the stop members 279 to inhibit relative rotation between the spool arrangement 270 and the base 260 (e.g., see FIG. 15).

Figure 18:
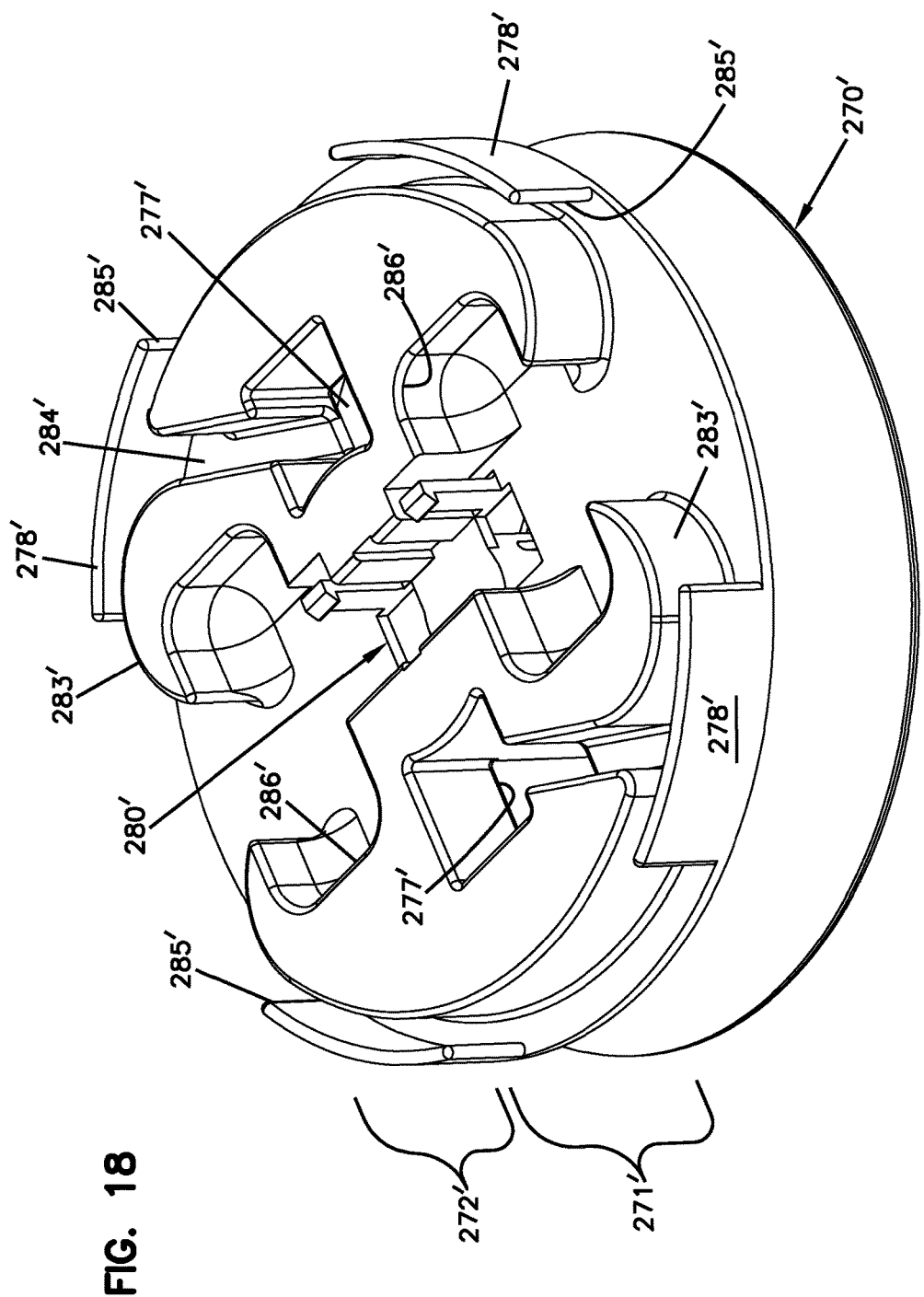
FIG. 18 is a front perspective view of an alternative spool arrangement suitable for use with the base of FIG. 15.

FIG. 18 illustrates an alternative spool arrangement 270' suitable for use with the base 260 shown in FIGS. 15-17. The spool arrangement 270' has a drum region 271' and a management region 272' that rotate unitarily relative to the base 260. The drum region 271' is configured to hold a majority of the cable.

The management region 272' of the spool arrangement 270' includes a mounting structure 280' configured to hold the second end of the cable. In some implementations, the mounting structure 280' is configured to provide access to the second end of the cable from an exterior of the storage device. In other implementations, the mounting structure 280' holds an optical adapter having a first port and a second port. The first port receives the second end of the cable. The second port is accessible from an exterior of the storage device (i.e., a connectorized end 117 of a jumper cable 116 can be plugged into the second port).

In some implementations, the management region 272' defines multiple apertures 277' through which the cable can transition between the drum region 271' and the management region 272'. Guides 283' cooperate with a sidewall 278' to define routing channels 284' that lead from the apertures 277' to the mounting structure 280'. In certain implementations, the guide structure 283' defines a finger access recess 286' that facilitates plugging the second end of the cable into the first port of the optical adapter. In certain examples, the guide structure 283' also defines another finger access recess 286' that facilitates plugging the connectorized end of a cable into the second port of the optical adapter.

The sidewall 278' includes one or more interruptions 285'. At least one of the interruptions 285' aligns with the second port of the optical adapter when the optical adapter is received at the mounting structure 280'. In certain implementations, another interruption 285' aligns with the first port of the optical adapter. In certain implementations, a first routing channel 284' leads from a first aperture 277' to one port of the adapter and a second routing channel 284' leads from a second aperture 277' to another port of the adapter. Accordingly, either port of the optical adapter can receive the second end of the cable while the other port of the optical adapter is used to receive a connectorized end of an external cable (e.g., the jumper cable 118).

Figure 19:
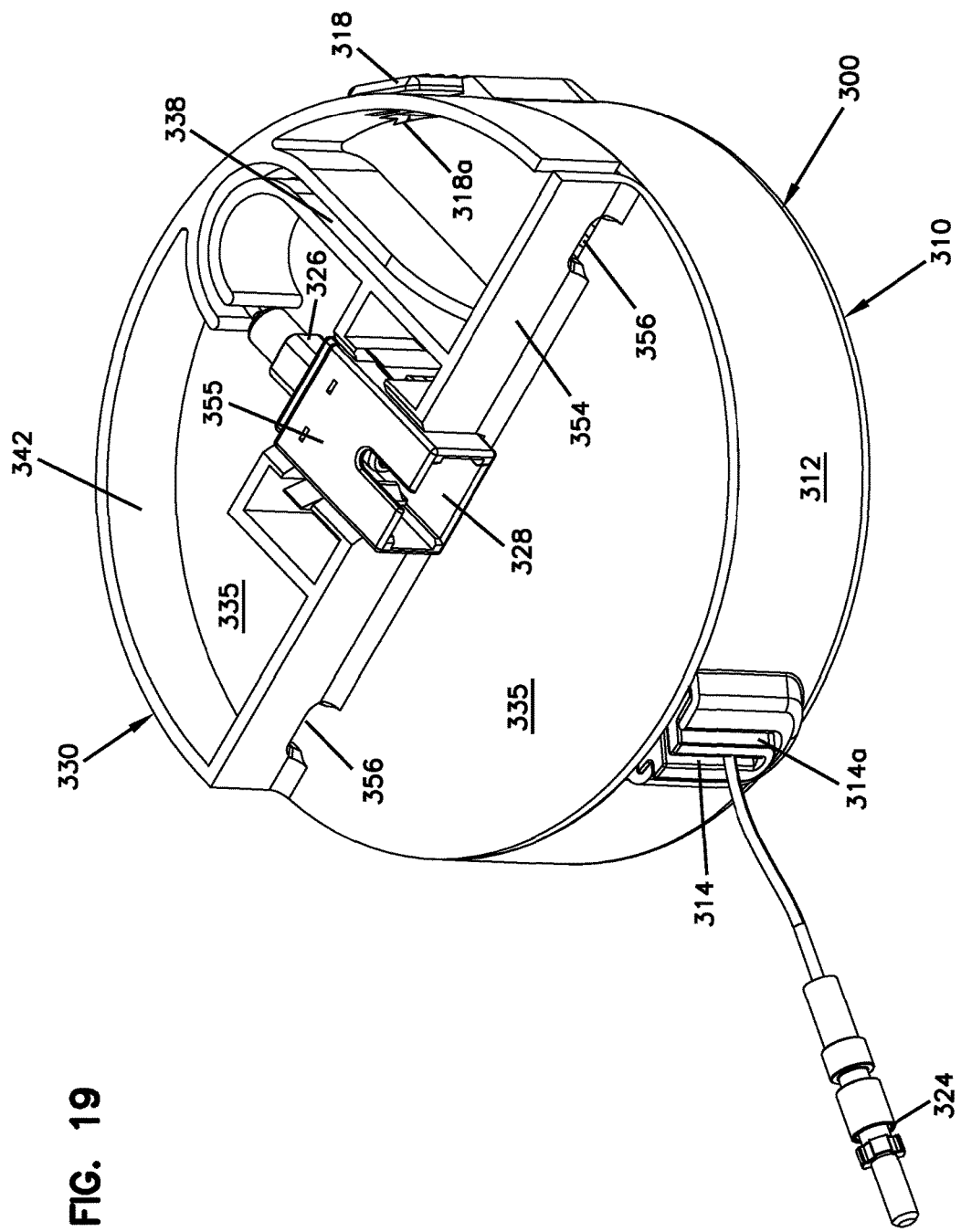
FIG. 19 is a front perspective view of a fourth example storage device including a spool arrangement and a base in accordance with the principles of the present disclosure.
Figure 20:
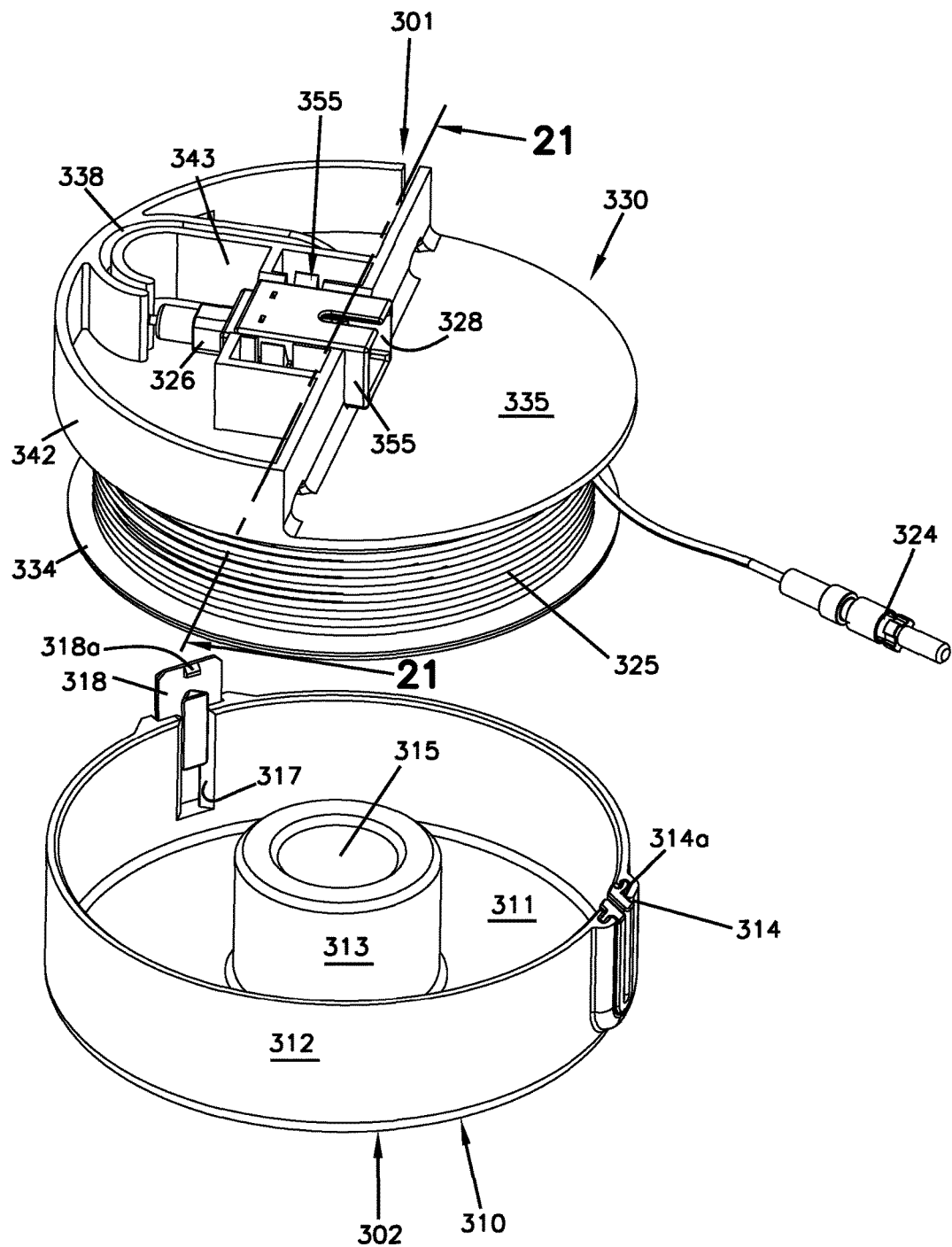
FIG. 20 shows the storage device of FIG. 19 with the spool arrangement exploded from the base.
Figure 21:
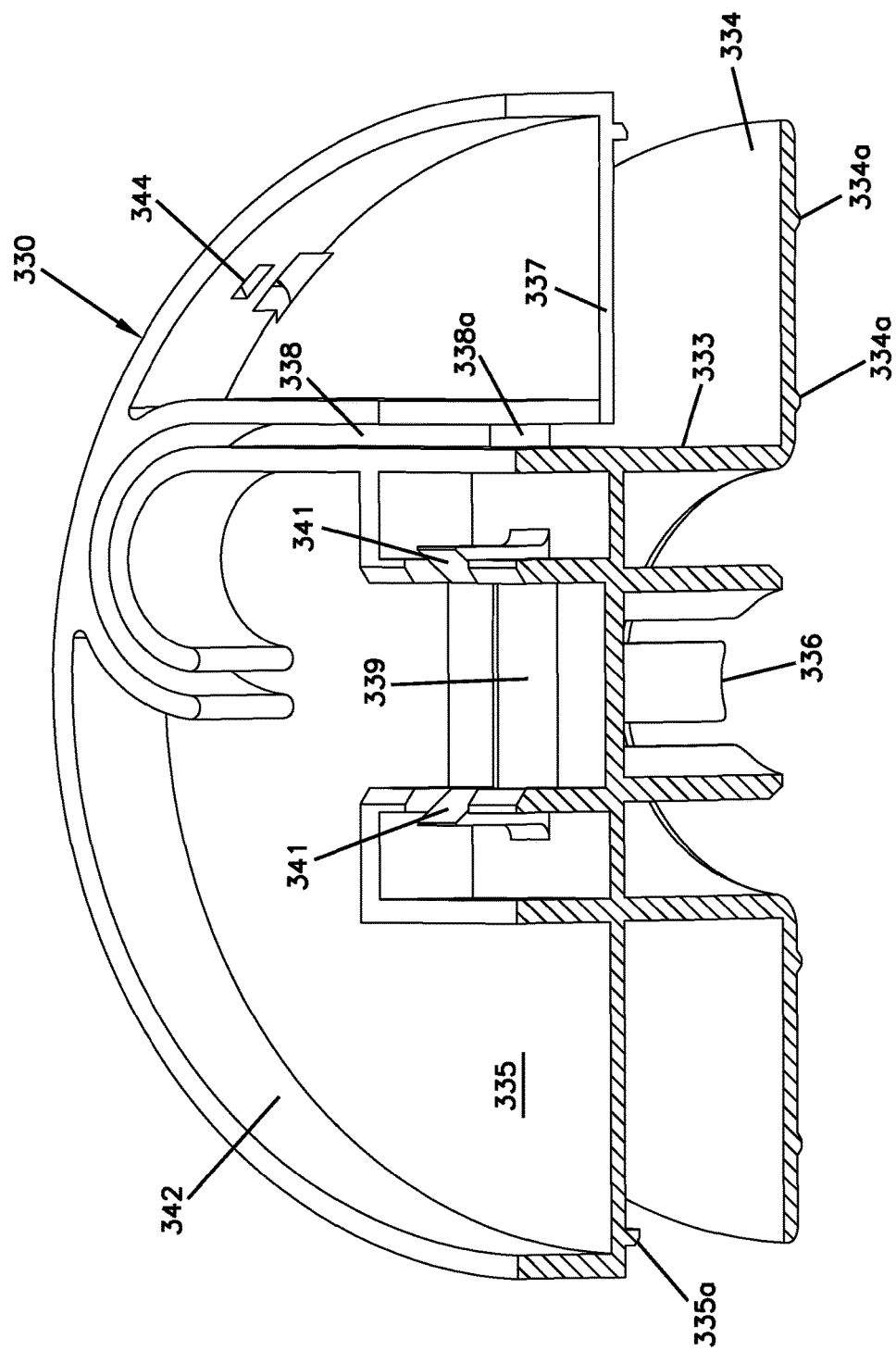
FIG. 21 is a cross-sectional view of the spool arrangement of FIG. 20 taken along the 21-21 line of FIG. 20 with the cable removed for clarity.

Referring to FIGS. 19-21, a fourth example storage device 300 configured in accordance with the principles of the present disclosure is shown. The storage device 300 has a front 301 and a rear 302. The rear 302 of the storage device 300 faces a mounting surface (e.g., a wall within the residence, an outlet within a wall of the residence, etc.). The storage device 300 is configured to hold cable (e.g., a fiber optic cable) 325. In examples, the fiber optic cable includes an optical fiber surrounded by a protective jacket or coating. The cable 325 extends between a first end 324 and a second end 326. The first end 324 of the cable 325 can be paid out from the storage device 300 by pulling on the first end 324. In the example shown, the first end 324 is partially connectorized.

As shown in FIG. 20, the storage device 300 includes a base 310 and a spool arrangement 330. The base 310 defines the rear 302 of the storage device 300 and the spool arrangement 330 defines the front 301 of the storage device 300. The spool arrangement 330 is configured to rotate relative to the base 310. The spool arrangement 330 has a drum region 331 and a management region 332 that rotate unitarily relative to the base 310. The drum region 331 is configured to hold a majority of the cable 325. The base 310 defines a port 314 through which the first end 324 of the cable 325 extends when the spool arrangement 330 is mounted to the base 310.

The base 310 includes a sidewall 312 extending outwardly from a perimeter of a mounting wall 311. The sidewall 312 defines the port 314. A spool mounting structure 313 (e.g., a spindle) extends outwardly from a central portion of the mounting wall 311. In certain examples, the spool mounting structure 313 defines a cavity 315. The spool arrangement 330 includes a drum 333 defining a bend radius limiter (see FIG. 21). A flange 334 extends radially outwardly from a first axial end of the drum 333. In certain examples, one or more ridges 334a or other protrusions are disposed on the flange 334 and seat on the mounting wall 311 of the base 310 when the spool arrangement 330 is mounted to the base 310. The ridge 334a facilitates rotating the spool arrangement 330 relative to the base 310.

Figure 25:
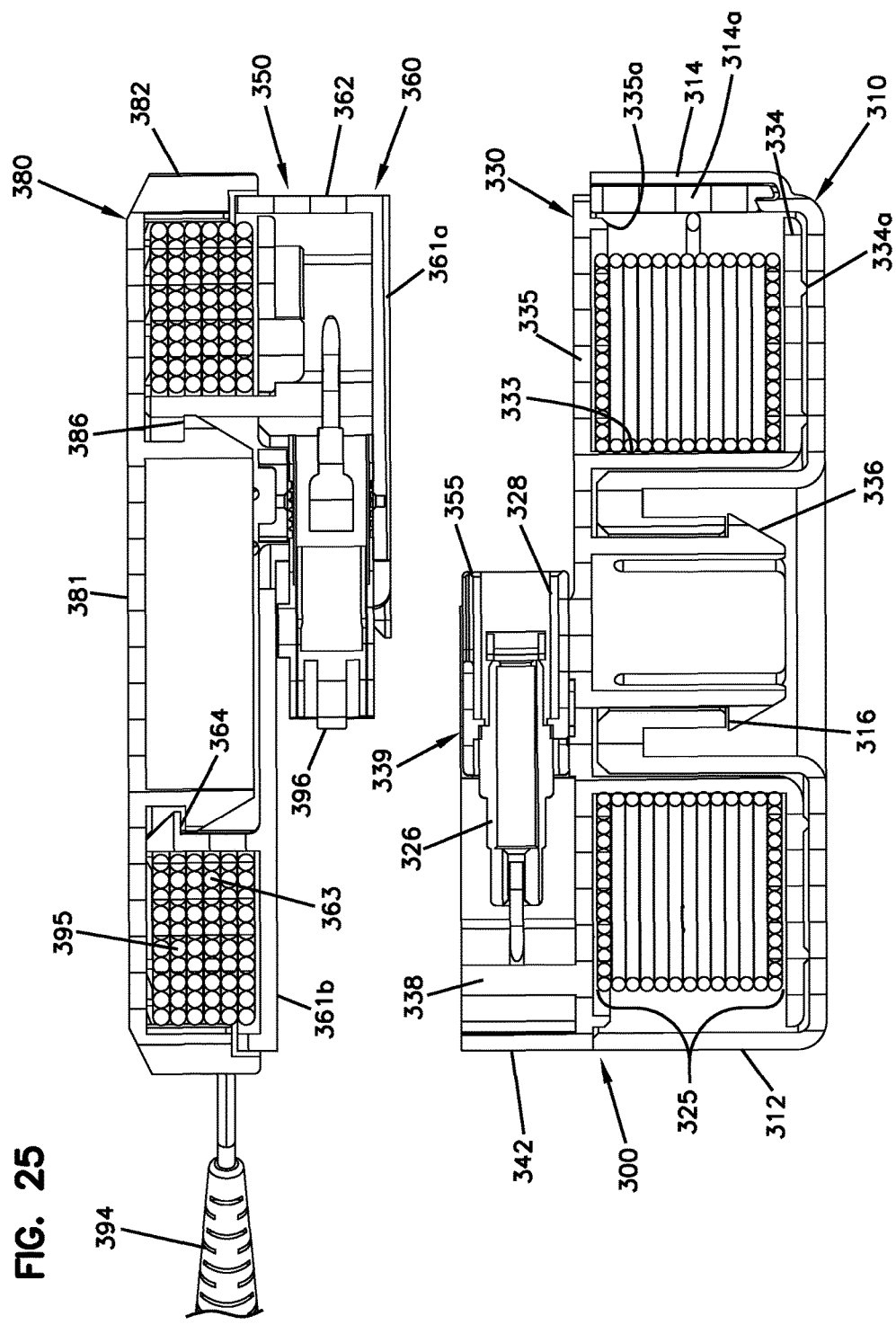
FIG. 25 is a cross-sectional view of the storage device and patchcord storage arrangement of FIG. 22 with portions of the cable removed for clarity.

Latching hooks 336 extend within the drum 333 away from the management region 332 and towards the flange 334. The latching hooks 336 can be inserted into the cavity 315 of the spool mounting structure 313 until the latching hooks 336 engage the ledge 316 (see FIG. 25). The latching hooks 336 hold the spool arrangement 330 to the base 310 while allowing rotation of the spool arrangement 330 relative to the base 310. In some implementations, storage device 300 can be mounted to a surface (e.g., a wall) using the mounting member 165 of FIGS. 6 and 7 to allow the storage device 300 to be mounted to the surface in one of a plurality of predetermined rotational positions. In such implementations, the cavity 315 of the base 310 is structured similarly to the cavity 135 of the base 130 shown in FIGS. 5 and 6.

The management region 332 includes a routing flange 335 disposed at the second axial end of the drum 333. The management region 332 includes a mounting structure 339 disposed at the routing flange 335. In certain implementations, the routing flange 335 includes a ridge 335a that extends towards the flange 334. The ridge 335a is positioned to fit within the sidewalls 312 of the base 310 when the spool arrangement 330 is mounted to the base 310 (see FIG. 25).

In some implementations, the mounting structure 339 is configured to hold the second end 326 of the cable 325. In other implementations, the mounting structure 339 is configured to hold an optical adapter 355 having a first port that receives the second end 326 of the cable 325. For example, The optical adapter 355 also defines an externally accessible second port 328 at which a connectorized end of an optical fiber (e.g., connectorized end 117 of the jumper cable 116) can be received.

In certain implementations, the mounting structure 339 is positioned and configured to hold the optical adapter 355 (or second end 326 of the cable 325) fully within a peripheral boundary of the storage device 300. For example, the mounting structure 339 can be positioned and configured to hold the optical adapter 355 fully within a peripheral boundary of the spool arrangement 330. In certain examples, the mounting structure 339 includes one or more latching hooks 341 extending upwardly from the routing surface 335.

An aperture 337 connects the management region 332 with the drum region 331. In an example, the aperture 337 defines an elongated slot (e.g., see FIG. 21). Guide structure at the management region 332 define a routing pathway 338 along which the second end 326 of the cable 325 is routed between the aperture 337 and the mounting structure 339. In an example, a ramp 338a extends into the aperture 337 to guide the cable 225 between the regions 331, 332 (e.g., see FIG. 21). The routing pathway 338 inhibits bending of the second end 326 of the cable 325 beyond a maximum bend radius. In certain implementations, the guide structure defines a finger access recess 343 that facilitates plugging the second end 326 of the cable 325 into the first port of the optical adapter 355.

In certain implementations, the mounting structure 339 can be positioned and configured to hold the optical adapter 355 so that the second port 328 of the adapter 355 is disposed centrally on the spool arrangement 330. In some such implementations, the second end 326 of the cable 325 can be connectorized without a strain-relief boot to enhance flexibility of the second end 326 of the cable 325 (e.g., see FIG. 20). Example optical adapters suitable for use as the optical adapter 355 and example optical connectors suitable for use terminating the second end 326 of the cable 325 can be found in WO 2014/049469, the disclosure of which is hereby incorporated herein by reference.

Figure 21A:
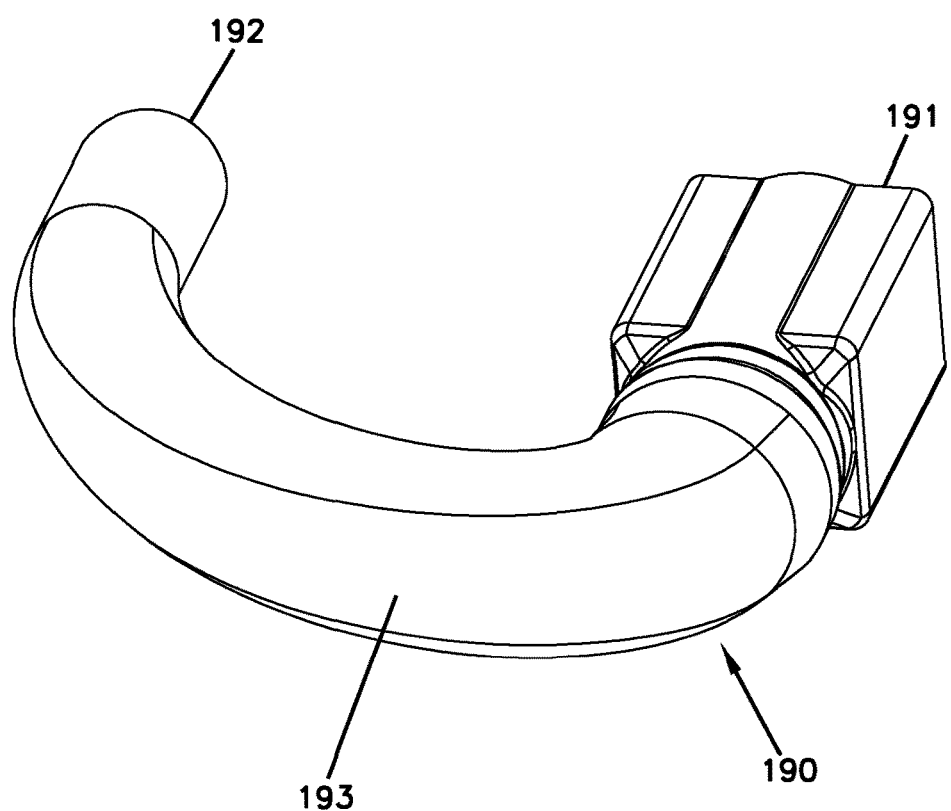
FIG. 21a is a perspective view of an example boot curving 180° in accordance with the principles of the present disclosure.

In other such implementations, the second end 326 of the cable 325 can include a rigid boot 190 to provide bend control (see FIG. 21a). In implementations where the rigid boot 190 is utilized, the management region 332 would not include the guide structure forming the routing pathway 338. Rather, the rigid boot 190 would form the pathway to the aperture 337. In certain implementations, the rigid boot 190 defines a body 193 extending between a first end 191 and a second end 192. In certain examples, the body 193 is injection molded. In certain examples, the body 193 curves 180° between the first and second ends 191, 192.

In some implementations, the spool arrangement 330 is configured to rotationally lock in a fixed position relative to the base 310. For example, when the first end 324 of the cable 325 has been sufficiently paid out from the storage device 300, the spool arrangement 330 can be locked to the base 310 to inhibit further dispensing of the cable 325. In some implementations, the spool arrangement 330 can be locked into one of a plurality of predetermined positions. In other implementations, the spool arrangement 330 can be locked into one rotational position.

In the example shown, the base 310 includes a slider member 318 that is configured to slide along a channel 317 defined by the sidewall 312 of the base 310. A sidewall 342 extending along at least part of the circumference of the spool arrangement 330 defines at least one stop aperture 344 disposed along a circumference of the sidewall 342 (FIG. 21). The slider 318 can be slide towards the spool arrangement 330 until a portion 318a (FIG. 20) of the slider 318 engages the stop aperture 344 to inhibit relative rotation between the spool arrangement 330 and the base 310. In certain implementations, multiple stop apertures 344 can be disposed along the sidewall 342.

Figure 22:
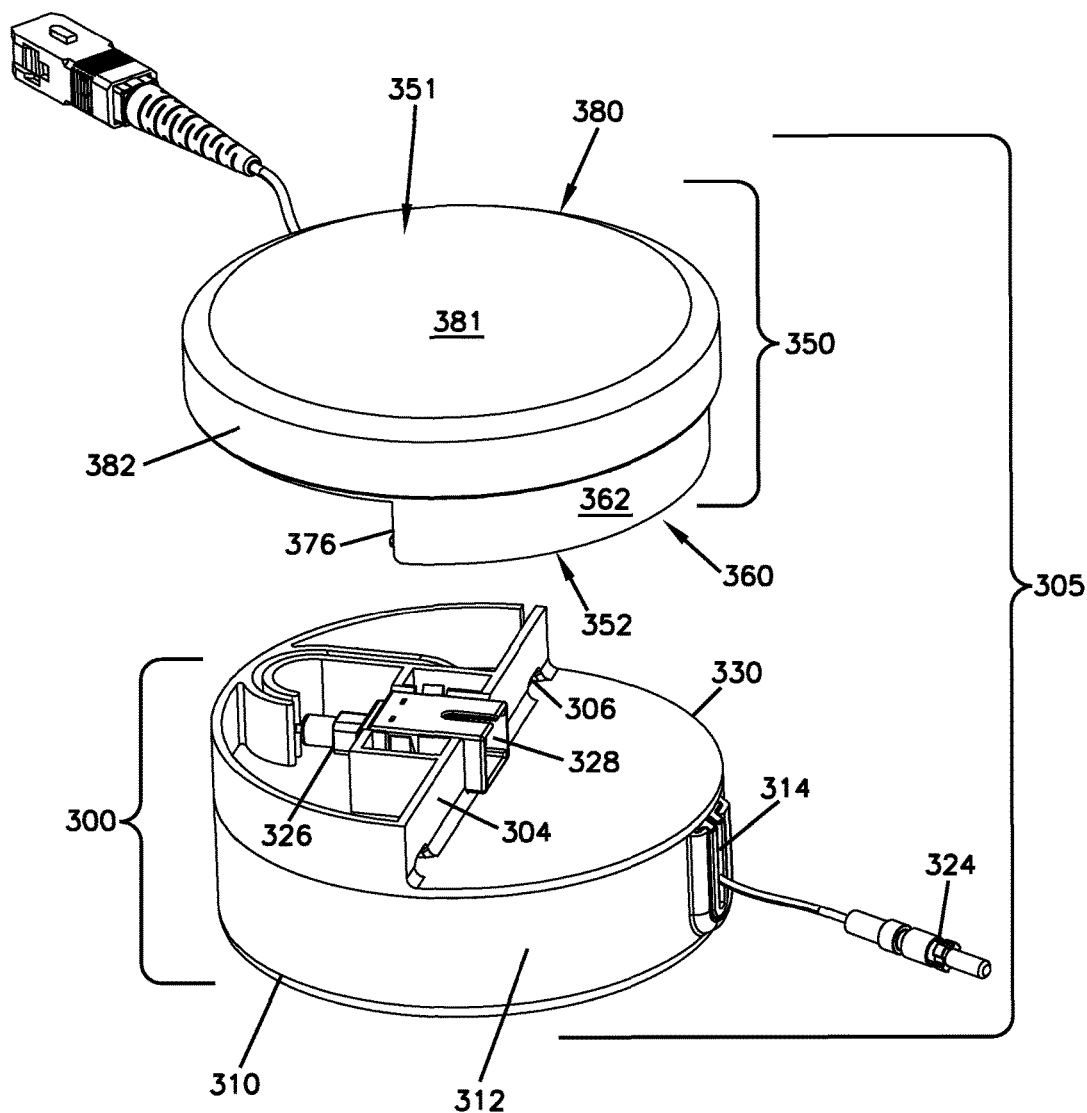
FIG. 22 is a front perspective view of an example cable storage unit including the storage device of FIGS. 19-21 and an example patchcord storage arrangement, wherein the patchcord storage arrangement is exploded from the storage device.
Figure 23:
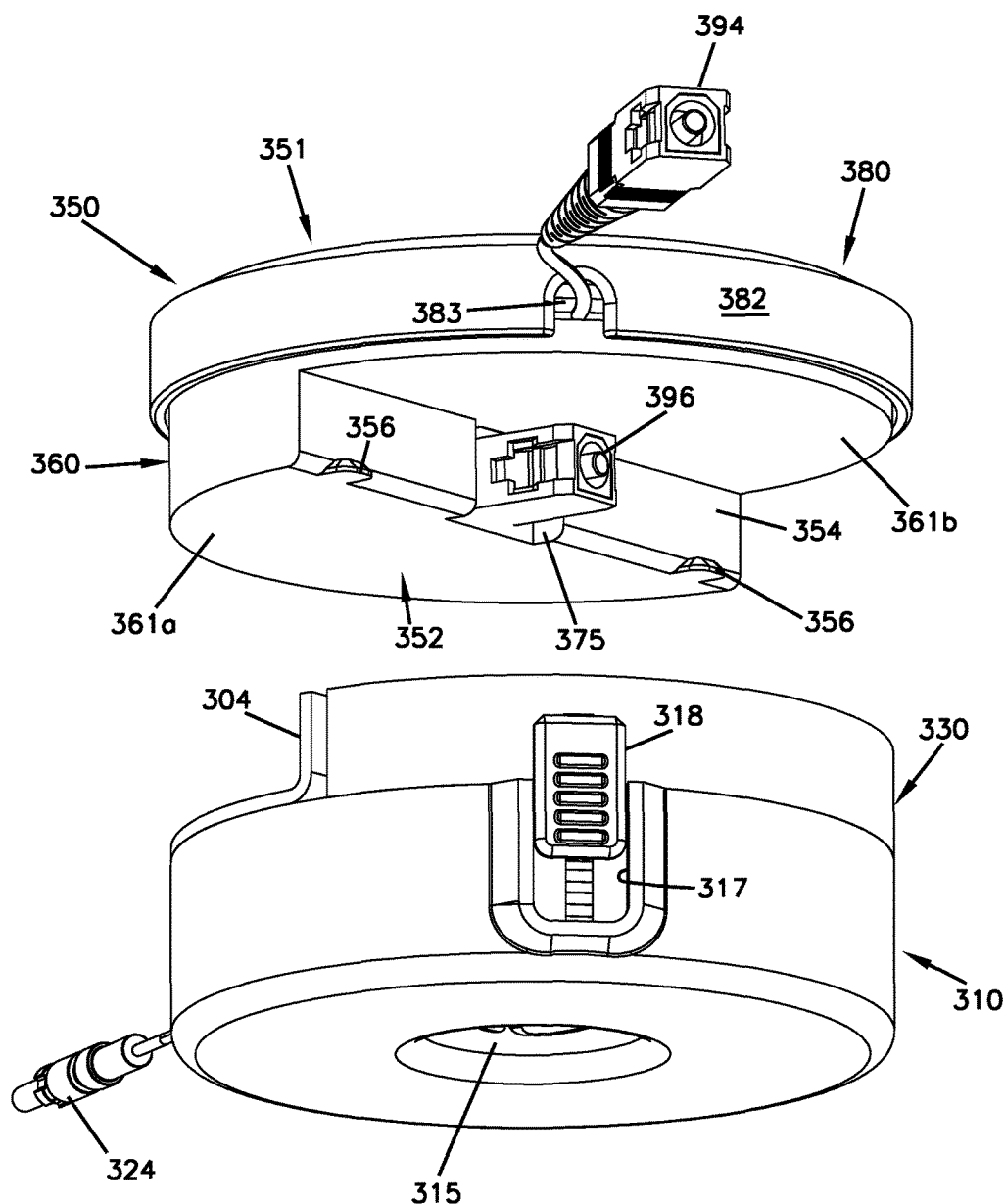
FIG. 23 is a rear perspective view of the exploded patchcord storage arrangement and storage device.
Figure 24:
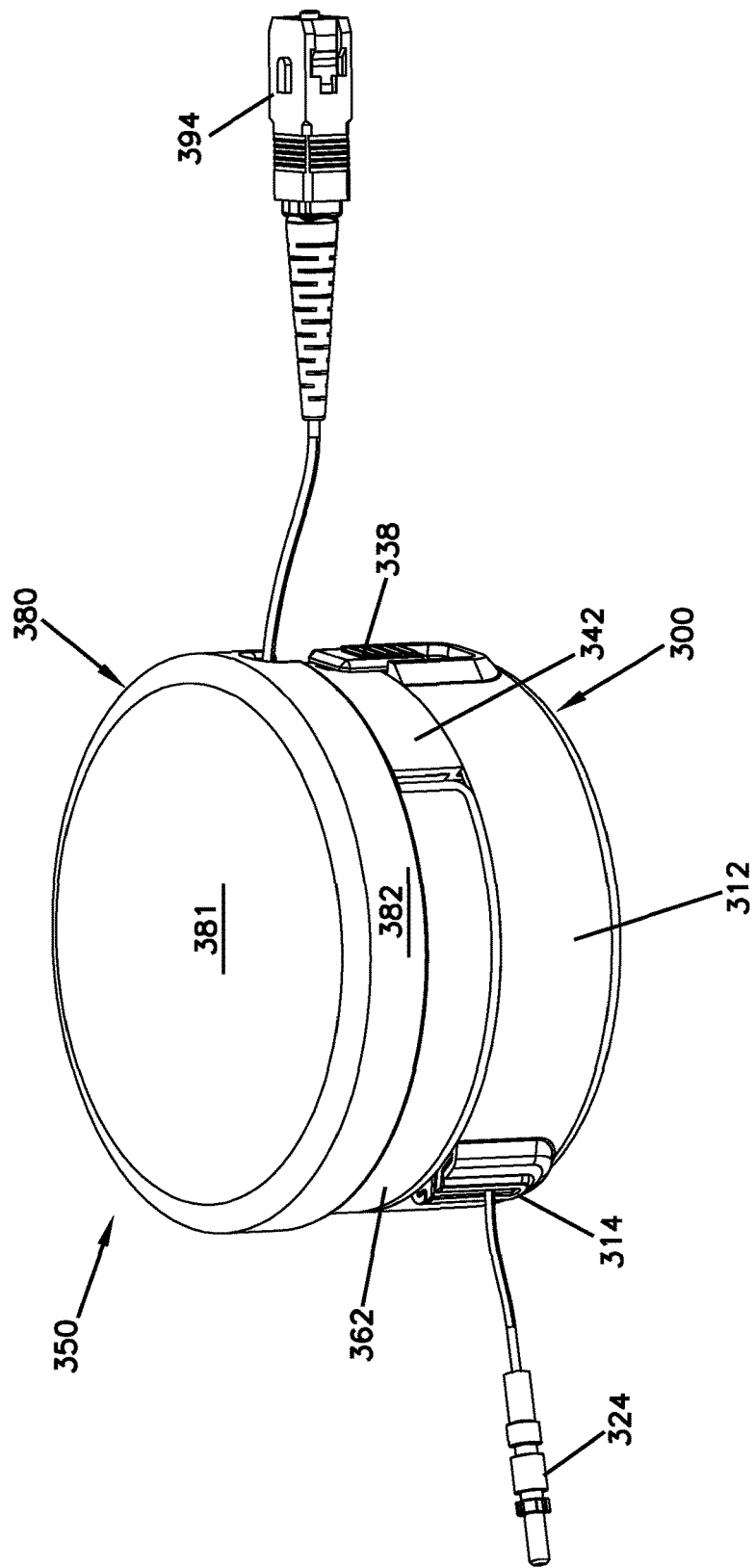
FIG. 24 is a perspective view of the cable storage unit of FIG. 22 assembled together.

Referring now to FIGS. 22-24, the storage device 300 can be used as a wall outlet within a residence and a patchcord storage arrangement 350 can be mounted to the wall outlet 300 to form a cable storage unit 305. The patchcord storage arrangement 350 is configured to hold a patchcord 395 having a first end 394 and a second end 396. The first end 394 of the patchcord 395 can be dispensed from the patchcord storage arrangement 350. For the sake of clarity, the storage device 300 will be referred to as a wall outlet for the rest of this disclosure. It is noted, however, that the storage device 300 can be utilized outside of a residence (e.g., at a fiber optic enclosure 106, at the cable input location 104, etc.).

In some implementations, the wall outlet 300 includes a first interface 304 at which the second port 328 of the optical adapter 355 is disposed (see FIG. 22). The patchcord storage arrangement 350 includes a second interface 354 at which the second end 396 of the patchcord 395 is disposed (see FIG. 23). To mount the patchcord storage arrangement 350 to the wall outlet 300, the second interface 354 is slid or otherwise moved towards the first interface 304 until the second end 396 of the patchcord is received at the second port 328 of the optical adapter 355. In other implementations, the optical adapter 355 can be fixedly mounted at the second interface of the patchcord storage arrangement 350 and can interface with the second end 326 of the cable 325 when the patchcord storage arrangement 350 is mounted to the wall outlet 300.

In some implementations, the first and second interfaces 304, 354 define interface walls that face each other when the patchcord storage arrangement 350 is mounted to the wall outlet 300. In certain implementations, the first and second interfaces 304, 354 include attachment features that enable the patchcord storage arrangement 350 to be held at the wall outlet 300. For example, in certain examples, the first interface 304 defines apertures 306 and the second interface 354 includes feet 356 sized to mate with the apertures 306 when the patchcord storage arrangement 350 is mounted to the wall outlet 300.

In use, a desired length of the cable 325 is dispensed from the wall outlet 300 by pulling on the first end 324 of the cable 325. In some implementations, the first end 324 is connected to a fiber optic enclosure 120 outside of the residence. In other implementations, the first end 324 is connected to a transition box at a boundary of the residence. The spool arrangement 330 of the wall outlet 300 is locked to the base 310, which is secured to a surface within the residence.

In some implementations, a desired length of the patchcord 395 is dispensed from the patchcord storage arrangement 350 by pulling on the first end 394 of the patchcord 395. The first end 394 of the patchcord 395 is connected to an ONT 116 or other optical equipment. In certain implementations, the patchcord storage arrangement dispenses the patchcord 395 by rotating a cover 380 relative to a spool arrangement 360. In certain examples, the cover 380 can be locked relative to the spool arrangement 360 when the desired amount of patchcord 395 has been dispensed. The patchcord storage arrangement 395 is mounted to the wall outlet 300 by moving the second interface 354 towards the first interface 304. Excess length of both the cable 325 and the patchcord 395 are stored at the cable storage unit 305.

In other implementations, the patchcord storage arrangement 350 can be mounted to the wall outlet 300 prior to paying out the patchcord 395 from the patchcord storage arrangement 350. In such implementations, the spool arrangement 360 and second end 396 of the patchcord 395 remain stationary relative to the wall outlet 300 while the first end 394 of the patchcord 395 is paid out. In still other implementations, the patchcord storage arrangement 350 can be mounted to the wall outlet 300 prior to paying out the cable 325 from the wall outlet 300. In such implementations, the patchcord storage arrangement 350 rotates with the spool arrangement 330 while the cable 325 is paid out.

Figure 26:
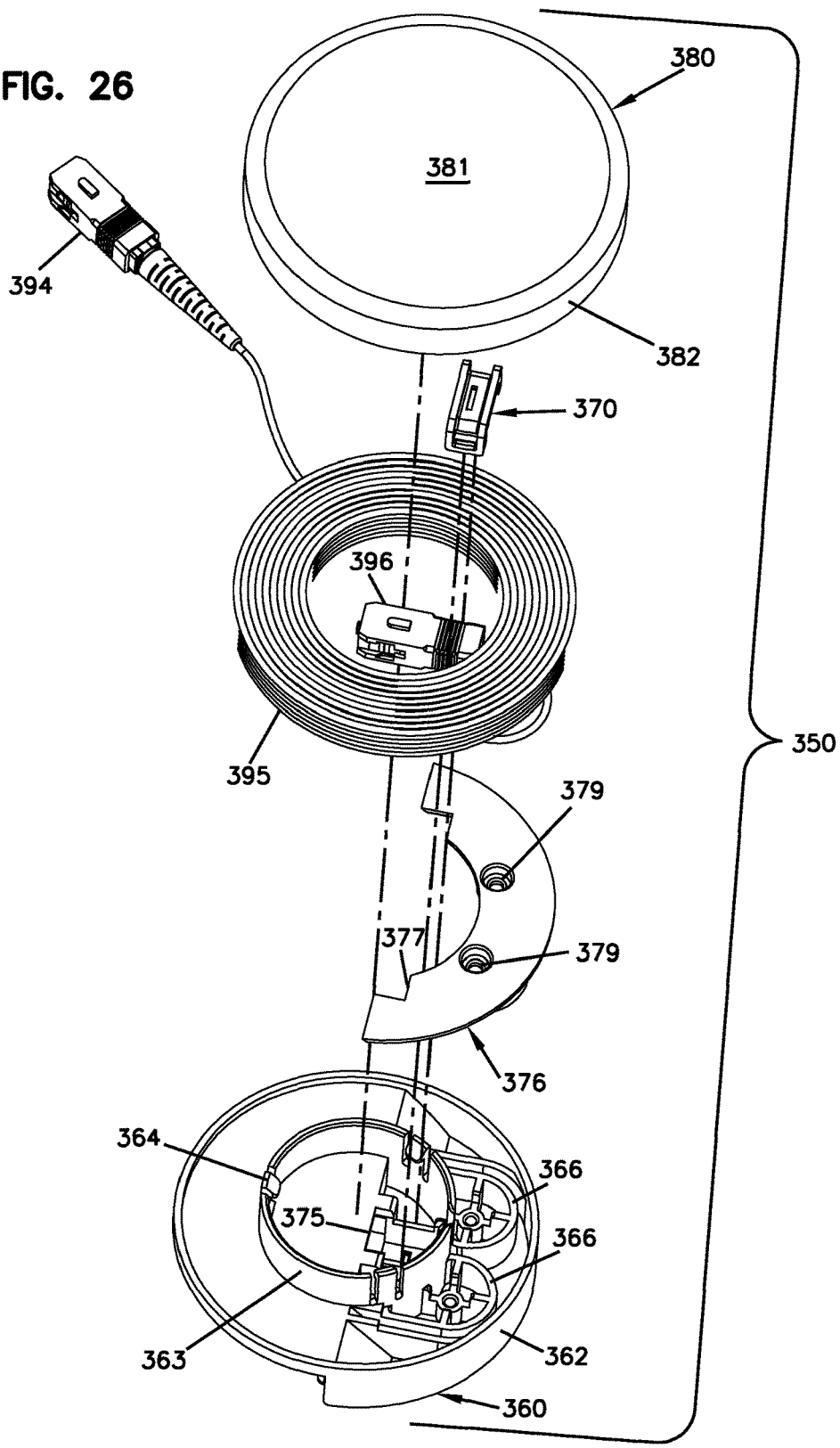
FIG. 26 is a front exploded view of an example patchcord storage arrangement suitable for use in the cable storage unit of FIGS. 22-25.
Figure 27:
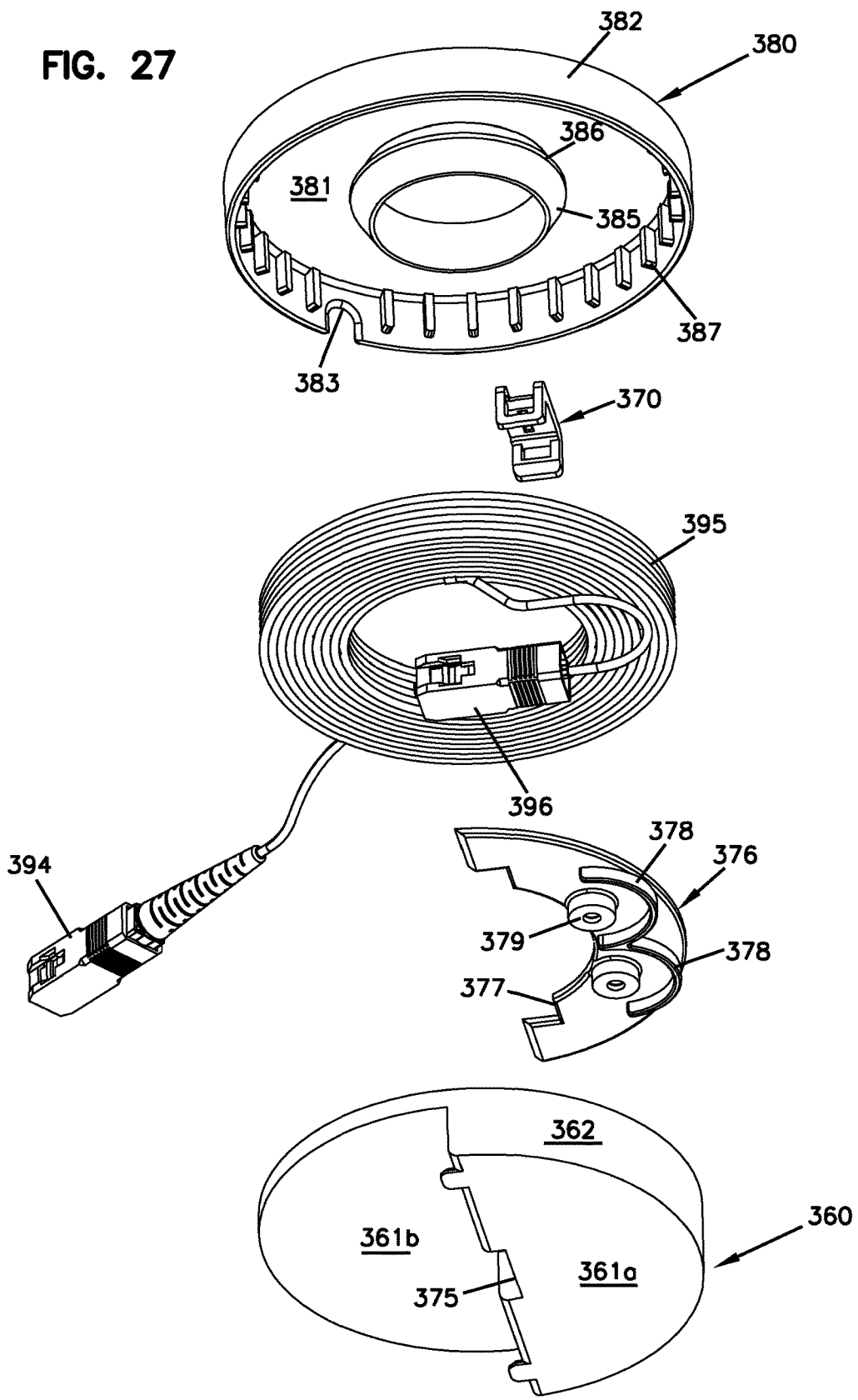
FIG. 27 is a rear exploded view of the patchcord storage arrangement of FIG. 26.
Figure 28:
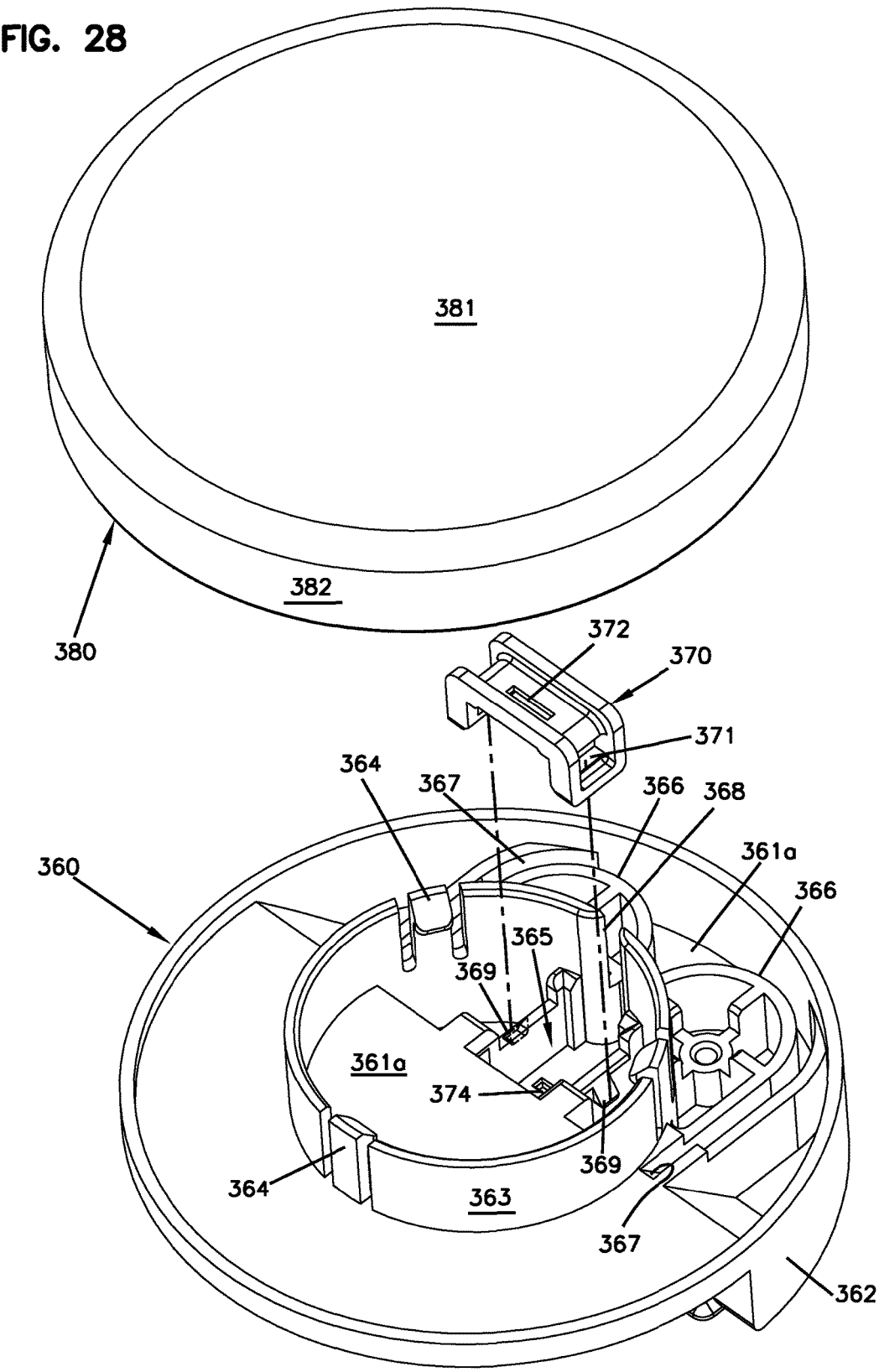
FIG. 28 is a front perspective view of the patchcord storage arrangement of FIG. 26 with a cover and a retainer exploded away from the spool arrangement and the insert and patchcord removed for clarity.

FIGS. 26-28 illustrate an example patchcord storage arrangement 350 suitable for use with the wall outlet 300. The patchcord storage arrangement 350 includes a spool arrangement 360 and a cover 380. The spool arrangement 360 is configured to hold a majority of the patchcord 395. The spool arrangement 360 includes a mounting location 365 at which the second end 396 of the patchcord 395 is held. In certain implementations, an optical adapter also can be held at the mounting location 365. The cover 380 defines a port 383 through which the first end 394 of the patchcord 395 can be dispensed.

The spool arrangement 360 includes a sidewall 362 extending upwardly from a stepped rear wall. The rear wall includes a first portion 361a that is connected to a second portion 361b by the interface wall 354. The first portion 361a mounts to the routing surface 335 of the wall outlet spool arrangement 330 and the second portion 361b mounts over the guide structure of the wall outlet spool arrangement 330.

The spool arrangement 360 also includes a drum 363 extending upwardly from the rear wall. The patchcord 395 is wrapped around the drum 363. The second portion 361b of the rear wall defines part of a support surface for the patchcord 395 when the patchcord 395 is wound around the drum 363. An insert 376 mounts to the spool arrangement 360 to cooperate with the second portion 361b to define the support surface. In some implementations, the insert 376 defines fastener apertures 379 through which fasteners can be inserted to secure the insert 376 to the spool arrangement 360. In other implementations, the insert 376 can be latched or otherwise connected to the spool arrangement 360.

The first portion 361a of the rear wall and the sidewall 362 form a pocket below the support surface. The second end 396 of the patchcord 395 is retained at a mounting location 365 within the pocket. Guides structures 366 are disposed within the pocket to guide the second end 396 of the patchcord 395 from the support surface to the mounting location 365. In certain examples, a ramped surface 367 may extend from the support surface to a channel 367 defined between the guide structures 366 and the sidewall 362. In certain examples, the insert 376 defines notches 377 that accommodate transitioning the patchcord 395 from the support surface to the pocket. The channel 367 leads to the mounting location 365. In certain examples, the insert 376 includes guide structures 378 to cooperate with the guide structures 366 of the spool arrangement 360 to define the channel 367.

The interface wall 354 defines an aperture 375 through which the second end 396 of the patchcord 395 extends or is accessible (see FIG. 23). In some implementations, the drum 363 of the spool arrangement 360 extends into the pocket. In such implementations, the drum 363 defines a slot or break 368 through which the second end 396 of the patchcord 395 can extend to reach the mounting location 365 (see FIG. 28).

In some implementations, the second end 396 of the patchcord 395 is held at the mounting location 365 using a retainer 370. In some implementations, the retainer includes either apertures 371 or latching lugs 369 that mate with latching lugs 369 or apertures 371 at the mounting location 365 to hold the retainer 370 to the mounting location 365. In the example shown, the latching lugs 369 are disposed within the pocket at the mounting location 365. The second end 396 of the patchcord 395 is disposed between the retainer 370 and the first portion 361a of the rear wall. In certain implementations, the retainer 370 can define an aperture 372 to receive a rib disposed on the optical connector terminating the second end 396 of the patchcord 395. In examples, a similar aperture 374 can be defined at the mounting location 365 to receive a second rib at an opposite side of the optical connector form the first rib. Engagement between the ribs and the apertures 372, 374 inhibits axial movement of the optical connector.

In some implementations, the cover 380 includes a covering surface 381 from which a sidewall 382 extends. The sidewalls 382 overlap the drum 363 when the cover 380 is mounted to the spool arrangement 360. Accordingly, the cover 380 cooperates with the spool arrangement 360 to protect the patchcord 395. The sidewall 382 of the cover 380 defines a port 383 through which the first end 394 of the patchcord 395 extends. To dispense the patchcord 395 from the drum 363, the first end 394 of the patchcord 395 is pulled. Pulling the first end 394 causes the cover 380 to rotate relative to the spool arrangement 360 so that the port 383 revolves around the drum 363.

The cover 380 includes a latching feature 385 that extends from the covering surface 381 within the sidewall 382. The latching feature 385 defines a ledge 386 facing the covering surface 381. The ledge 386 engages latching arms 364 of the spool arrangement 360 to hold the cover 380 to the spool arrangement 360 (see FIG. 25). In certain examples, the latching arms 364 define part of the drum 363 (see FIG. 28). In certain implementations, ribs 387 can be provided at an interior of the sidewall 382. In examples, the ribs 387 provide strength to the cover 380.

Additional examples of suitable patchcord storage arrangements can be found in U.S. Appl. No. 62/151,239, filed Apr. 22, 2015, and titled "Cable Storage Arrangement," the disclosure of which is hereby incorporated herein by reference.

Figure 29:
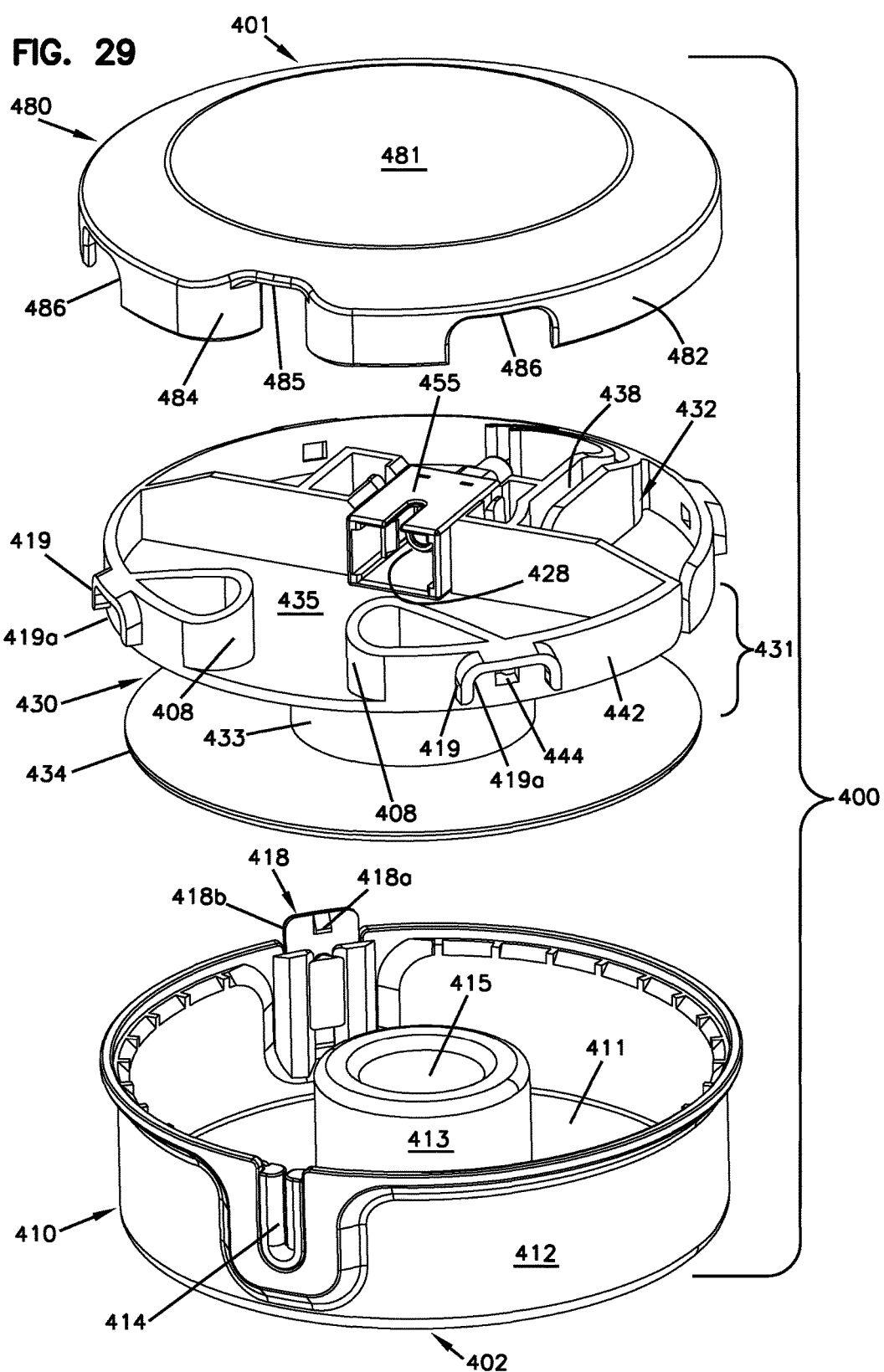
FIG. 29 is a perspective view of another example storage device including a cover, a spool arrangement, and a base, which are exploded away from each other, in accordance with the principles of the present disclosure.

FIG. 29 illustrates another example storage device 400 configured in accordance with the principles of the present disclosure is shown. The storage device 400 has a front 401 and a rear 402. The rear 402 of the storage device 400 faces a mounting surface (e.g., a wall within the residence, an outlet within a wall of the residence, etc.). The storage device 400 includes a base 410 and a spool arrangement 430. The base 410 defines the rear 402 of the storage device 400 and the spool arrangement 430 defines the front 401 of the storage device 400.

Figure 30:
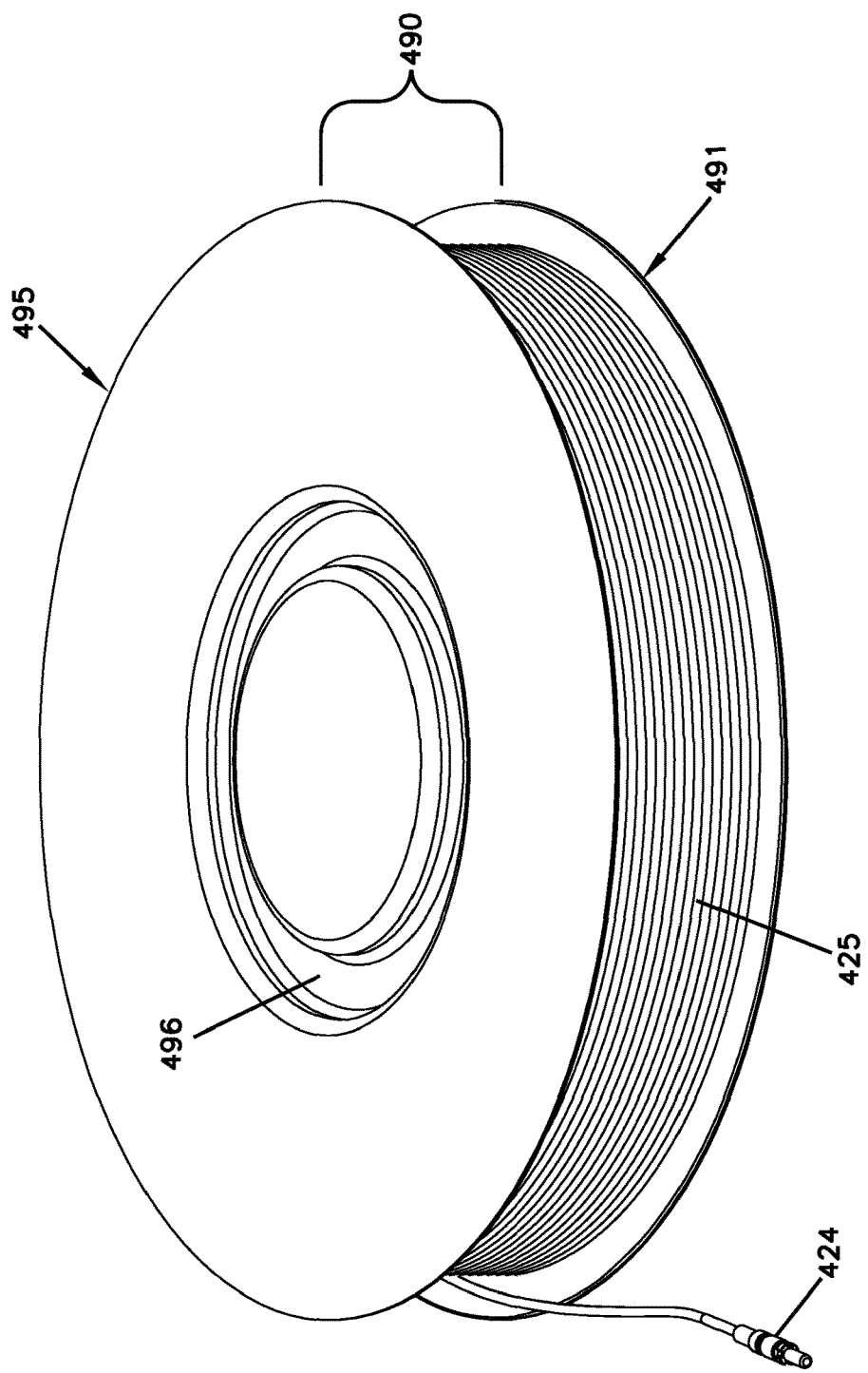
FIG. 30 shows a packaging arrangement holding a storage device and a cable coiled around an exterior of the storage device.
Figure 31:
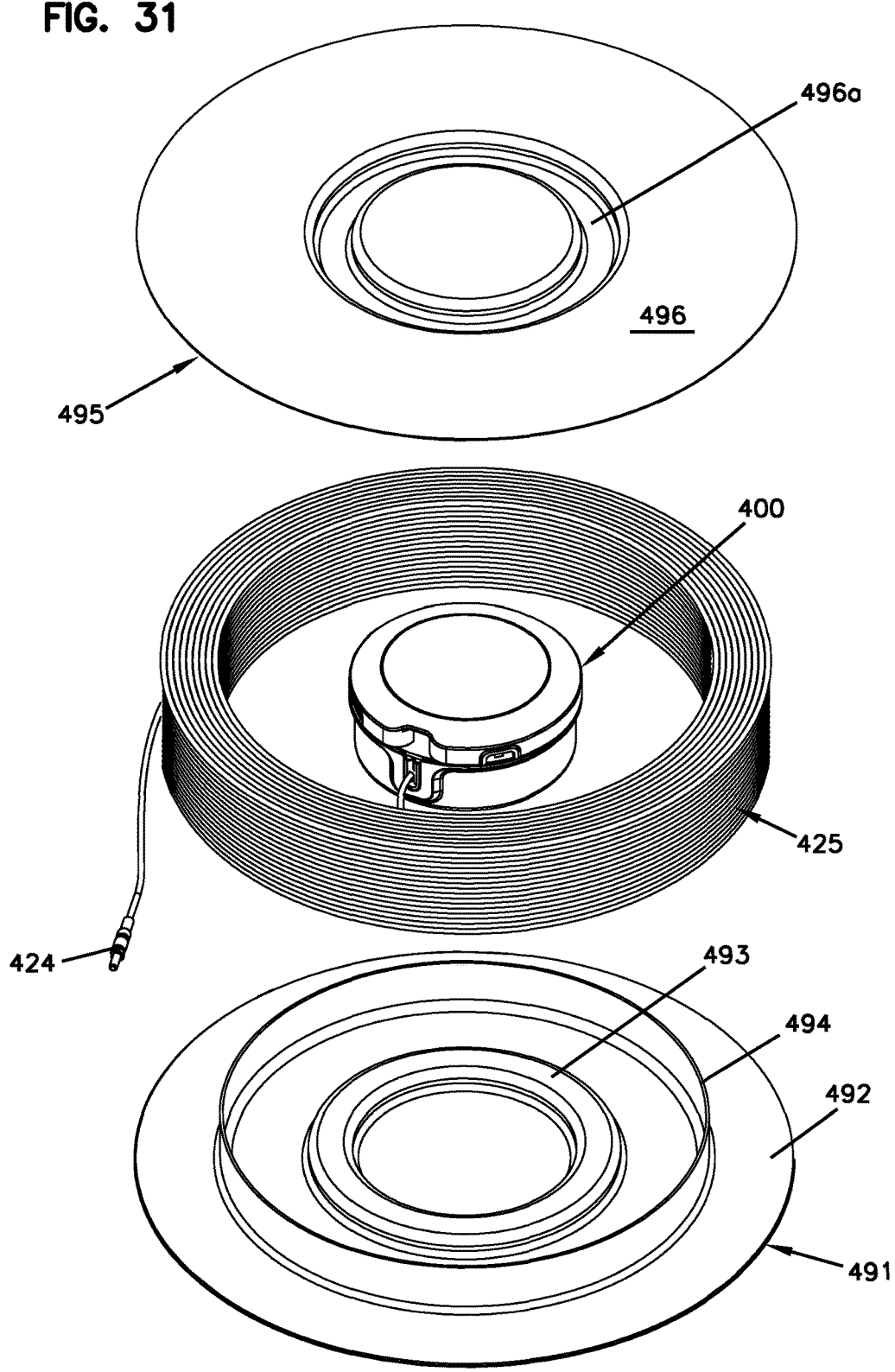
FIG. 31 is an exploded view of the packaging arrangement of FIG. 30.
Figure 32:
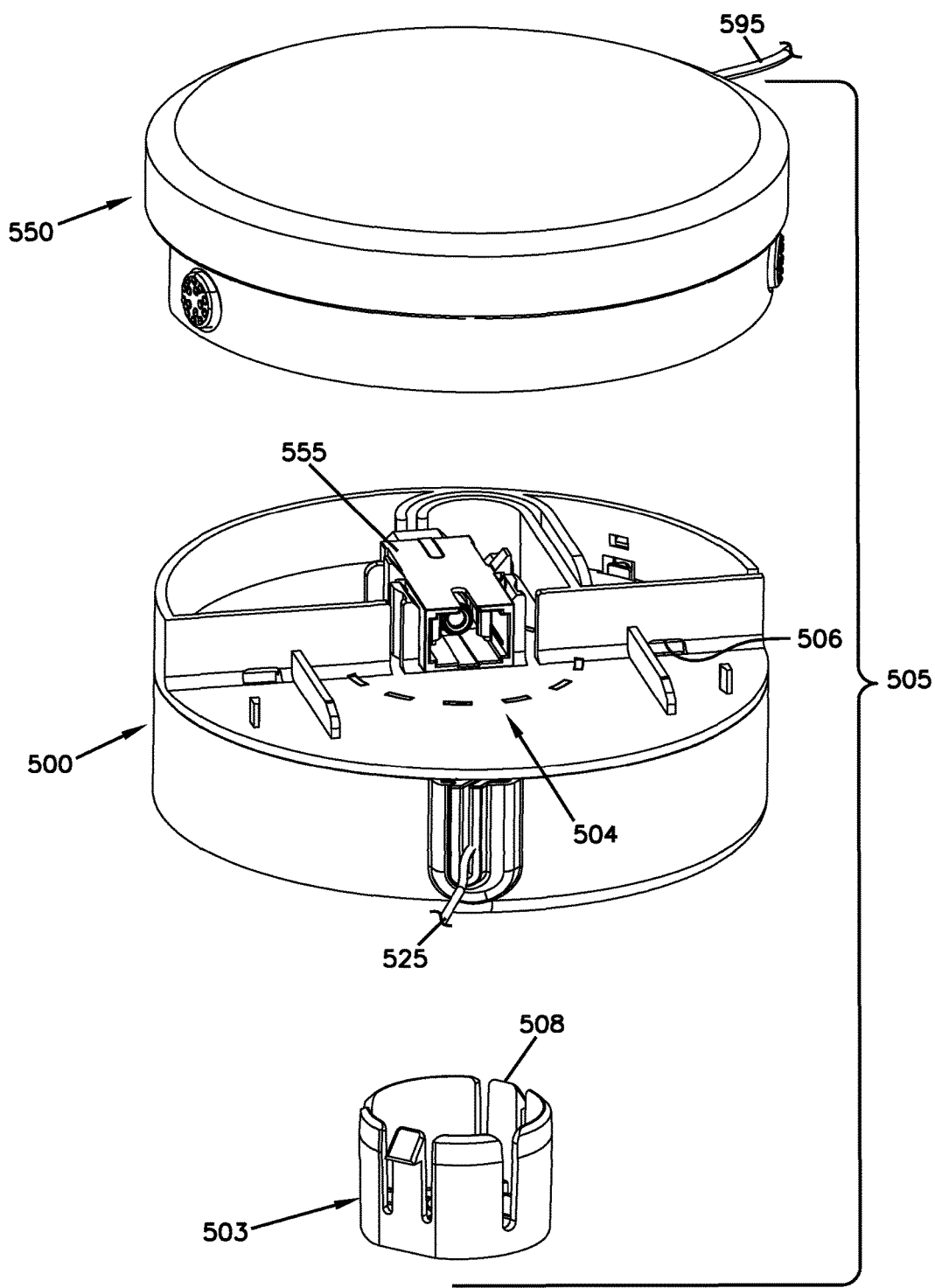
FIG. 32 is a front perspective view of an example cable storage unit including an example patchcord storage arrangement exploded from an example wall outlet, which is exploded from a mounting member.

The storage device 400 is configured to hold cable (e.g., a fiber optic cable) 425 (FIGS. 30 and 31). In examples, the fiber optic cable includes an optical fiber surrounded by a protective jacket or coating. The cable 425 extends between a first end 424 and a second end. In the example shown, the first end 424 is partially connectorized. In some implementations, the first end 424 of the cable 425 can be paid out from the storage device 400 by pulling on the first end 424. In other implementations, a majority of the cable 425 can be disposed external of the storage device 400 during installation of the storage device 400 and cable 425. After the cable 425 is routed from the storage device 400 to the fiber optic enclosure 106, an excess length of the cable 425 can be coiled within the storage device 400.

The spool arrangement 430 is configured to rotate relative to the base 410. The spool arrangement 430 has a drum region 431 and a management region 432 that rotate unitarily relative to the base 410. The drum region 431 is configured to hold the excess length of the cable 425. The base 410 defines a port 414 through which a portion of the cable 425 extends when the spool arrangement 430 is mounted to the base 410.

A spool mounting structure 413 (e.g., a spindle) extends outwardly from a central portion of the mounting wall 411. In certain examples, the spool mounting structure 413 defines a cavity 415. The spool arrangement 430 includes a drum 433 defining a bend radius limiter (see FIG. 21). A flange 434 extends radially outwardly from a first axial end of the drum 433. In certain examples, one or more ridges or other protrusions are disposed on the flange 434 and seat on the mounting wall 411 of the base 410 when the spool arrangement 430 is mounted to the base 410. The ridge facilitates rotating the spool arrangement 430 relative to the base 410.

Latching hooks extend within the drum 433 away from the management region 432 and towards the flange 434. The latching hooks can be inserted into the cavity 415 of the spool mounting structure 413 until the latching hooks engage a ledge of the base 410. The latching hooks hold the spool arrangement 430 to the base 410 while allowing rotation of the spool arrangement 430 relative to the base 410.

The management region 432 includes a routing flange 435 disposed at the second axial end of the drum 433. The management region 432 includes a mounting structure disposed at the routing flange 435. In some implementations, the mounting structure 439 is configured to hold the second end of the cable 425. In other implementations, the mounting structure 439 is configured to hold an optical adapter 455 that receives the second end of the cable 425. The optical adapter 455 defines an externally accessible port 428 at which a connectorized end of an optical fiber (e.g., connectorized end 117 of the jumper cable 116) can be received.

In certain implementations, the mounting structure 439 is positioned and configured to hold the optical adapter 455 (or second end of the cable 425) fully within a peripheral boundary of the storage device 400. For example, the mounting structure 439 can be positioned and configured to hold the optical adapter 455 fully within a peripheral boundary of the spool arrangement 430. An aperture connects the management region 432 with the drum region 431. Guide structure at the management region 432 define a routing pathway 438 along which the second end of the cable 425 is routed between the aperture and the mounting structure 439. The routing pathway 438 inhibits bending of the second end of the cable 425 beyond a maximum bend radius.

In certain implementations, the mounting structure 439 is positioned and configured to hold the optical adapter 455 so that the second port 428 of the adapter 455 is disposed centrally on the spool arrangement 430. In some such implementations, the second end of the cable 425 can be connectorized without a strain-relief boot to enhance flexibility of the second end of the cable 425. Example optical adapters suitable for use as the optical adapter 455 and example optical connectors suitable for use terminating the second end of the cable 425 can be found in WO 2014/049469, incorporated above.

In certain implementations, bend radius limiters 408 are disposed at the management region 432 to facilitate routing a connectorized end of an optical fiber (e.g., connectorized end 117 of the jumper cable 116) to the port 428. For example, two bend radius limiters 408 can be disposed towards a periphery of the routing flange 435 and spaced apart to define a gap through which the optical fiber can pass. The bend radius limiters 408 inhibit excessive bending of the optical fiber as the fiber is routed towards the port 428.

In some implementations, the spool arrangement 430 is configured to rotationally lock in a fixed position relative to the base 410. For example, when the first end 424 of the cable 425 has been sufficiently paid out from the storage device 400 or the excess length of the cable 425 is coiled within the storage device 400, the spool arrangement 430 can be locked to the base 410 to inhibit rotation therebetween. In some implementations, the spool arrangement 430 can be locked into one of a plurality of predetermined positions.

In the example shown, the base 410 includes a slider member 418 that is configured to slide along a channel defined by the sidewall 412 of the base 410. A sidewall 442 extending along at least part of the circumference of the spool arrangement 430 defines at least one stop aperture 444 disposed along a circumference of the sidewall 442. The slider 418 can be slide towards the spool arrangement 430 until a portion 418a of the slider 418 engages the stop aperture 444 to inhibit relative rotation between the spool arrangement 430 and the base 410. In certain implementations, multiple stop apertures 444 can be disposed along the sidewall 442.

In certain implementations, the spool arrangement 430 also includes stopping members 419 that extend radially outwardly from the sidewall 442 to define receptacles 419a facing towards the base 410. Each of the receptacles 419a is sized to selectively receive a peripheral edge 418b of the slider member 418 when the portion 418a of the slider member 418 is received at a corresponding one of the stop apertures 444. Accordingly, interaction between the peripheral edge 418b of the slider member 418 and the stopping member 419 further inhibits rotational between the spool arrangement 430 and the base 410.

In certain implementations, the storage arrangement 400 also includes a cover 480 configured to be disposed over the management region 432 of the storage device 400. The cover 480 provides protection to the second end of the cable 425. In some implementations, the cover 480 encloses part of an outer perimeter of the storage device 400 (see FIG. 31). The cover 480 includes a covering surface 481 from which an annular sidewall 482 extends. The sidewall 482 defines a port 485 that aligns with the port 428 of the storage device 400 when the cover 480 is mounted to the storage device 400. The sidewall 482 curves radially inwardly towards the port 485 to provide bend radius protection for an optical fiber entering the port 485.

In certain implementations, the sidewall 482 defines notches 486 sized and configured to receive the stopping members 419 of the spool arrangement 430. Accordingly, the cover 480 is held rotationally stationary relative to the spool arrangement 430. The cover 480 is configured to rotate unitarily with the spool arrangement 430 relative to the base 410. In certain implementations, the cover 480 also includes fixation structures that cooperate with structure on the routing flange 435 to further rotationally fix the cover 480 relative to the spool arrangement 430. For example, the cover 480 may include mounting flanges that extend downwardly from the covering surface 481 and engage an intermediate wall that extends across the routing flange 435.

FIGS. 30 and 31 illustrate an example a packaging arrangement 490 configured to hold a coil of cable 125, 225, 325, 425 external of a storage device 120, 200, 250, 300, 400. The packaging arrangement 490 includes a bottom member 491 having a base 492, an inner ring 493 sized to receive the storage device 120, 200, 250, 300, 400, and an outer ring 494 sized to receive the coil of the cable 125, 225, 325, 425.

In use, the cable 125, 225, 325, 425 is removed from the outer ring 494 as the cable 125, 225, 325, 425 is installed. When the cable 125, 225, 325, 425 has been installed, a remainder of the cable 125, 225, 325, 425 is coiled and positioned within the storage device 120, 200, 250, 300, 400. The storage device 120, 200, 250, 300, 400 is mounted to the mounting surface within the residence or other installation location. In some examples, the remainder of the cable 125, 225, 325, 425 is placed within the storage device 120, 200, 250, 300, 400 prior to mounting the storage device 400 to the mounting surface. In other examples, the remainder of the cable 125, 225, 325, 425 is placed within the storage device 400 after mounting the storage device 120, 200, 250, 300, 400 to the mounting surface.

In certain implementations, the packing arrangement 490 includes a top member 495 that cooperates with the bottom member 491 to enclose the storage device 120, 200, 250, 300, 400. In certain examples, the top member 495 is identical to the bottom member 491. In certain examples, the outer ring 494 of the bottom member 491 and an outer ring of the top member 495 cooperate to receive the coil of the cable 125, 225, 325, 425. In certain examples, the inner ring 493 of the bottom member 491 and an inner ring of the top member 495 cooperate to hold the storage device 120, 200, 250, 300, 400.

In certain examples, an exterior surface of at least one of the top and bottom members 495, 491 defines a groove 496. In an example, both the top and bottom members 495, 491 define a corresponding groove 496. In an example, the groove 496 corresponds with the location of the inner ring 493 of the bottom member 491.

Referring to FIGS. 32-39, another example cable storage unit 505 configured in accordance with the principles of the present disclosure is shown. The cable storage unit 505 includes a storage device 500 and a patchcord storage arrangement 550. The storage device 500 can be used as a wall outlet within a residence and the patchcord storage arrangement 550 can be mounted to the wall outlet 500 to form a cable storage unit 505. For the sake of clarity, the storage device 500 will be referred to as a wall outlet for the rest of this disclosure. It is noted, however, that the storage device 500 can be utilized outside of a residence (e.g., at a fiber optic enclosure 106, at the cable input location 104, etc.).

The storage device 500 is configured to hold cable (e.g., a fiber optic cable) 525. In examples, the fiber optic cable includes an optical fiber surrounded by a protective jacket or coating. The cable 525 extends between a first end and a second end. The first end of the cable 525 can be paid out from the storage device 500 by pulling on the first end. In the example shown, the first end is partially connectorized.

The patchcord storage arrangement 550 is configured to hold a patchcord 595 having a first end and a second end. The first end of the patchcord 595 can be dispensed from the patchcord storage arrangement 550.

Figure 33:
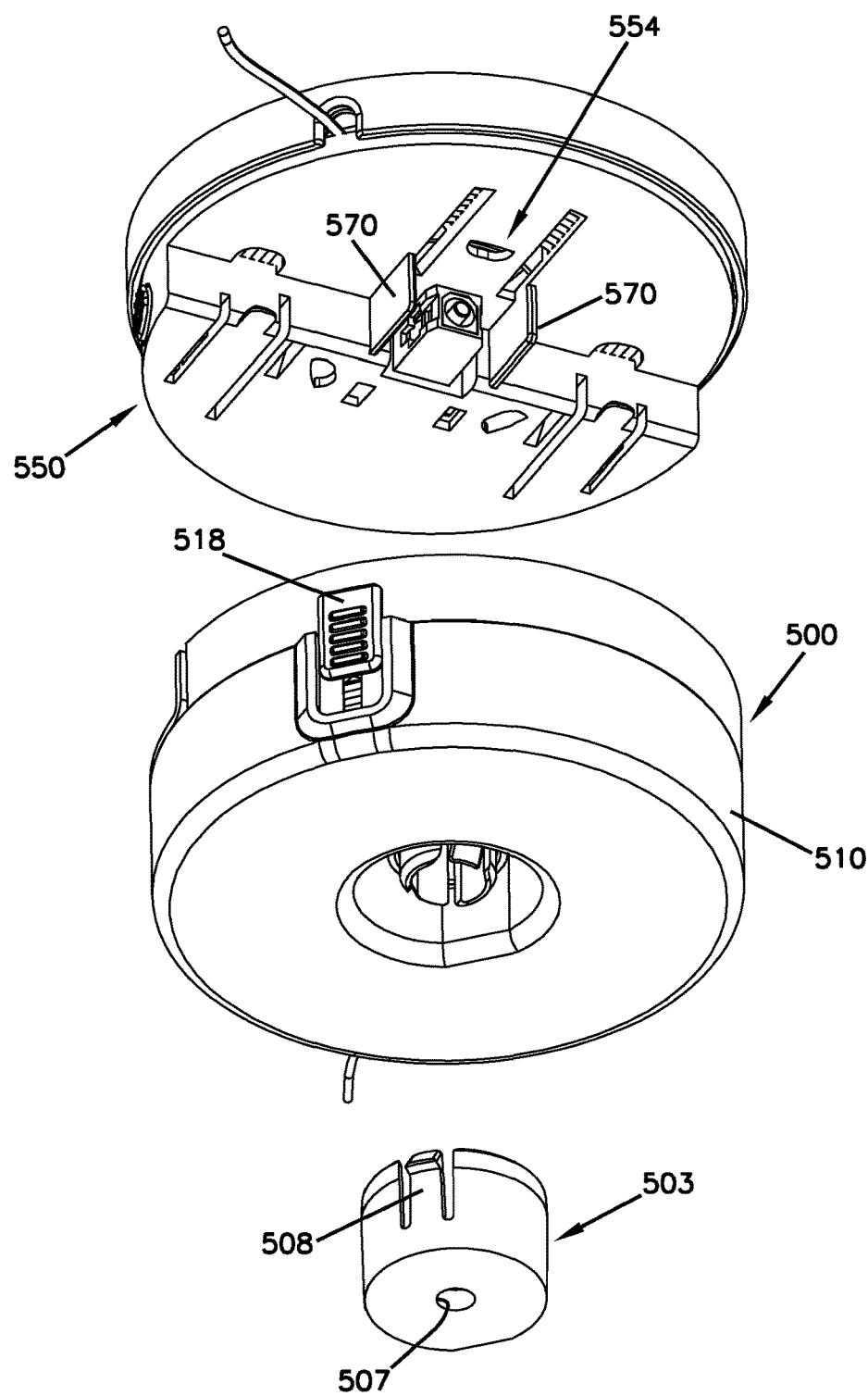
FIG. 33 is a rear perspective view of the exploded cable storage unit of FIG. 32.

The wall outlet 500 defines a first interface 504 and the patchcord storage arrangement 550 defines a second interface 554 that is configured to fit with the first interface 504 of the wall outlet 500 to form the cable storage unit 505. In certain implementations, the second end of the cable 525 is held at the first interface 504 and the second end of the patchcord 595 is held at the second interface 554. Accordingly, the second end of the cable 525 and the second end of the patchcord 595 are aligned with and oriented towards each other when the patchcord storage arrangement 550 is mounted to the wall outlet 500. In some implementations, an optical adapter 555 is held by the wall outlet 500. In other implementations, the optical adapter 555 is held by the patchcord storage arrangement 550. The optical adapter 555 defines a first port at which the second end of the cable 525 is held (FIG. 32) and a second port at which the second end of the patchcord 595 is held (FIG. 33).

To mount the patchcord storage arrangement 550 to the wall outlet 500, the second interface 554 is slid or otherwise moved towards the first interface 504 until the second end of the patchcord 595 is received at the second port of the optical adapter 555. In other implementations, the optical adapter 555 can be fixedly mounted at the second interface 554 of the patchcord storage arrangement 550 and can interface with the second end of the cable 525 when the patchcord storage arrangement 550 is mounted to the wall outlet 500.

In certain implementations, the first and second interfaces 504, 554 include attachment features that enable the patchcord storage arrangement 550 to be held at the wall outlet 500. For example, in certain examples, the first interface 504 defines apertures 506 and the second interface 554 includes lugs 556 sized to mate with the apertures 506 when the patchcord storage arrangement 550 is mounted to the wall outlet 500. Inserting the lugs 556 into the apertures 506 inhibits forward movement of the patchcord storage arrangement 550 off the wall outlet 500. Of course, in other implementations, the lugs can be disposed on the wall outlet 500 and the apertures may be defined by the patchcord storage arrangement 550.

Figure 34:
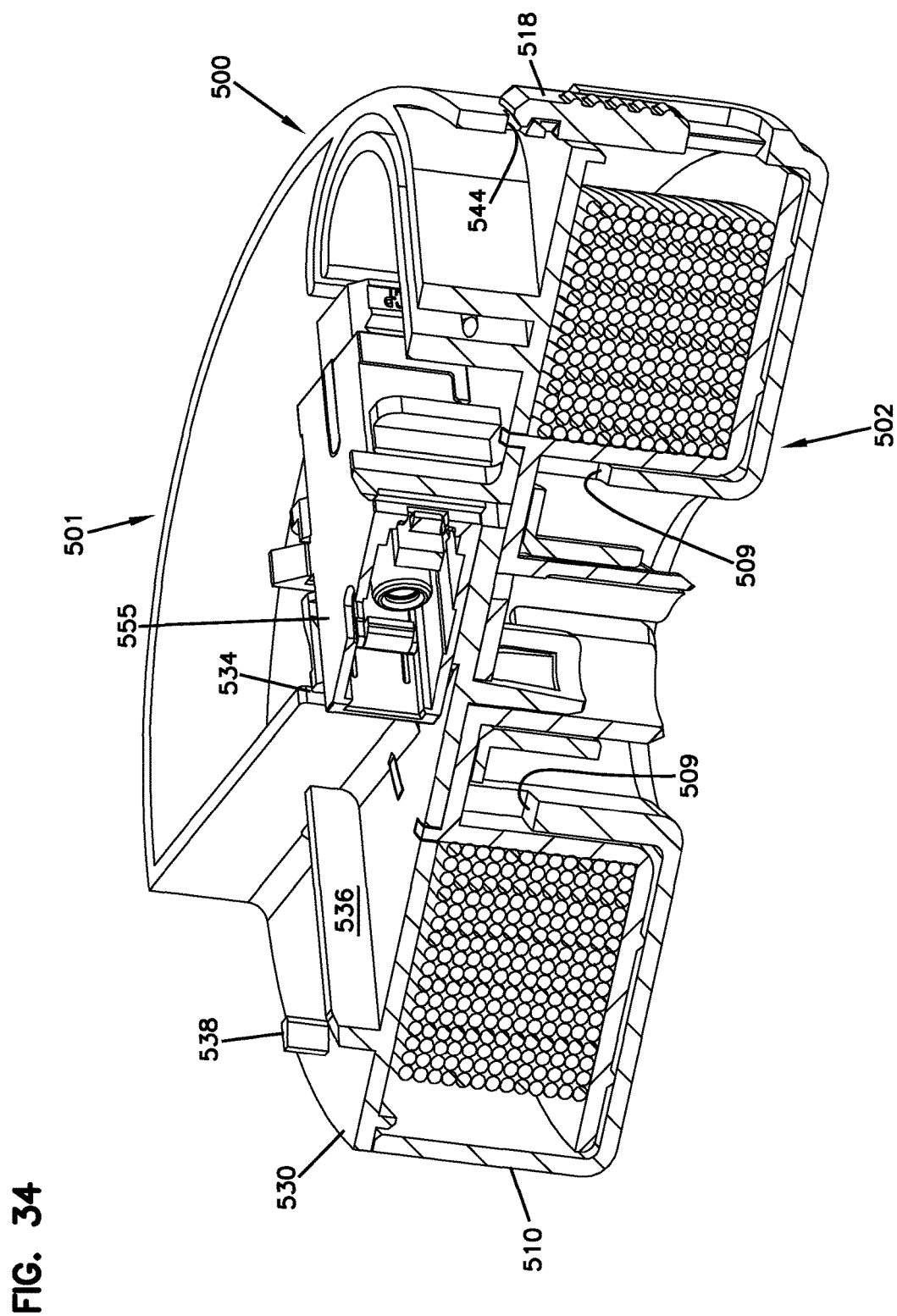
FIG. 34 is a cross-sectional view of the wall outlet of FIG. 33.
Figure 35:
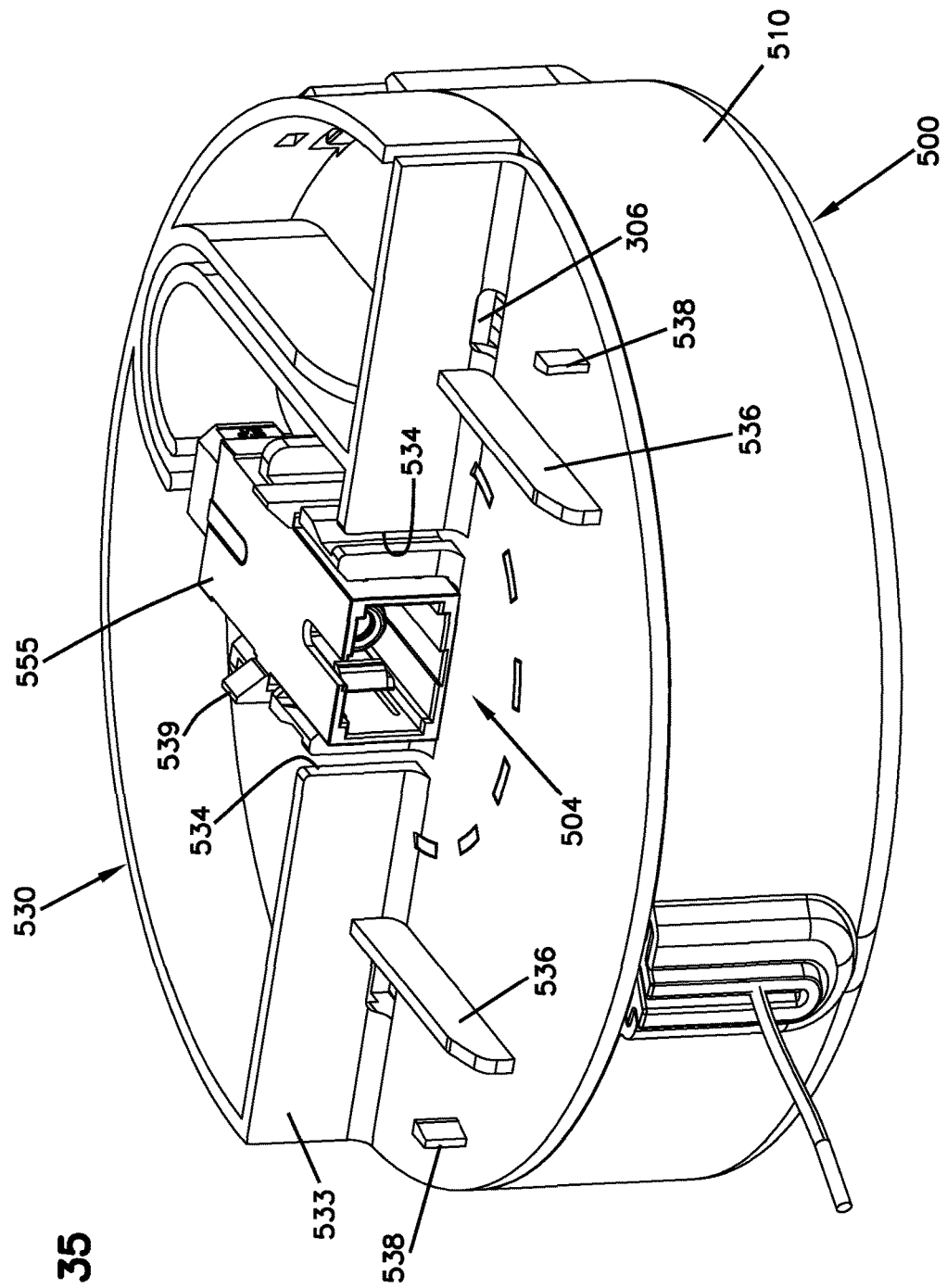
FIG. 35 is a front perspective view of the wall outlet of FIG. 33.

The wall outlet 500 has a front 501 and a rear 502 (FIG. 34). The rear 502 of the wall outlet 500 faces a mounting surface (e.g., a wall within the residence, an outlet within a wall of the residence, etc.). As shown in FIG. 35, the wall outlet 500 includes a base 510 and a spool arrangement 530. The base 510 defines the rear 502 of the wall outlet 500 and the spool arrangement 530 defines the front 501 of the wall outlet 500. The spool arrangement 530 is configured to rotate relative to the base 510. The wall outlet 500 is substantially the same as the wall outlet 300 described above with respect to FIGS. 19-21 except as specified below.

The rear 502 of the wall outlet 500 is configured to fit with a mounting member 503. In certain implementations, a portion of the wall outlet 500 is rotatable relative to the mounting member 503. In examples, another portion of the wall outlet 500 is not rotatable relative to the mounting member 503. In the example shown, the portion of the wall outlet 500 that interfaces with the mounting member 503 is not rotatable relative to the mounting member 503. Other configurations are possible.

The mounting member 503 includes a base defining an aperture 507. A fastener, peg, or other structure can be inserted through the aperture 507 to secure the mounting member 503 to a wall or other surface. In some implementations, the mounting member 503 is rotatable relative to the wall or other surface to which the mounting member 503 is secured. In other implementations, the mounting member 503 is not rotatable relative to the wall or other surface to which the mounting member 503 is secured. At least one flexible latching finger 508 extends forwardly of the base. Each latching finger 508 defines a hook sized and oriented to catch a forward-facing shoulder 509 (FIG. 34) of the wall outlet 500. In certain implementations, wall segments that are less flexible than the latching finger also extend forwardly of the base.

The spool arrangement 530 is configured to rotate relative to the base 510. The spool arrangement 530 has a drum region and a management region that rotate unitarily relative to the base 510. The drum region is configured to hold a majority of the cable 525. The base 510 defines a port 514 through which the first end of the cable 525 extends when the spool arrangement 530 is mounted to the base 510.

The base 510 of the wall outlet 500 includes a sidewall extending outwardly from a perimeter of a mounting wall. The sidewall defines the port. A spool mounting structure (e.g., a spindle) extends outwardly from a central portion of the mounting wall. In certain examples, the spool mounting structure defines a cavity. The spool arrangement includes a drum defining a bend radius limiter. A flange extends radially outwardly from a first axial end of the drum. In certain examples, one or more ridges or other protrusions are disposed on the flange and seat on the mounting wall of the base 510 when the spool arrangement 530 is mounted to the base 510. The ridge facilitates rotating the spool arrangement 530 relative to the base 510. Latching hooks extend within the drum away from the management region and towards the flange. The latching hooks can be inserted into the cavity of the spool mounting structure until the latching hooks engage the ledge. The latching hooks hold the spool arrangement 530 to the base 510 while allowing rotation of the spool arrangement 530 relative to the base 510.

In some implementations, the spool arrangement 530 is configured to rotationally lock in a fixed position relative to the base 510. For example, when the first end of the cable 525 has been sufficiently paid out from the storage device 500, the spool arrangement 530 can be locked to the base 510 to inhibit further dispensing of the cable 525. In some implementations, the spool arrangement 530 can be locked into one of a plurality of predetermined positions. In other implementations, the spool arrangement 530 can be locked into one rotational position.

In the example shown, the base 510 includes a slider member 518 that is configured to slide along a channel defined by the sidewall of the base 510. A sidewall extending along at least part of the circumference of the spool arrangement 530 defines at least one stop aperture 544 disposed along a circumference of the sidewall. The slider 518 can be slide towards the spool arrangement 530 until a portion of the slider 518 engages the stop aperture 544 to inhibit relative rotation between the spool arrangement 530 and the base 510 (see FIG. 34). In certain implementations, multiple stop apertures 544 can be disposed along the sidewall.

The management region of the spool arrangement 530 includes a routing flange disposed at the second axial end of the drum. The management region includes a mounting structure 539 disposed at the routing flange. In certain implementations, the routing flange includes a ridge that extends towards the flange. The ridge is positioned to fit within the sidewalls of the base 510 when the spool arrangement 530 is mounted to the base 510. In some implementations, the mounting structure 539 is configured to hold the second end of the cable 525. In other implementations, the mounting structure 539 is configured to hold an optical adapter 555 having a first port that receives the second end of the cable 525.

An aperture connects the management region of the spool arrangement 530 with the drum region of the spool arrangement 530. In an example, the aperture defines an elongated slot. Guide structures at the management region define a routing pathway along which the second end of the cable 525 is routed between the aperture and the mounting structure. In an example, a ramp extends into the aperture to guide the cable 525 between the regions. The routing pathway inhibits bending of the second end of the cable 525 beyond a maximum bend radius. In certain implementations, the guide structure defines a finger access recess that facilitates plugging the second end of the cable 525 into the first port of the optical adapter 555.

In certain implementations, the mounting structure 539 is positioned and configured to hold the optical adapter 555 (or second end of the cable 525) fully within a peripheral boundary of the storage device 500. For example, the mounting structure 539 can be positioned and configured to hold the optical adapter 555 fully within a peripheral boundary of the spool arrangement 530. In certain examples, the mounting structure 539 includes one or more latching hooks extending upwardly from the routing surface.

In certain implementations, the mounting structure 539 can be positioned and configured to hold the optical adapter 555 so that the second port of the adapter 555 is disposed centrally on the spool arrangement 530. In some such implementations, the second end of the cable 525 can be connectorized without a strain-relief boot to enhance flexibility of the second end of the cable 525. Example optical adapters suitable for use as the optical adapter 555 and example optical connectors suitable for use terminating the second end of the cable 525 can be found in WO 2014/049469, the disclosure of which is hereby incorporated herein by reference. In other such implementations, the second end of the cable 525 can include a rigid boot to provide bend control.

As shown in FIG. 35, alignment structures also can be disposed at the management region of the spool arrangement 530. For example, in certain implementations, slots 534 in an interface wall 533 are provided at opposite sides of the optical adapter 555. The slots 534 facilitate mounting the patchcord storage arrangement 550 to the wall outlet 500 as will be described in more detail herein.

In certain implementations, one or more alignment guides 536 extend outwardly from the interface wall 533. In the example shown, the alignment guides 536 include elongated ribs. In certain examples, one alignment guide 536 is disposed at each side of the optical adapter 555. In the example shown, each slot 534 in the interface wall 533 is disposed between the optical adapter 555 and one of the alignment guides 536. The alignment guides 536 facilitate mounting the patchcord storage arrangement 550 to the wall outlet 500 as will be described in more detail herein.

In certain implementations, an abutment member 538 extends upwardly from the second axial end of the drum at a location spaced from the interface wall 533. In certain examples, two abutment members 538 extend upwardly from the second axial end of the drum. In examples, the abutment members 538 are positioned on opposite sides of the alignment guides 536. The abutment members 538 facilitate mounting the patchcord storage arrangement 550 to the wall outlet 500 as will be described in more detail herein.

Figure 36:
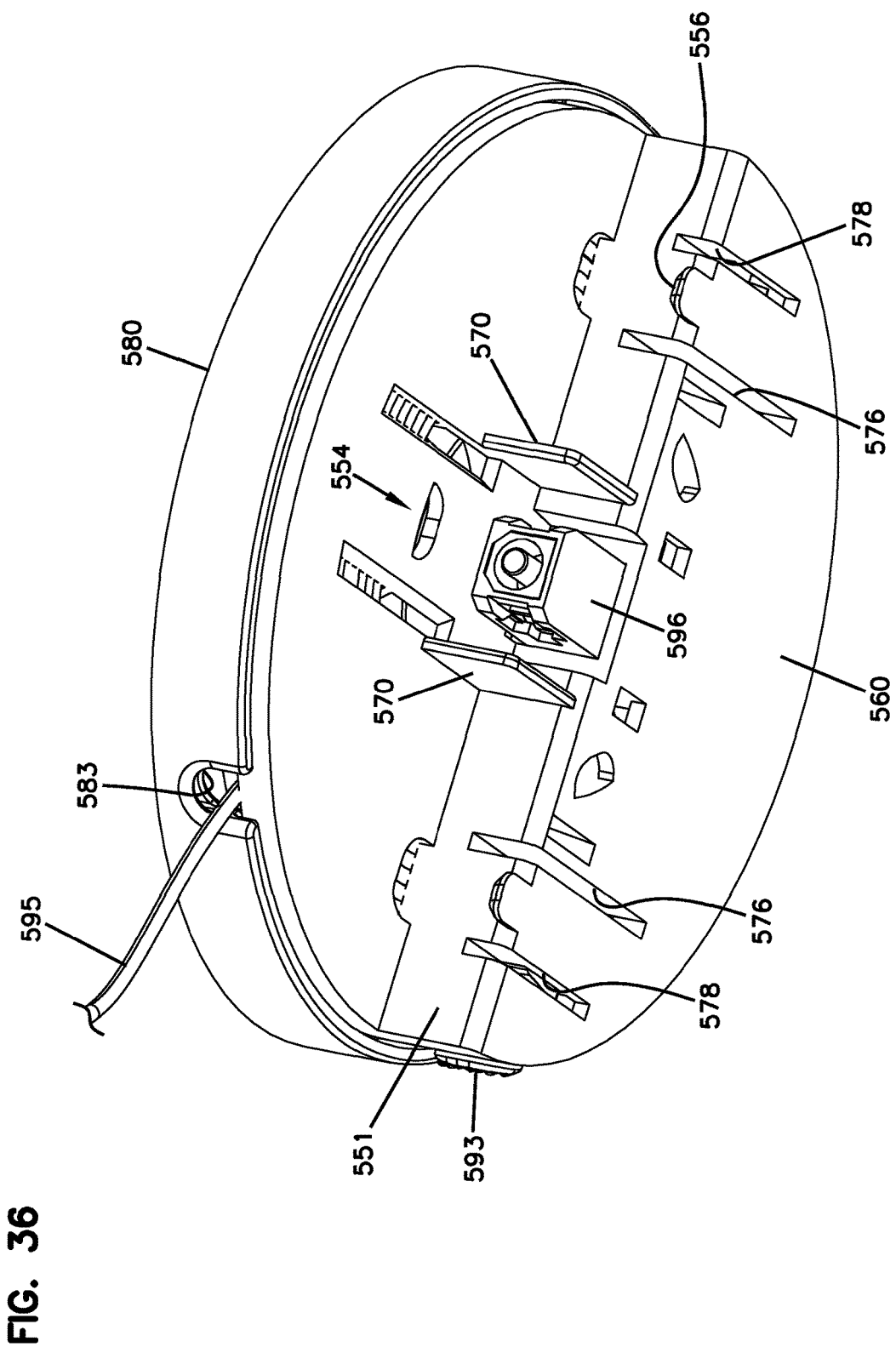
FIG. 36 is a rear perspective view of the patchcord storage arrangement of FIG. 33.

As shown in FIG. 36, the patchcord storage arrangement 550 includes a spool arrangement 560 and a cover 580. The spool arrangement 560 is configured to hold a majority of the patchcord 595. The spool arrangement 560 includes a mounting location at which the second end 596 of the patchcord 595 is held. In certain implementations, an optical adapter also can be held at the mounting location. The cover 580 defines a port 583 through which the first end of the patchcord 595 can be dispensed. The patchcord storage arrangement 550 is substantially the same as the patchcord storage arrangement 350 described above with respect to FIGS. 22-28 except as specified below.

The spool arrangement 560 includes a sidewall extending upwardly from a stepped rear wall. The rear wall includes a first portion that is connected to a second portion by an interface wall 551. The first portion mounts to the routing surface of the wall outlet spool arrangement 530 and the second portion mounts over the guide structure of the wall outlet spool arrangement 530.

The spool arrangement 560 also includes a drum extending upwardly from the rear wall. The patchcord 595 is wrapped around the drum. The second portion of the rear wall defines part of a support surface for the patchcord 595 when the patchcord 595 is wound around the drum. An insert mounts to the spool arrangement 560 to cooperate with the second portion to define the support surface. In some implementations, the insert defines fastener apertures through which fasteners can be inserted to secure the insert to the spool arrangement 560. In other implementations, the insert can be latched or otherwise connected to the spool arrangement 560.

The first portion of the rear wall and the sidewall form a pocket below the support surface. The second end of the patchcord 595 is retained at a mounting location within the pocket. The interface wall 551 defines an aperture through which the second end of the patchcord 595 extends or is accessible. In some implementations, the drum of the spool arrangement 560 extends into the pocket. In such implementations, the drum defines a slot or break through which the second end of the patchcord 595 can extend to reach the mounting location.

Guides structures are disposed within the pocket to guide the second end of the patchcord 595 from the support surface to the mounting location. In certain examples, a ramped surface may extend from the support surface to a channel defined between the guide structures and the sidewall. In certain examples, the insert defines notches that accommodate transitioning the patchcord 595 from the support surface to the pocket. The channel leads to the mounting location. In certain examples, the insert includes guide structures to cooperate with the guide structures of the spool arrangement 560 to define the channel.

In some implementations, the second end of the patchcord 595 is held at the mounting location using a retainer. In some implementations, the retainer includes either apertures or latching lugs that mate with latching lugs or apertures at the mounting location to hold the retainer to the mounting location. In the example shown, the latching lugs are disposed within the pocket at the mounting location. The second end of the patchcord 595 is disposed between the retainer and the first portion of the rear wall. In certain implementations, the retainer can define an aperture to receive a rib disposed on the optical connector terminating the second end of the patchcord 595. In examples, a similar aperture can be defined at the mounting location to receive a second rib at an opposite side of the optical connector form the first rib. Engagement between the ribs and the apertures inhibits axial movement of the optical connector.

In certain implementations, shroud members 570 extend outwardly from the interface wall 551 at opposite sides of the second end of the patchcord 595. The shroud members 570 inhibit an object (e.g., a portion of the wall outlet 500, a finger of a user, or other structure) from striking or otherwise unintentionally contacting the second end of the patchcord 595. For example, the second end of the patchcord 595 can include a polished optical fiber, an optical ferrule holding a polished optical fiber, or other terminating structure.

In certain examples, the shroud members 570 fit within the slots 534 defined in the interface wall 533 of the wall outlet 500 when the patchcord storage arrangement 550 is mounted to the wall outlet 500. Accordingly, the shroud members 570 facilitate aligning the patchcord storage arrangement 550 and the wall outlet 500. The shroud members 570 also inhibit improper insertion of the second end of the patchcord 595 into the optical adapter 555, thereby protecting the second end of the patchcord 595.

In certain implementations, the rear wall of the patchcord storage arrangement 550 defines one or more slots 576 sized and shaped to receive the alignment guides 536 of the wall outlet 500 when the patchcord storage arrangement 550 is mounted to the wall outlet 500. In certain examples, all of the shroud members 570 are disposed between two of the slots 576. In an example, the slots 576 extend parallel to each other.

In certain implementations, the rear wall defines one or more channels 578. In the example shown, the rear wall defines two channels 578. In certain examples, the channels 578 are shorter than the slots 576. In certain examples, each channel 578 is disposed at an opposite side of one of the slots 576 from the optical adapter 555. In certain examples, each foot 556 is disposed between one of the channels 578 and one of the slots 576 in the rear wall of the patchcord storage arrangement 550. Each channel 578 has a width sized to receive one of the abutment members 538 of the wall outlet 500 as will be described in more detail herein.

In some implementations, the cover 580 includes a covering surface from which a sidewall extends. The sidewalls overlap the drum when the cover 580 is mounted to the spool arrangement 560. Accordingly, the cover 580 cooperates with the spool arrangement 560 to protect the patchcord 595. The sidewall of the cover 580 defines a port 583 through which the first end of the patchcord 595 extends. To dispense the patchcord 595 from the drum, the first end of the patchcord 595 is pulled. Pulling the first end causes the cover 580 to rotate relative to the spool arrangement 560 so that the port 583 revolves around the drum.

In certain implementations, the cover 580 includes a latching feature that extends from the covering surface within the sidewall. The latching feature defines a ledge facing the covering surface. The ledge engages latching arms of the spool arrangement 560 to hold the cover 580 to the spool arrangement 560. In certain examples, the latching arms define part of the drum. In certain implementations, ribs can be provided at an interior of the sidewall. In examples, the ribs provide strength to the cover 580.

Figure 37:
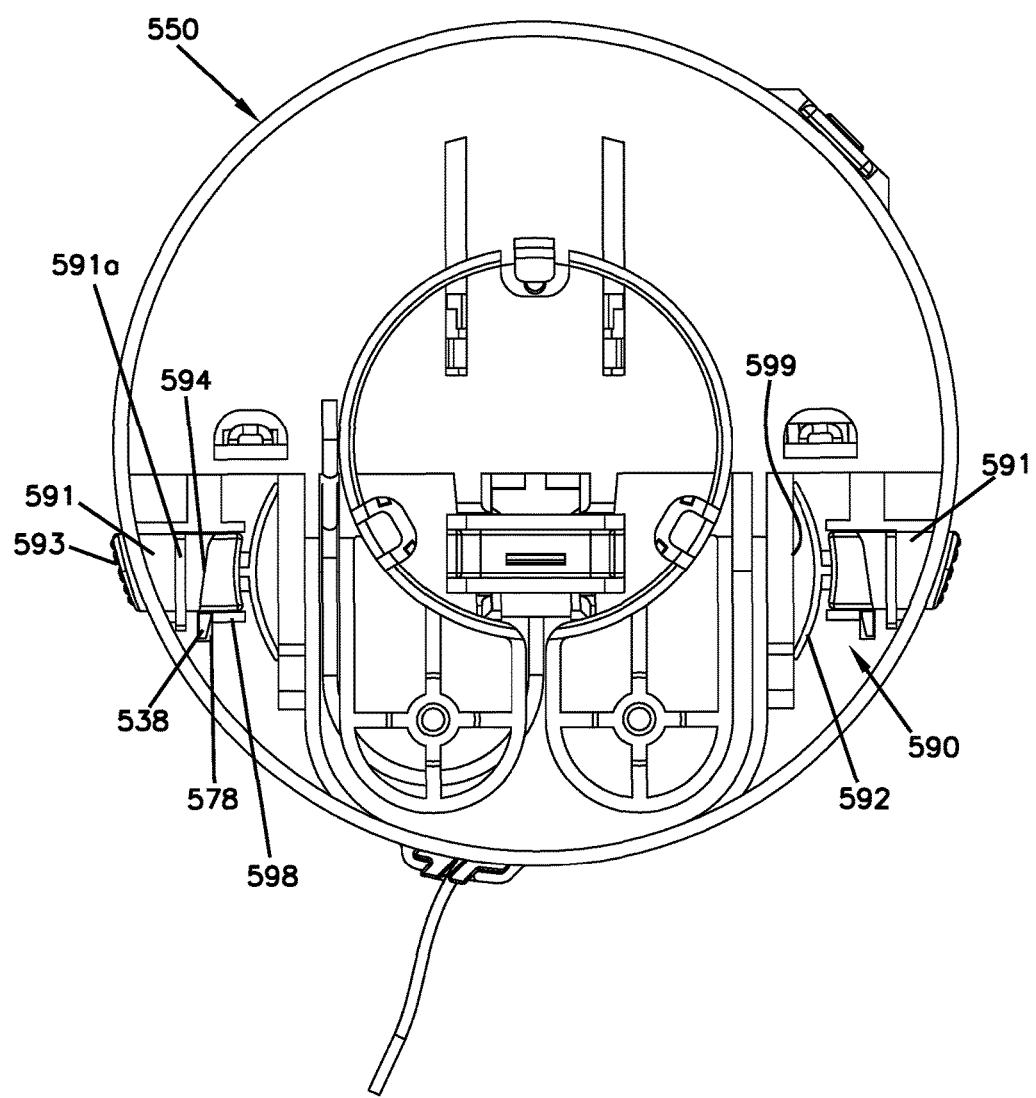
FIG. 37 is a front elevational view of the cable storage unit of FIG. 32 with a cover, patchcord, and insert removed from the patchcord storage arrangement.
Figure 38:
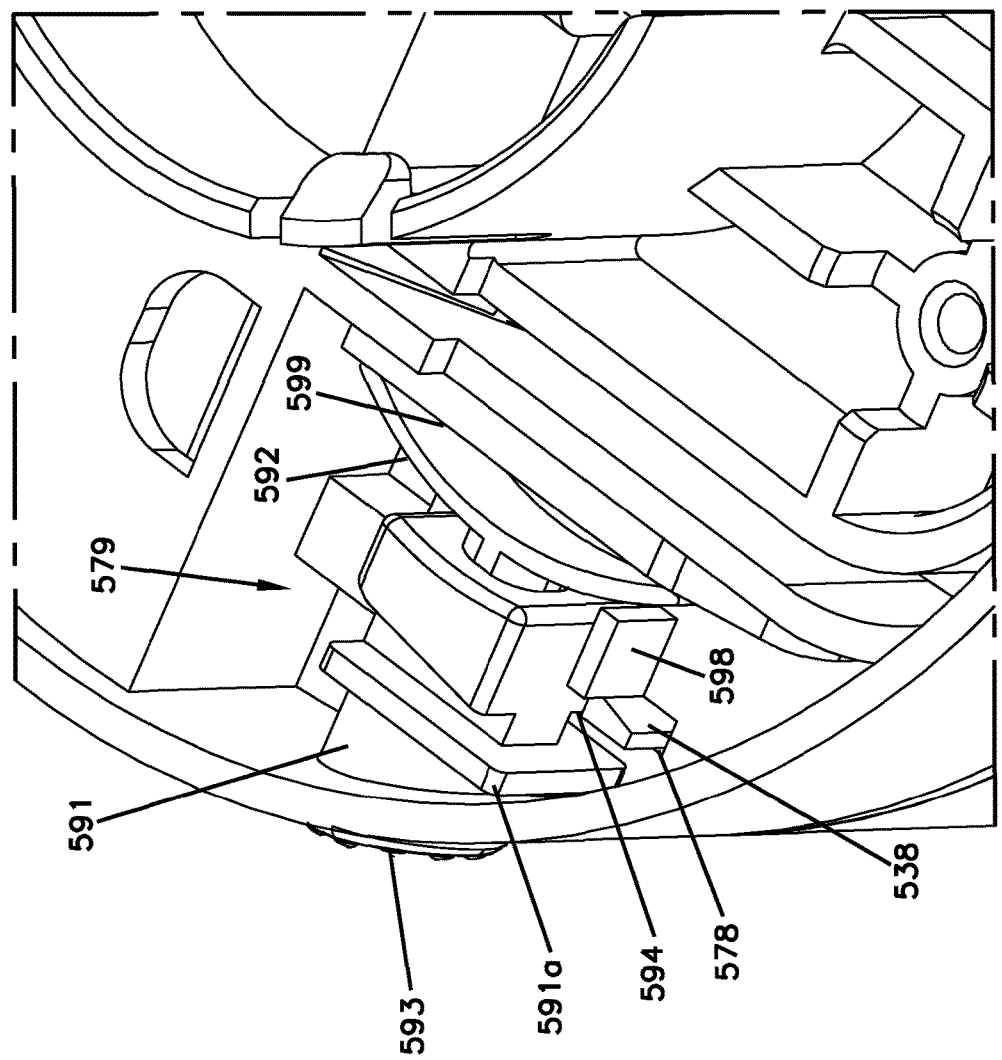
FIG. 38 is an exploded view of a latching arrangement of the cable storage unit of FIG. 37.
Figure 39:
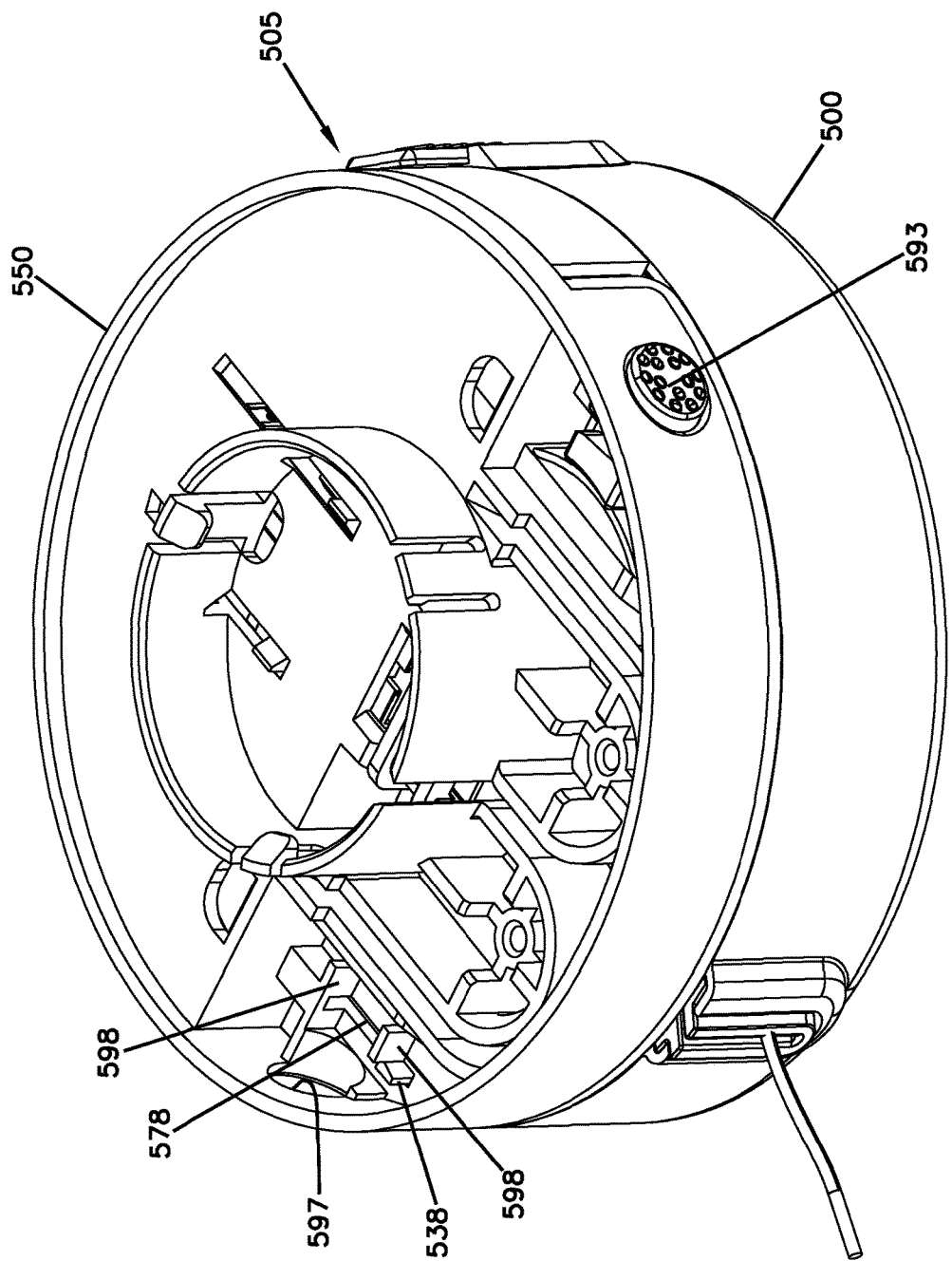
FIG. 39 is a perspective view of the cable storage unit of FIG. 37.

Referring to FIGS. 37-39, the patchcord storage arrangement 550 can be releasably secured to the wall outlet 500 using a latching arrangement. FIG. 37 shows the cable storage unit 505 with the cover 580, patchcord 595, and insert of the patchcord storage arrangement 550 removed for ease in viewing. With the cover 580 removed, two releasable retaining arrangements 590 are visible. Each retaining arrangement 590 includes a button 591 disposed in a cavity 579 defined by the patchcord storage arrangement 550. A first axial end of the button 591 abuts an abutment wall 599 of the cavity 579. A second, opposite axial end of the button 591 extends towards an aperture 597 (FIG. 39) defined in the sidewall of the spool arrangement 560.

The button 591 is movable within the cavity 579. Frame walls 598 cooperate to guide the button 591 as the button 591 moves within the cavity 579. In certain implementations, the button 591 is movable between a retaining position and a releasing position. When in the retaining position, the button 591 extends through the aperture 597 in the sidewall. When in the releasing position, the button 591 is retracted from the aperture 597. In certain implementations, the button 591 is biased to the retaining position. For example, in certain implementations, the first axial end of the button 591 includes a biasing member 592 (e.g., a spring). In the example shown in FIG. 28, the biasing member is a leaf spring. Other configurations are possible.

In some implementations, the button 591 is movable along a slide axis. For example, the frame walls 598 may define parallel surfaces between which the button 591 is disposed. Each button 591 is oriented within the cavity 579 to extend across one of the channels 578 of the patchcord storage arrangement 550. In an example, the channel 578 extends between the frame walls 598. Each button 591 defines a groove 594 that faces towards and extends parallel with the respective channel 578. When the button 591 is in the retaining position, the groove 594 does not align with the channel 578. When the button 591 is in the releasing position, the groove 594 aligns with the channel 578.

When the patchcord storage arrangement 550 is mounted to the wall outlet 500, an abutment member 538 of the wall outlet 500 extends through the channel 578. The groove 594 is sized to enable passage of the abutment member 538 along the groove 594 when the abutment member 538 aligns with the groove 594.

The patchcord storage arrangement 550 can be coupled to the wall outlet 500 by retracting the buttons 591 to the releasing position and sliding the second interface 554 of the patchcord storage arrangement 550 towards the first interface 504 of the wall outlet 500. The lugs 556 of the patchcord storage arrangement 550 are inserted into the apertures 506 of the wall outlet 500 as described above. The abutment members 538 slide across the respective buttons 591 along the grooves 594 of the respective buttons 591.

Then, the buttons 591 move to the retaining position, which inhibits movement of the abutment members 538 along the grooves 594 of the respective buttons 591 and, hence, along the channel 578 of the patchcord storage arrangement 550. Accordingly, the interaction between the abutment members 538 and the button 591 inhibits sliding movement of the patchcord arrangement 550 away from the wall outlet 500. Inhibiting such sliding movement prevents the lugs 556 from being removed from the apertures 506, which further inhibits removal of the patchcord arrangement 550 from the wall outlet 500.

In certain implementations, the abutment member 538 is shaped to facilitate insertion of the abutment member 538 into the groove 594 of the button 591 in a first direction and to inhibit such insertion in a second direction. For example, one end of the abutment member 538 may be narrower than an opposite end. The narrower end fits into the groove 594 more easily than the opposite end. In the example shown, the narrower end faces away from the button 591 when the patchcord storage arrangement 550 is mounted to the wall outlet 500. Accordingly, the abutment member 538 is shaped and configured to facilitate mounting of the patchcord storage arrangement 550 to the wall outlet 500 and to inhibit detaching the patchcord storage arrangement 550 from the wall outlet 500.

In certain implementations, the second axial end of the button 591 defines a textured surface 593. In certain implementations, the button 591 includes a flange 591a that engages the sidewall of the spool arrangement 560 when the button 591 is in the retaining position. The engagement between the flange 591a and the sidewall limits the travel of the button 591 through the sidewall aperture 597.

In use of the cable storage unit 505, a desired length of the cable 525 is dispensed from the wall outlet 500 by pulling on the first end of the cable 525. In some implementations, the first end is connected to a fiber optic enclosure 120 outside of the residence. In other implementations, the first end is connected to a transition box at a boundary of the residence. The spool arrangement 530 of the wall outlet 500 is locked to the base 510, which is secured to a surface within the residence.

In some implementations, a desired length of the patchcord 595 is dispensed from the patchcord storage arrangement 550 by pulling on the first end of the patchcord 595. The first end of the patchcord 595 is connected to an ONT 116 or other optical equipment. In certain implementations, the patchcord storage arrangement 550 dispenses the patchcord 595 by rotating a cover 580 relative to a spool arrangement 560. In certain examples, the cover 580 can be locked relative to the spool arrangement 560 when the desired amount of patchcord 595 has been dispensed.

Excess length of both the cable 525 and the patchcord 395 are stored at the cable storage unit 505. The patchcord storage arrangement 595 is mounted to the wall outlet 500 by moving the second interface 554 towards the first interface 504. In some implementations, the patchcord storage arrangement 595 is mounted to the wall outlet 500 prior to dispensing either cable 525, 595. In other implementations, the patchcord storage arrangement 595 is mounted to the wall outlet 500 after dispensing one of the cables 525, 595 and prior to dispensing the other cable 595, 525. In still other implementations, the patchcord storage arrangement 595 is mounted to the wall outlet 500 after dispensing both cables 525, 595.

In certain implementations, the patchcord storage arrangement 550 rotates with the spool arrangement 530 while the cable 525 is paid out. In certain implementations, the spool arrangement 560 of the patchcord storage arrangement 550 and the second end of the patchcord 595 remain stationary relative to the wall outlet 500 while the first end of the patchcord 595 is paid out.

Having described the preferred aspects and implementations of the present disclosure, modifications and equivalents of the disclosed concepts may readily occur to one skilled in the art. However, it is intended that such modifications and equivalents be included within the scope of the claims which are appended hereto.

LIST OF REFERENCE NUMERALS AND
CORRESPONDING FEATURES

F facility
R residences
100 fiber optic network
102 feeder cable
104 cable input location
106 fiber optic enclosure
108 riser cable
110 subscriber cable
112 wall outlet box
114 ONT
116 jumper cable
117 optical connector
118 power cable
120, 200, 250, 300, 400, 500 storage device
120A, 120B storage arrangement
121, 201, 251, 301, 401, 501 front
122, 202, 252, 302, 402, 502 rear
124, 224, 324, 424 first end
125, 225, 325, 425, 525 cable
126, 226, 326 second end
128, 328, 428 second port
129 stub length
130, 210, 260, 310, 410, 510 base
131, 211, 261, 311, 411 mounting wall
132, 212, 262, 312, 412 sidewall
133, 213, 263, 313, 413 spool mounting structure
134, 214, 264, 314, 414 port
135, 215, 265, 315, 415 cavity
136, 266, 316 ledge
137, 267, 317 channel
138, 268, 318, 418, 518 slider member
139 annular recess
139a stop members
140, 230, 270, 270', 330, 430 spool arrangement
141, 231, 271, 271', 331, 431 drum region
142, 232, 272, 272', 332, 432 management region
143, 233, 273, 333, 433 drum
144, 234, 274, 334, 434 flange
144a, 274a, 334a ridge
145, 235, 275, 335, 435 routing surface
146, 236, 276, 336 latching hooks
147, 237, 277, 277', 337 aperture
148, 278, 278', 342, 442 sidewall
149, 279, 344, 444, 544 stop members/apertures
150, 239, 280, 280', 339, 439 mounting structure
152, 283, 283' guides
153, 238, 284, 284', 338, 438 routing pathway
155, 255, 355, 455, 555 optical adapter
156 first port
160, 180, 480 cover
161, 181, 481 covering surface
162, 182, 482 sidewall
163, 183 port
164 notches
165 mounting member
166 mounting surface
167 sidewall
168 fastener hole
169 crenellations
170 mounting member
171 mounting surface
172 through-passage
174 bend radius limiter
175 guides
176 sidewall
177 retention members
178 apertures
185 brim
186 alignment members
190 rigid boot
191 first end
192 second end
193 body
281, 341 latching hooks
282 notches
285, 285' interruption
286, 286', 343 finger access region
304, 504 first interface
305, 505 cable storage unit
306, 506 apertures
318a, 418a portion of slider
335a ridge
338a ramp
350 patchcord storage arrangement
354, 554 second interface
356, 556 lugs
360 spool arrangement
361a first portion of rear wall
361b second portion of rear wall
362 sidewall
363 drum
364 latching arms
365 mounting location
366 guides structures
367 channel
367a ramped surface
368 slot or break
369 latching lugs
370 retainer
371 apertures
372, 374 aperture
375 aperture
376 insert
377 notches
378 guide structures
379 fastener apertures
380, 580 cover
381 covering surface 382 sidewall
383, 583 port
385 latching feature
386 ledge
387 ribs
394 first end
395, 595 patchcord
396, 596 second end
418b peripheral edge of slider member
419 stopping member
419a receptacle
484 bend radius limiter
486 notches
490 packaging arrangement
491 bottom member
492 base
493 inner ring
494 outer ring
495 top member
496 groove
503 mounting member
507 aperture
508 latching finger
509 shoulder
533 interface wall
534 slots
536 alignment member
538 abutment member
570 shroud member
576 slot
578 channel
590 retaining arrangement
591 button
591a flange
592 biasing member
593 textured surface
594 groove
597 aperture
598 frame walls
599 abutment wall

What is claimed is:

1. A cable storage arrangement comprising:
a coil of cable extending between a first end and a second end, the second end being connectorized at a fiber optic connector;
a wall outlet holding at least a portion of the coil, the wall outlet defining a port through which the cable can be dispensed by pulling on the first end of the cable, the wall outlet also including a first interface part holding the fiber optic connector at the second end of the cable;
a patchcord extending between a first end and a second end, each of the first and second ends being connectorized at fiber optic connectors; and
a patchcord storage arrangement holding the patchcord and from which the patchcord is dispensed, the patchcord storage arrangement being configured to mount to the wall outlet, the patchcord storage arrangement including a second interface part holding the fiber optic connector at the first end of the patchcord, the second interface part being aligned with the first interface part when the patchcord storage arrangement is mounted to the wall outlet, the second end of the patchcord being accessible from an exterior of the patchcord storage arrangement.

2. The cable storage arrangement of claim 1, wherein the first interface part includes an optical adapter that holds the fiber optic connector at the second end of the cable, the optical adapter defining a port configured to receive the fiber optic connector at the first end of the patchcord when the patchcord storage arrangement mounts to the wall outlet.

3. The cable storage arrangement of claim 1, wherein the second interface part includes an optical adapter that holds the fiber optic connector at the first end of the patchcord, the optical adapter defining a port configured to receive the fiber optic connector at the second end of the cable when the patchcord storage arrangement mounts to the wall outlet.

4. The cable storage arrangement of claim 1, wherein the wall outlet includes a first spool arrangement disposed within a base, the first spool arrangement being rotatable relative to the base to dispense the cable, the base defining the port, the first spool arrangement defining the first interface part.

5. The cable storage arrangement of claim 4, wherein the patchcord storage arrangement includes a cover mounted over a second spool arrangement, the cover being rotatable relative to the second spool arrangement to dispense the patchcord.

6. The cable storage arrangement of claim 5, wherein the second spool arrangement is rotationally stationary relative to the first spool arrangement.

7. The cable storage arrangement of claim 1, wherein the port defined by the wall outlet is lined with a gasket to generate friction as the cable is dispensed.

8. The cable storage arrangement of claim 1, further comprising a retaining arrangement that releasably secures the patchcord storage arrangement to the wall outlet.

9. The cable storage arrangement of claim 8, wherein the retaining arrangement comprises a button disposed at the patchcord storage arrangement, the button defining a groove, the button being movable between a first position and a second position.

10. The cable storage arrangement of claim 9, wherein the retaining arrangement comprises a pair of buttons.

11. The cable storage arrangement of claim 9, wherein the button is spring biased towards the first position.

12. The cable storage arrangement of claim 9, wherein the patchcord storage arrangement defines a channel that extends across the button, wherein the groove defined by the button does not align with the channel when the button is disposed in the first position, wherein the groove defined by the button aligns with the channel when the button is disposed in the second position.

13. The cable storage arrangement of claim 12, wherein the retaining arrangement also comprises an abutment member fixedly disposed on the wall outlet, the abutment member being received in the channel.

14. The cable storage arrangement of claim 1, wherein the second interface part includes shroud members disposed at opposite sides of the fiber optic connector at the second end of the cable.

15. The cable storage arrangement of claim 1, wherein the first interface part includes alignment rails and the second interface part defines slots sized and shaped to receive the alignment rails.

16. The cable storage arrangement of claim 1, further comprising a packaging arrangement that holds a second portion of the coil of cable that is disposed external of the wall outlet.

17. The cable storage arrangement of claim 16, wherein the packaging arrangement is configured to hold the wall outlet and the patchcord storage arrangement within the second portion of the coil of cable.

18. The cable storage arrangement of claim 16, wherein the packaging arrangement includes a base, an inner ring sized to hold the wall outlet, and an outer ring sized to receive the second portion of the coil of cable.

19. The cable storage arrangement of claim 1, wherein the wall outlet has a front and a rear, wherein the first interface part is disposed at the front, and wherein the rear is configured to fit with a mounting member via which the wall outlet mounts to a wall.

20. The cable storage arrangement of claim 19, wherein the mounting member enables the wall outlet to rotate relative to the wall.

* * * * *